United States Patent
Mori et al.

(10) Patent No.: US 7,270,582 B2
(45) Date of Patent: Sep. 18, 2007

(54) POWER GENERATING AND PROPELLING SYSTEM OF VESSEL

(75) Inventors: Hisanori Mori, Osaka (JP); Mitsuhiro Nakagaki, Osaka (JP); Hiroyasu Yukino, Osaka (JP); Takayuki Toda, Osaka (JP); Junichi Hitachi, Osaka (JP); Toshio Imanaka, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 11/218,619

(22) Filed: Sep. 6, 2005

(65) Prior Publication Data

US 2005/0287883 A1 Dec. 29, 2005

Related U.S. Application Data

(63) Continuation of application No. 10/787,956, filed on Feb. 27, 2004, which is a continuation-in-part of application No. PCT/JP02/08713, filed on Sep. 11, 2001.

(30) Foreign Application Priority Data

Sep. 11, 2001 (JP) ............................. 2001-275191

(51) Int. Cl.
  *B60L 11/00* (2006.01)
  *B63H 21/30* (2006.01)
(52) U.S. Cl. .......................... 440/6; 440/111
(58) Field of Classification Search ............. 440/6, 440/111, 112
See application file for complete search history.

(56) References Cited

U.S. PATENT DOCUMENTS 4,097,752 A * 6/1978 Wulf et al. ................. 290/20
5,509,833 A * 4/1996 Rodskier .................... 440/53
5,773,904 A * 6/1998 Schiebold et al. ........... 310/92
5,934,395 A 8/1999 Koide et al.
6,416,370 B1 * 7/2002 Bland et al. .............. 440/61 R
6,487,998 B1 12/2002 Masberg et al.

FOREIGN PATENT DOCUMENTS

| JP | 50-62601 | 10/1948 |
| JP | 55-65419 | 5/1980 |
| JP | 61-17850 | 2/1986 |

OTHER PUBLICATIONS

Patent Abstracts of Japan, Publication No. 03-197296, Date of publication of application: Aug. 28, 1991. Title: Auxillary Propulsive Equipment For Planing Boat.

(Continued)

*Primary Examiner*—Jesús D Sotelo
(74) *Attorney, Agent, or Firm*—Sterne, Kessler, Goldstein & Fox P.L.L.C.

(57) ABSTRACT

A power generating and propelling system of a vessel has an electric power generating device (10) installed between an internal combustion engine (2) and a transmission (3). A stator (11) of the generating device (10) is built in a flywheel housing (21a) of the internal combustion engine (2) or a casing (10a) connected to the flywheel housing (21a). A rotary shaft of the generating device (10) is disposed coaxially or eccentrically parallel to a crankshaft (2a) of the internal combustion engine (2) or an input shaft (3a) of the transmission (3) in the same direction with the crankshaft (2a) of the internal combustion engine (2).

22 Claims, 57 Drawing Sheets

OTHER PUBLICATIONS

Patent Abstracts of Japan, Publication No. 07-184351, Date of publication of application: Jul. 21, 1995, Title: Dynamo-Electric Machine.

Patent Abstracts of Japan, Publication No. 08-223884, Date of publication of application: Aug. 3, 1996, Title: Manufacture of Series Coupled Engine-Driven Welding Machine and Assembled Structure Thereof.

Patent Abstracts of Japan, Publication No. 08-230785, Date of publication of application: Sep. 10, 1996, Title: Ship Provided With Auxiliary Electric Propulsion Equipment.

Patent Abstracts of Japan, Publication No. 08-251859, Date of publication of application: Sep. 27, 1996, Title: Rotating Electric Machine.

Patent Abstracts of Japan, Publication No. 10-236392, Date of publication of application: Sep. 8, 1998, Title: Fuel Supply Device For Small Ship.

Patent Abstracts of Japan, Publication No. 10-278888, Date of publication of application: Oct. 20, 1998, Title: Engine Exhaust System Cooling Device of Small Planing Boat.

Patent Abstracts of Japan, Publication No. 2000-062696, Date of publication of application: Feb. 29, 2000, Title: Cooling Stucture of Oil Pump For Small Vessel.

Patent Abstracts of Japan, Publication No. 2000-186567, Date of publication of application: Jul. 4, 2000, Title: Electrical Equipment Fitting Structure of Outboard Motor.

Patent Abstracts of Japan, Publication No. 2000-341959, Date of publication of application: Dec. 8, 2000, Title: Power Generating System.

Patent Abstracts of Japan, Publication No. 2001-191989, Date of publication of application: Jul. 17, 2001, Title: Outboard Motor.

Patent Abstracts of Japan, Publication No. 2002-021759, Date of publication of application: Jan. 23, 2002, Title: Screw Compressor.

Patent Abstracts of Japan, Publication No. 2002-165401, Date of publication of application: Jun. 7, 2002, Title: Blower Motor For Vehicle.

Patent Abstracts of Japan, Publication No. 2003-080955, Date of publication of application: Mar. 19, 2003, Title: Power Generation and Propulsion System for Marine Vessel.

Patent Abstracts of Japan, Publication No. 2003-081189, Date of publication of application: Mar. 19, 2003, Title: Power Generating and Propelling System for Ship.

Patent Abstracts of Japan, Publication No. 2003-081190, Date of publication of application: Mar. 19, 2003, Title: Power Generating and Propelling System for Ship.

Patent Abstracts of Japan, Publication No. 2003-244816, Date of publication of application: Aug. 29, 2003, Title: Information Outlet.

\* cited by examiner (a)

(b)

(a)

(b)

(a)

(b)

(a)

(b)

(a)

(b)

(a)

(b)

(a)

(b)

POWER GENERATING AND PROPELLING SYSTEM OF VESSEL

CROSS REFERENCE TO RELATED APPLICATIONS

This application is a Continuation of U.S. application Ser. No. 10/787,956 filed Feb. 27, 2004, which is a Continuation-in-part of PCT/JP02/08713 filed Sep. 11, 2001.

BACKGROUND OF THE INVENTION

1. Field of the Invention

The present invention relates to the construction of a vessel-propelling machine having an internal combustion engine for propelling a vessel and a power generating device for supplying electric power to inboard equipments.

2. Background Art

A conventional vessel-propelling machine comprises an internal combustion engine, a transmission and others, wherein a propeller connected to the transmission is driven by the driving force of the internal combustion engine decelerated through the transmission.

Moreover, conventionally, a battery stores electric power to be supplied to inboard electric equipments, and a power generator such as an alternator is attached to the internal combustion engine of the propelling machine so as to generate electric power to be stored in the battery.

For example, referring to FIG. 14, a vessel-propelling machine 101 comprises an internal combustion engine 102, a transmission 103, and the like. A propeller 104 is connected to the transmission 103 so as to be driven by the internal combustion engine 102. An alternator 105 is attached to the internal combustion engine 102 so as to charge a battery 106.

However, electric power outputted from the battery 106 charged by the alternator 105 is insufficient to be supplied to all inboard electric equipments.

In addition, the propelling machine 101 is vibro-isolatingly supported with a plurality of vibration proof members 111.

Referring to FIG. 15, a generator-driving engine 107 other than the engine 102 of the vessel-propelling machine 101 is provided to drive an inboard electric power generator 108 so as to supply sufficient electric power to inboard electrical equipments.

However, a space for arranging the generator driving engine 107 and the inboard electric power generator 108 is required in addition to a space for installing the vessel-propelling machine 101, thereby requiring a vessel having a large space.

Referring to FIG. 16, a conventional generator 109 for supplying sufficient inboard electric power is provided on one end of the internal combustion engine 102 so as to be driven by the engine 102 through a belt and pulleys.

However, this construction expands the whole of vessel-propelling machine 101 so as to require a considerably large installation space. Further, the propelling machine 101 having the complicated vibro-isolating support structure with the vibration proof members 111 requires much time to be mounted.

In viewing the above, an object of the present invention for solving the above problems is to provide a vessel-propelling machine, in which an engine for generating sufficient electric power to be supplied to inboard equipments (such as the generator driving engine 107) is identified with an internal combustion engine for propelling a vessel (such as the internal combustion engine 102) so that the vessel-propelling machine 101, while ensuring its compactness, enables sufficient inboard electric power supply and easy vibro-isolating mount.

Moreover, another object of the present invention is to provide a drive system arrangement for efficiently and reasonably distributing output power of the internal combustion engine between the electric power generating device and the transmission, and to provide the electric power generating device with an effective cooling system for ensuring stable electric power supply.

A further object of the present invention is to provide the vessel-propelling machine having the propelling internal combustion engine also serving as an engine for generating electric power, provided with a casing facilitating for water-draining so as to prevent an electric power generator from corrosion and life degradation, thereby ensuring simplicity and inexpensiveness of the electric power generating and cooling system. A further object of the present invention is to provide a vessel-propelling machine which can be easily installed to various kinds of vessels, and which can be provided with an inexpensive electric power generator facilitating for assembling and wiring thereof while ensuring sufficient total output power thereof.

BRIEF SUMMARY OF THE INVENTION

According to the present invention, a power generating and propelling system of a vessel in which an electric power generating device is disposed between an internal combustion engine and a transmission. While a stator of the generating device is disposed in either a flywheel housing of the internal combustion engine or a casing connected to the flywheel housing, a rotary shaft of the generating device is disposed in the same direction with a crankshaft of the internal combustion engine or a rotary shaft of the transmission. The electric power generating device can be used as either a motor or a generator. Therefore, a count of shafts for transmitting the driving force from the internal combustion engine to the transmission can be reduced so as to simplify a structure for transmitting it.

Furthermore, according to the present invention, the rotary shaft of the electric power generating device is disposed coaxially to a crankshaft of the internal combustion engine or any rotary shaft of the transmission. Therefore, the count of shafts for transmitting the driving force from the internal combustion engine to the transmission can be reduced, and the whole propelling machine can be balanced in weight so as to reduce its vibration. Electric power generated by the generating device is larger than that by the conventional alternator so that inboard equipments on the vessel can be supplied with sufficient electric power, while keeping the vessel-propelling machine compact so as to save a space. Additionally, the compacted propelling machine can be easily mounted onto the vessel body. The electric power generating device may be supplied with electric power from a battery or another so as to serve as a motor, which can be used as an engine-starting motor or as a power supply in combination with the internal combustion engine. The common generating device can be still used even when the specification of the transmission connected to the internal combustion engine is changed, whereby the generating device is accommodated to various transmissions so as to enhance the flexibility of the generating device. In comparison with the case that the generating device is exposed, the generating device built in the flywheel housing or a casing connected to the flywheel housing can be protected so as to reduce troubles and to enhance reliability. When the generating device is directly built in the flywheel housing, the propelling machine can be shortened in the direction of the crankshaft, thereby being compacted.

Alternatively, according to the present invention, the rotary shaft of the generating device is disposed eccentrically and parallel to the crankshaft of the internal combustion engine or any rotary shaft of the transmission. Therefore, a plurality of generating units can be disposed in the generating device, and the count of the generating units to be disposed may be arbitrarily determined so as to set suitable scale of output power generated by the generating. For driving the rotary shaft of the generating device by the crankshaft of the internal combustion engine or the rotary shaft of the transmission, a drive gear fixed on the crankshaft of the internal combustion engine or the rotary shaft of the transmission meshes with a driven gear fixed on the rotor shaft of the generating device. The gear ratio between the meshing drive and driven gears may be arbitrarily changed so as to change the scale of generated electric output power. Therefore, the adaptability of internal combustion engines having difference specifications to be connected to the transmission can be enhanced.

Furthermore, according to the present invention, a rotor of the electric power generating device is disposed radially outward from a junction between the internal combustion engine and the transmission, and a joint such as a damper is interposed in the joining portion to serve as an engine power transmission passage. Therefore, even if the generating device, which may be housed in the flywheel housing, is compacted, a large peripheral rotary speed of the rotor of the generating device can be ensured so as to generate large output electric power. Furthermore, this arrangement facilitates for easy cooling the heat generated from power generating area of the generating device, such as the rotor and stator. Moreover, the joint like a damper connecting the rotary shaft of the transmission to the crankshaft of the internal combustion engine reduces the noise attendant upon gear change (torque change) of the internal combustion engine, and protects the shafting including the crankshaft and the rotary shaft of the transmission.

Furthermore, according to the present invention, a cooling fan is provided inside the flywheel housing or the casing. This arrangement, while being kept compact, utilizes the driving of the internal combustion engine so as to enhance the efficiency of cooling the generating device.

Furthermore, according to the present invention, cooling-water for cooling the internal combustion engine is flowed inside or near the flywheel housing or casing having the generating device built therein. Therefore, the generating device can be cooled efficiently, so that the temperature rise in generating elements like the stator and rotor is prevented, whereby the generating device and the propelling machine are improved in durability and reliability. Also, this arrangement is kept compact while enhancing the efficiency of cooling the generating device.

According to the present invention, the above cooling-water is taken in from the outside of the vessel. This cooling structure can be compact and inexpensive while ensuring the enhanced cooling efficiency.

Alternatively, according to the present invention, the cooling-water is circulated within a closed circuit provided inside the vessel. This cooling structure effectively can utilize the heated cooling-water after cooling the generating device for hot-water supply in a vessel or another purpose, thereby effectively utilizing the exhaust heat from the generating device. This cooling structure is still compact while ensuring the enhanced cooling efficiency.

An electric power generating system of a vessel according to the present invention comprises an electric power generating device disposed on a drive train from a crankshaft of an internal combustion engine to a transmission for propelling the vessel, wherein a casing which houses the generating device is provided on its outer peripheral surface with a plurality of fins or ribs. Preferably, the fins or the ribs are arranged in parallel to the crankshaft. Holes open into the casing are provided under the fins or ribs substantially in parallel to the fins or ribs. Therefore, heat can be radiated from the generating device casing nearest to the generating device so as to enhance cooling efficiency. By providing the fins or ribs on the generating device casing, strength of the generating device casing can be enhanced. By providing the holes under the fins or the ribs, infall of vertically dropping water can be prevented. Furthermore, by providing the holes substantially in parallel to the fins or ribs, the holes are arranged substantially in parallel to the crankshaft, whereby circulation of the cooling air is smoothed so as to enhance the air-cooling efficiency.

A drain hole is provided at the lower portion of the casing. Preferably, the casing is made by casting, inclination caused by draft angle is provided on an inside surface of the casing, and the drain hole is arranged on a lower side of the inline. Otherwise, the generating device casing is made by casting, incline caused by draft angle is provided on an inside surface of the casing, and the drain hole is arranged at a lower portion of another casing connected to the lower side of the inline of the generating device casing. Therefore, water accumulated inside the casing produced by dew condensation or another reason can be drained so as to prevent the generating device from corrosion and life degradation.

A plurality of tandem electric power generating devices can be disposed between the internal combustion engine and the transmission for propelling the vessel. An attachment part of the casing on side toward the internal combustion engine is sized as large as an attachment part of the power input side of the transmission, and an attachment part of the casing on side toward the transmission is sized as large as an attachment part of the power output side of the internal combustion engine. In this way, the tandem generating devices can be disposed so as to agree with requirement of large electric output power. There is no necessity of changing the attachment part of the power output part of the internal combustion engine and the attachment part of the power input part of the transmission depending on whether each of them is attached to the generating device or not, thereby reducing a parts count. Furthermore, the generating devices can be attached and detached easily.

An electric power generating system of a vessel according to the present invention comprises a flywheel disposed on a crankshaft of an internal combustion engine and connected to an input shaft of a transmission for propelling the vessel, and a generating device disposed on a drive train from the flywheel to the transmission for propelling the vessel, wherein a permanent magnet used as a rotor of the generating device is attached onto a rotary member removably connected to the flywheel and the transmission. A stator coil of the generating device is fixed to a casing, and a reentrant is partially provided between the casing and an outer peripheral surface of the stator coil so as to pass air therethrough between spaces in the casing ahead and behind the stator coil. Preferably, the rotary member, which rotates the rotor, is a hollow shaft connected to the transmission through a directly or indirectly combined elastic joint. The rotary member may be a hollow shaft provided on its end surface with an attachment part to be fitted to a cooling fan. The rotary member may be a hollow shaft provided on its outer peripheral surface with vanes. Preferably, the reentrant is connected with a hole opened on an outside surface of the casing. A fin or a rib may be provided above the hole. The rotary member with the rotor fixed thereto connects the flywheel to the transmission, thereby reducing a parts count and costs. The efficiency of cooling the generating device can be enhanced by the reentrants provided between the casing and the stator, the holes connected with the reentrants, the fins or ribs provided above the holes, and the fan attached to the rotary member.

A power generating system of a vessel according to the present invention comprises an electric power generating device disposed on a drive train from a crankshaft of an internal combustion engine to a transmission for propelling the vessel, wherein a rectifying and smoothing device converts output power of the generating device into direct current, and a plurality of inverters convert the direct current into alternating current so as to supply it to inboard equipments. Preferably, if a set of output cables for respective phases of the generating device is supposed as a unit of output cable, the output power of the generating device is taken out by the unit of output cable and converted into direct current by the rectifying and smoothing device, and the direct current is branched and connected to the inverters in parallel. Alternatively, an output part of the generating device may be connected with units of output cables connected to respective rectifying and smoothing devices, so that the rectifying and smooth devices convert the output power of the generating device into respective direct currents, and the inverters convert the respective direct currents into respective alternating currents. Therefore, electric power can be supplied in a wide range of rotational speed of the engine, and small inverters can be used so as to save costs while keeping the required total capacity of electric power. A power generating system of a vessel according to the present invention comprises an electric power generating device disposed on a drive train from a crankshaft of an internal combustion engine to a transmission for propelling the vessel, wherein a casing housing the generating device is provided with a hole for wiring through which an output cable of the generating device can be taken out from the casing. Preferably, a connector or a terminal stand is attached into the hole for wiring, wherein one side of the connector or the terminal is connected with the output cable of the generating device, and the other side thereof is connected with an outer cable. Such an arrangement for easily taking out the output cable facilitates for easy attachment work of the output cable for its maintenance or the like. An outer cable can be easily attached or removed to and from the connector or the terminal, thereby easing wiring work.

Furthermore, according to the present invention, a mounting leg for mounting a propelling machine onto a body of the vessel is attached onto an outer peripheral surface of the casing, or onto an attachment portion formed on the outer peripheral surface of the casing. Therefore, besides mounting legs used when the generating device is not mounted, the mounting legs can be attached to the outer periphery of the casing, so that a suitable mounting method can be selected corresponding to conditions of the target vessel so as to suit the casing with various kinds of vessels easily.

BRIEF DESCRIPTION OF THE DRAWINGS/FIGURES

FIG. 22($b$) is a rear view of the casing.

DETAILED DESCRIPTION OF THE INVENTION

The present invention will be more fully described in accordance with accompanying drawings.

Explanation will be given of a vessel-propelling machine. The propelling machine is compacted while ensuring sufficient electric power for inboard equipments because a propelling internal combustion engine therein is identified with an engine for generating electric power. The propelling machine is convenient for its easy vibro-isolating installation.

Figure 1:
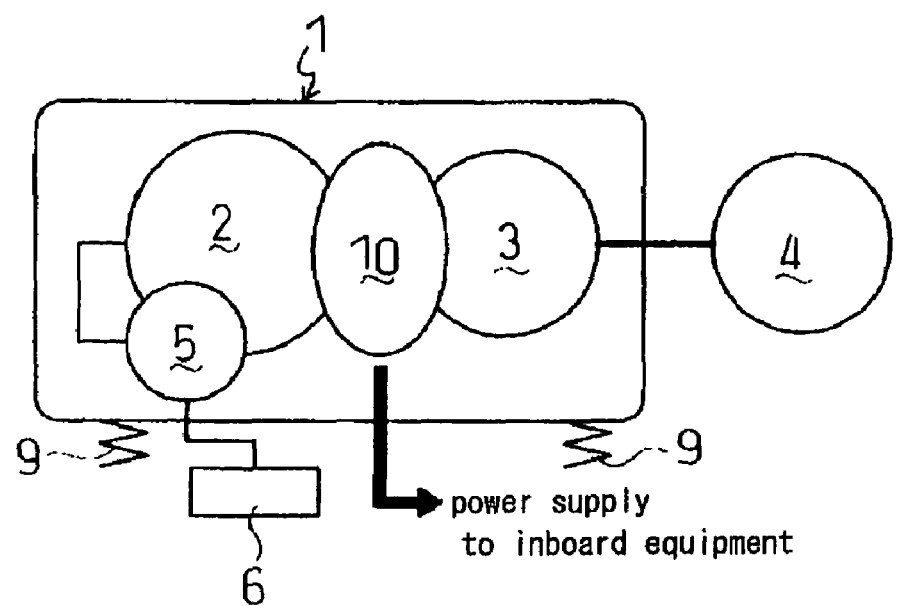
FIG. 1 is a general systematic diagram of a vessel-propelling machine.

A vessel-propelling machine 1 shown in FIG. 1 has an internal combustion engine 2 and a transmission 3. A propeller 4 is connected to the transmission 3. A driving force from the engine 2 is transmitted and decelerated through the transmission 3 to the propeller 4.

An alternator 5 is attached to the internal combustion engine 2 to be driven by the engine 2. Electric power generated by the alternator 5 is stored in a battery 6.

In the propelling machine 1, an electric power generating device 10 having a generator or function of generating electric power is interposed between the engine 2 and the transmission 3. The engine 2 drives the generating device 10, so that the electric power generated by the generating device 10 is supplied to inboard electric equipments.

The generating device 10 can be used as a motor so as to support the driving force of the engine 2.

Figure 2:
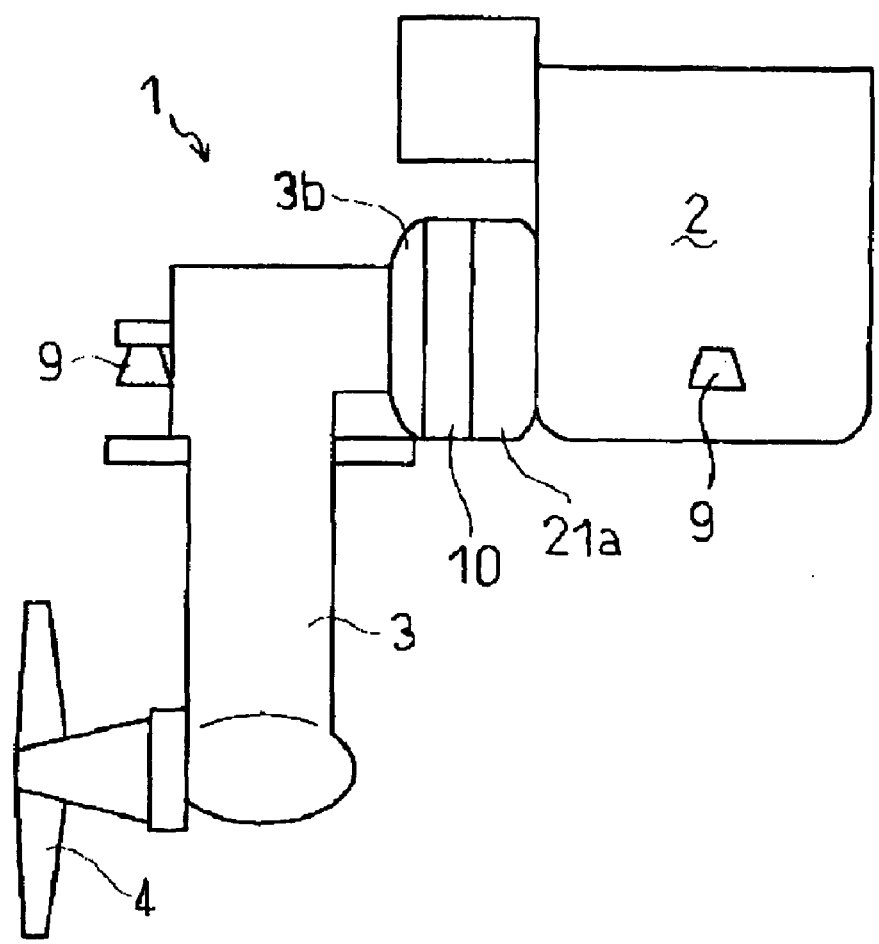
FIG. 2 is a side view of a sail-drive propelling machine of a vessel.
Figure 3:
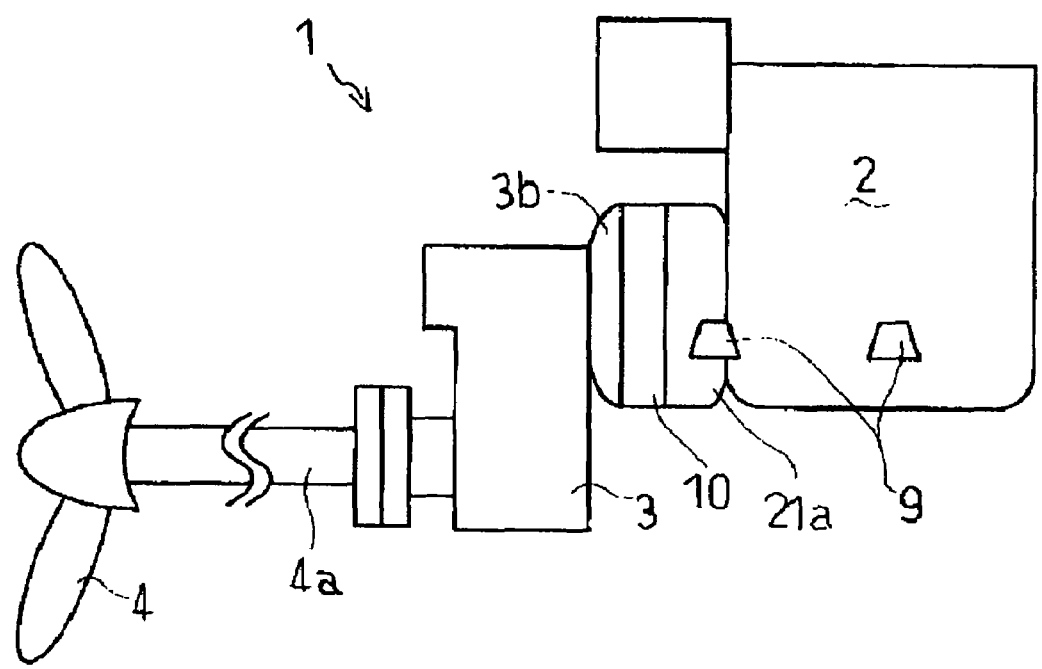
FIG. 3 is a side view of a marine-gear propelling machine of a vessel.

Alternatively, the propelling machine 1 may have another drive system such as a sail drive system and a marine gear system. As shown in FIG. 2, in the sail-drive propelling machine 1, the transmission 3 is largely extended below the engine 2, and the propeller 4 is directly attached to the transmission 3. As shown in FIG. 3, in the marine-gear propelling machine 1, a propeller shaft 4a of the propeller 4 is attached to the rear end portion of the transmission 3.

The propelling machine 1, which integrally comprises the engine 2, the generating device 10, and the transmission 3, is supported in the vessel through vibration proof members 9 such as vibration proof rubbers.

The generating device 10 is interposed between the engine 2 and the transmission 3 to be driven by the engine 2. Thus, in comparison with a case where another engine is provided for driving the generating device 10, or where a generator driven by the engine 2 through a belt and pulleys is separately provided on one end portion of the combustion engine 2, the propelling machine 1 is so compacted as to save a space and to facilitate for easy installation while the generating device 10 which can generate electric power larger than the alternator 5 supplies sufficient electric power to inboard equipments.

Figure 4:
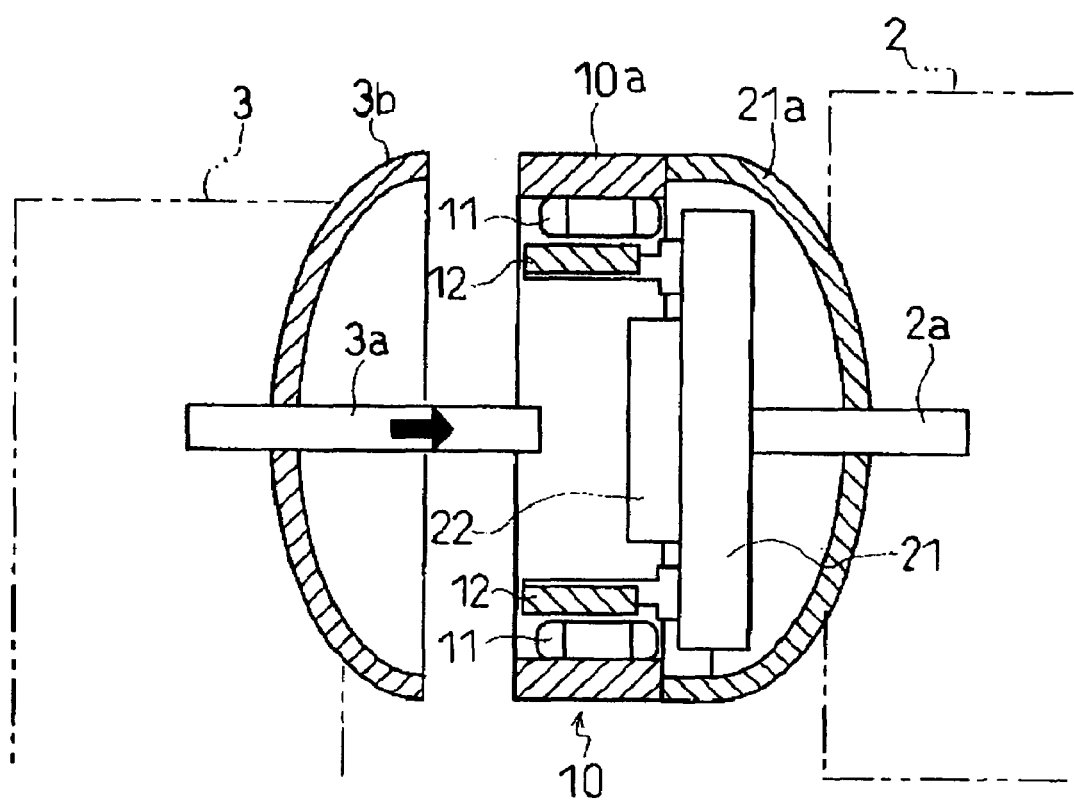
FIG. 4 is a sectional side view of an electric power generating device portion of a vessel-propelling machine.

The generating device 10 will now be described. A flywheel 21 is attached onto one end of the internal combustion engine 2 to be driven by a crankshaft 2a of the engine 2, as shown in FIG. 4. The flywheel 21 is covered with a flywheel housing (hereinafter referred to as "FW housing") 21a.

Constructive members of the generating device 10 are built in a generating device casing 10a, which is integrally connected with the FW housing 21a.

Specifically, stator coils 11 are attached to the inside surface of the generating device casing 10a. A magnet rotor 12 is disposed inside the stator coil 11 (toward the center), and attached to the flywheel 21 so as to rotate integrally with it.

A mounting flange 3b of the transmission 3 can be attached to a side end of the generating device casing 10a opposite to the FW housing 21a, so as to fix the transmission 3 to the engine 2.

The crankshaft 2a of engine 2 serves as a rotary shaft of the generating device 10. The crankshaft 2a is disposed in parallel to an input shaft 3a of the transmission 3 while the axial center of crankshaft 2a coincides with the axial center of input shaft 3a. Namely, the rotary shaft of the generating device 10 is disposed coaxially in parallel to the crankshaft 2a and input shaft 3a. When the mounting flange 3b is attached to the generating device casing 10a, the input shaft 3a is connected to the flywheel 21 through a damper 22 to be driven by the crankshaft 2a.

Figure 5:
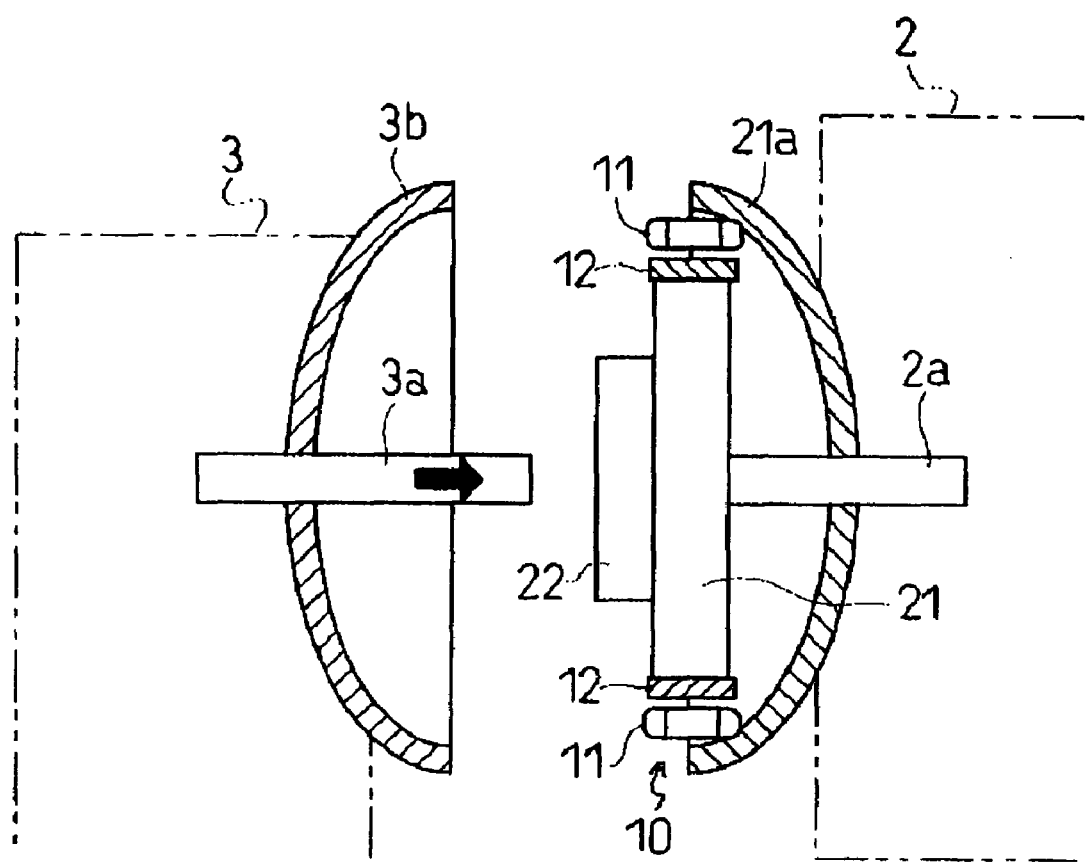
FIG. 5 is a sectional side view of an electric power generating device portion of a vessel-propelling machine according to a second embodiment.

Alternatively, as shown in FIG. 5, the generating device 10 may be constructed in such a way that the stator coils 11 are directly fixed to the FW housing 21a, and the magnet rotor 12 is fixed to the outside surface of the flywheel 21. That is to say, the generating device 10 may be directly built in the FW housing 21a.

In this way, the generating device 10 may be built in either the FW housing 21a or the generating device casing 10a connected to the FW housing 21a, so that the common generating device 10 can be still used even when the specification of the transmission 3 connected to the engine 2 is changed. Thus, the generating device 10 is accommodated to various transmissions so as to enhance its flexibility.

Additionally, in comparison with the case where the generating device 10 is exposed, the generating device 10 is built in the FW housing 21a or the generating device casing 10a so as to be protected securely from troubles, thereby enhancing its reliability.

In case the generating device 10 is directly built in the FW housing 21a, the propelling machine 1 can be shortened in the axial direction of the crankshaft 2a, thereby being compacted.

Since the rotary shaft of the generating device 10 is disposed in parallel and coaxially to the input shaft 3a of transmission 3 or the crankshaft 2a of engine 2, shafts for transmitting the driving force from the engine 2 to the transmission 3 can be reduced and the whole propelling machine 1 is balanced so as to reduce vibration.

Furthermore, since the rotary shaft of the generating device 10 is disposed in parallel to the input shaft 3a of transmission 3 or the crankshaft 2a of engine 2, the mechanism for transmitting the driving force from the engine 2 to the transmission 3 is simplified in comparison with the case where the rotary shaft of the generating device 10 is disposed to make an angle with the input shaft 3a of transmission 3 or the crankshaft 2a of engine 2.

The magnet rotor 12 of the generating device 10 is disposed radially outward of the junction between the transmission 3 and engine 2, i.e., between the input shaft 3a of transmission 3 and the crankshaft 2a of engine 2, so as to ensure high peripheral speed of the magnet rotor 12. Therefore, the generating device 10, while being compactly housed in the FW housing 21a or the other, creates high electric power. Further, the power generating part in the generating device 10, i.e., the magnet rotor 12 and stator coils 11 are arranged as the above, thereby facilitating for their easy cooling.

A joint such as the damper 22 connecting the input shaft 3a of transmission 3 to the crankshaft 2a reduces gear noise attendant upon the speed change (torque change) of engine 2, and protects the shafting including the crankshaft 2a and input shaft 3a.

Figure 6:
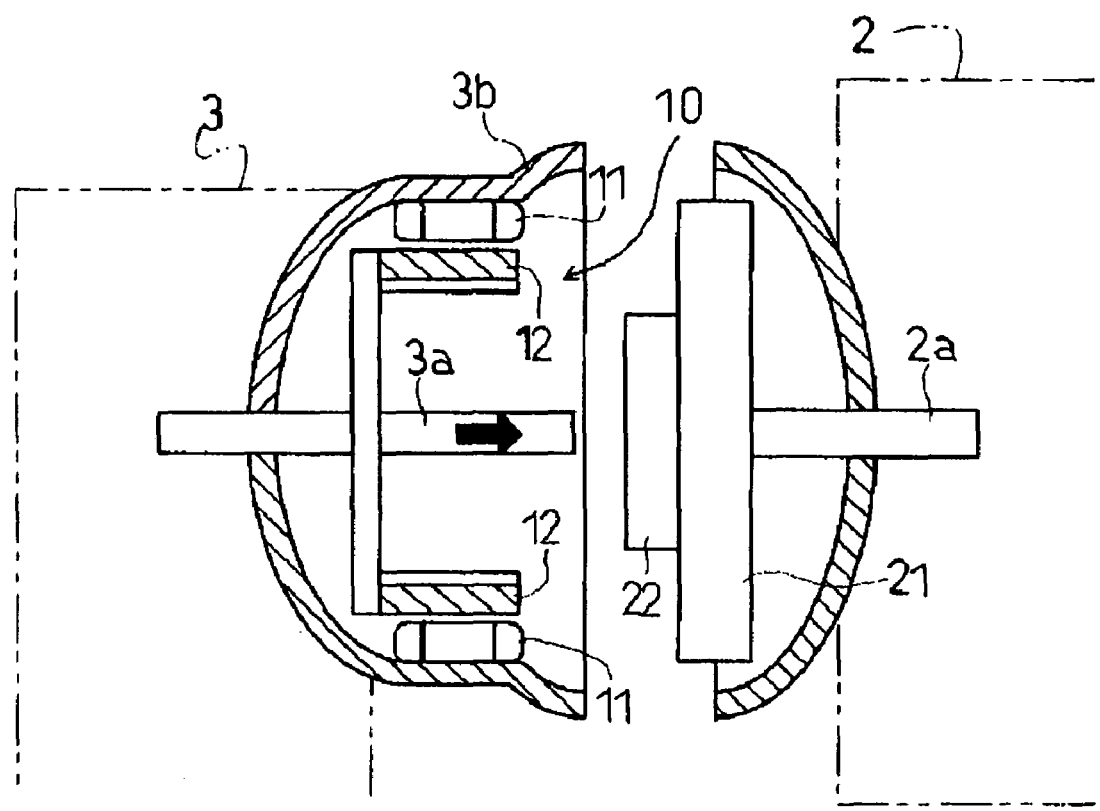
FIG. 6 is a sectional side view of an electric power generating device portion of a vessel-propelling machine according to a third embodiment.

In the propelling machine 1, as shown in FIG. 6, while the stator coils 11 are fixed to the inside of the mounting flange 3b of transmission 3, the magnet rotor 12 is disposed radially inward of the stator coils 11 (toward the center) so as to be rotated integrally with the input shaft 3a of transmission 3. In this way, the generating device 10 can be built in the mounting flange 3b.

Thus, the common generating device 10 can be still used even when an internal combustion engine having a specification different from the engine 2 is connected to the transmission 3. In this way, the generating device 10 is accommodated to various internal combustion engines so as to enhance its flexibility.

Alternatively, in the propelling machine 1, the rotary shaft of the generating device 10 may be disposed eccentrically and parallel to rotary shafts such as the crankshaft 2a of engine 2 or the rotary shaft 3a of transmission 3.

Figure 7:
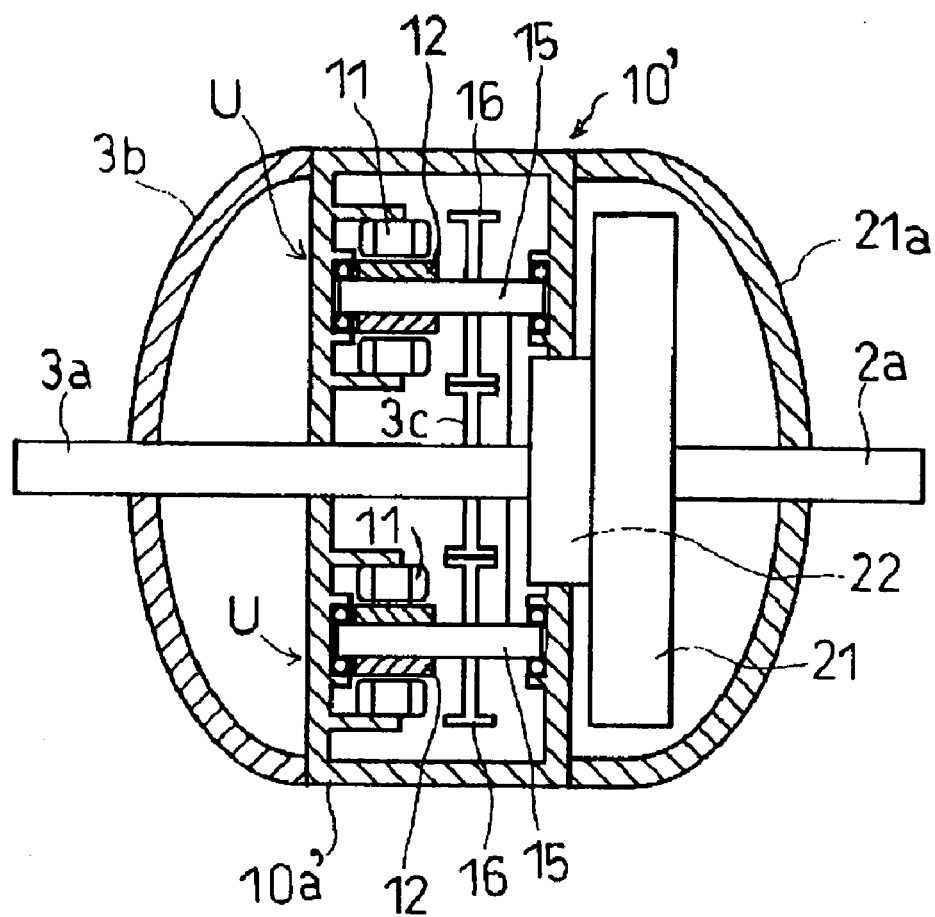
FIG. 7 is a sectional side view of an electric power generating device whose rotary shaft is disposed eccentrically to a crankshaft of an internal combustion engine or a rotary shaft of a transmission.
Figure 8:
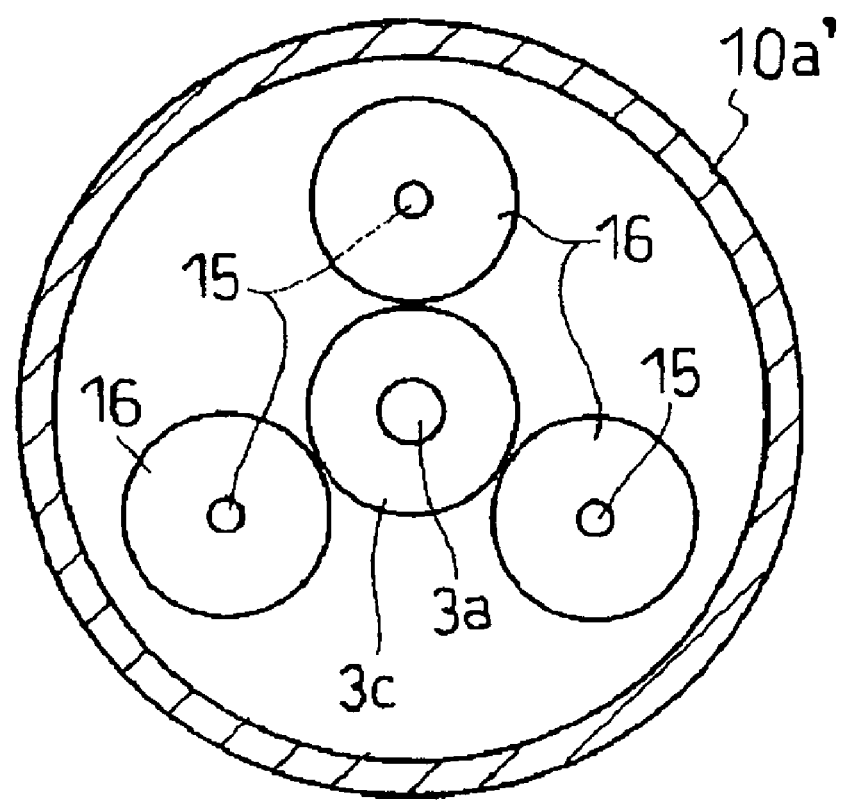
FIG. 8 is a sectional front view of the electric power generating device.

For example, as shown in FIGS. 7 and 8, an generating device casing 10a' may be interposed between the FW housing 21a of engine 2 and the mounting flange 3b of transmission 3.

In the generating device casing 10a' are provided a plurality of (in this embodiment, three) generating units U. Each of the generating units U comprises a rotor shaft 15 rotatably supported by the generating device casing 10a', a magnet rotor 12 fixed to the rotor shaft 15, a stator coil 11 disposed on the outer periphery of the magnet rotor 12 and fixed to the generating device casing 10a', and a driven gear 16 fixed to the rotor shaft 15.

The rotor shafts 15 serving as rotary shafts of the generating units U are disposed radially outward from the input shaft 3a of transmission 3 and the crankshaft 2a of engine 2.

Therefore, the rotor shafts 15 of the generating units U are disposed eccentrically and parallel to the input shaft 3a of transmission 3 and the crankshaft 2a of engine 2.

A driving gear 3c fixed to the input shaft 3a meshes with the driven gears 16 of the generating units U.

In this way, in the generating device 10', the plurality of generating units U are built, and the driving gear 3c fixed to the input shaft 3a meshes with the driven gears 16 fixed to the rotor shafts 15 of generating units U so that the rotor shafts 15 are rotated by rotation of the input shaft 3a.

The magnet rotors 12 are rotated with the rotor shafts 15 relative to the respective stator coils 11, thereby generating electricity.

In this way, the rotor shafts 15 of the generating units U serving as rotary shafts of the generating device 10' is disposed eccentrically and parallel to the input shaft 3a of transmission 3 and the crankshaft 2a of engine 2, so that the number of generating units U to be provided in the generating device 10' can be selected optionally.

Therefore, the electric power generated by the generating device 10' can be adjusted by selecting the number of the generating unit U.

Figure 9:
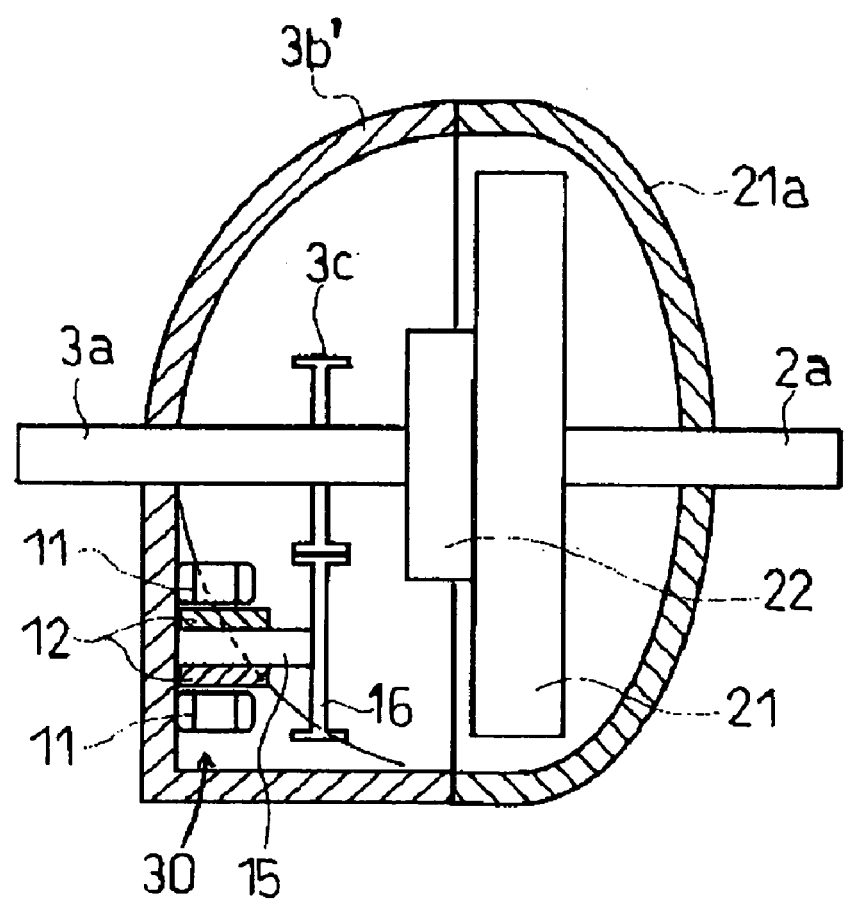
FIG. 9 is a sectional side view of a reshaped electric power generating device whose rotary shaft is disposed eccentrically to a crankshaft of an internal combustion engine or a rotary shaft of a transmission.

Alternatively, the rotary shaft of the generating device 10 eccentric to the crankshaft 2a or the rotary shaft of the transmission 3 may be disposed as follows:

An electric power generating device 30 shown in the FIG. 9 is built in a mounting flange 3b' of transmission 3. The generating device 30 comprises a rotor shaft 15 rotatably supported by the mounting flange 3b', a magnet rotor 12 fixed to the rotor shaft 15, a stator coil 11 disposed on the outer periphery of the magnet rotor 12 and fixed to the mounting flange 3b', and a driven gear 16 fixed to the rotor shaft 15.

The rotor shaft 15 serving as a rotary shaft of the generating device 30 is disposed radially outward from the input shaft 3a of transmission 3 and the crankshaft 2a of engine 2.

Namely, the rotor shaft 15 is disposed eccentrically to the input shaft 3a of transmission 3 and the crankshaft 2a of engine 2.

The driving gear 3c fixed to the input shaft 3a meshes with the driven gear 16 of the generating unit U.

In the above generating device 30, the driving gear 3c of input shaft 3a meshes with the driven gear 16 of rotor shaft 15, so that the rotor shaft 15 is driven by rotation of the input shaft 3a.

The magnet rotor 12 is rotated with the rotor shaft 15 relative to the stator coil 11, thereby generating electricity.

In this case, only one rotor shaft 15 serves as the rotary shaft of the generating device 30 to be driven by the input shaft 3a. The gear ratio of the driven gear 16 on the rotor shaft 15 to the driving gear 3c on the input shaft 3a may be changed so as to change the rotational speed of rotor shaft 15 relative to the input shaft 3a, thereby optionally setting electricity generated by the generating device 30.

Therefore, the variation of engines 2 having different specifications to be connected to the transmission 3 can be enhanced.

Next, explanation will be given of a structure for cooling the generating device 10.

Figure 10:
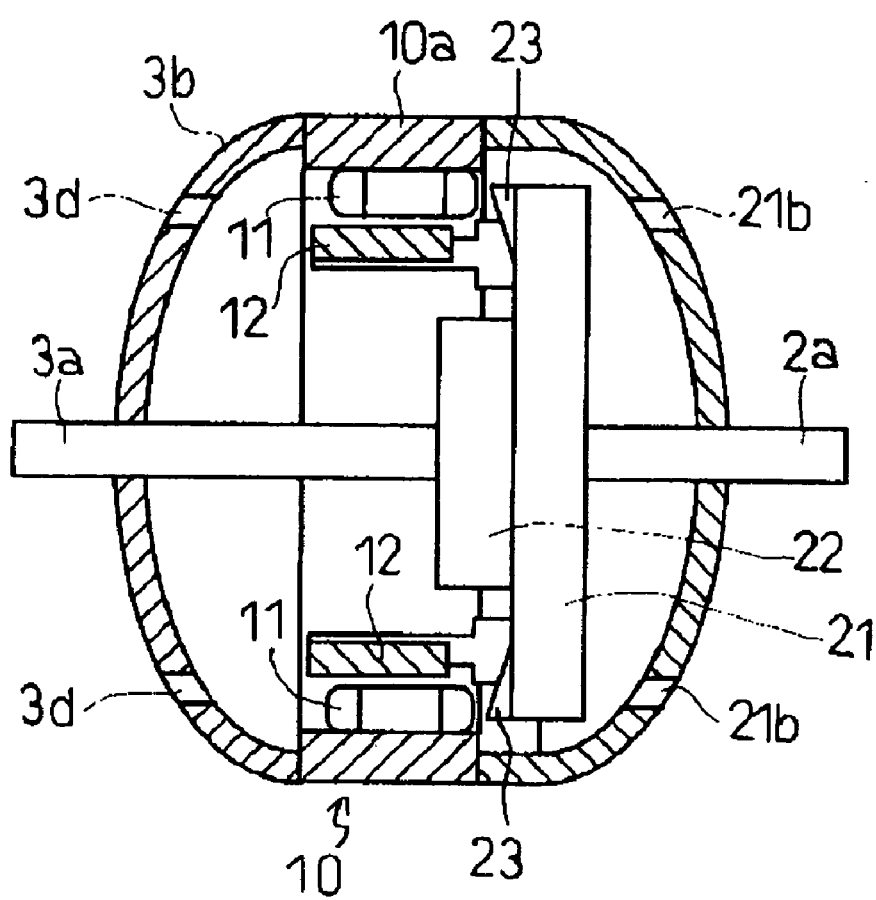
FIG. 10 is a sectional side view of an air-cooled electric power generating device.

If the generating device 10 is made to be air-cooled, a cooling fan 23 is provided in the flywheel 21 so as to cool the generating device 10, as shown in FIG. 10.

In this case, ventholes 21b and 3d are formed in the FW housing 21a and the mounting flange 3b, respectively.

Therefore, the cooling fan 23 is rotated by driving the engine 2 so as to introduce cooling air into the generating device 10 from the venthole 21b, and exhaust it outward from the venthole 3d after cooling the magnet rotor 12, the stator coils 11 and the like. Alternatively, the cooling fan 23 introduces cooling air into the generating device 10 from the venthole 3d, and exhausts it outward from the venthole 21b after cooling the magnet rotor 12, the stator coils 11 and the like. Accordingly, the generating device 10 can be efficiently cooled with the drive of engine 2.

In addition, the cooling structure can be compact.

Figure 11:
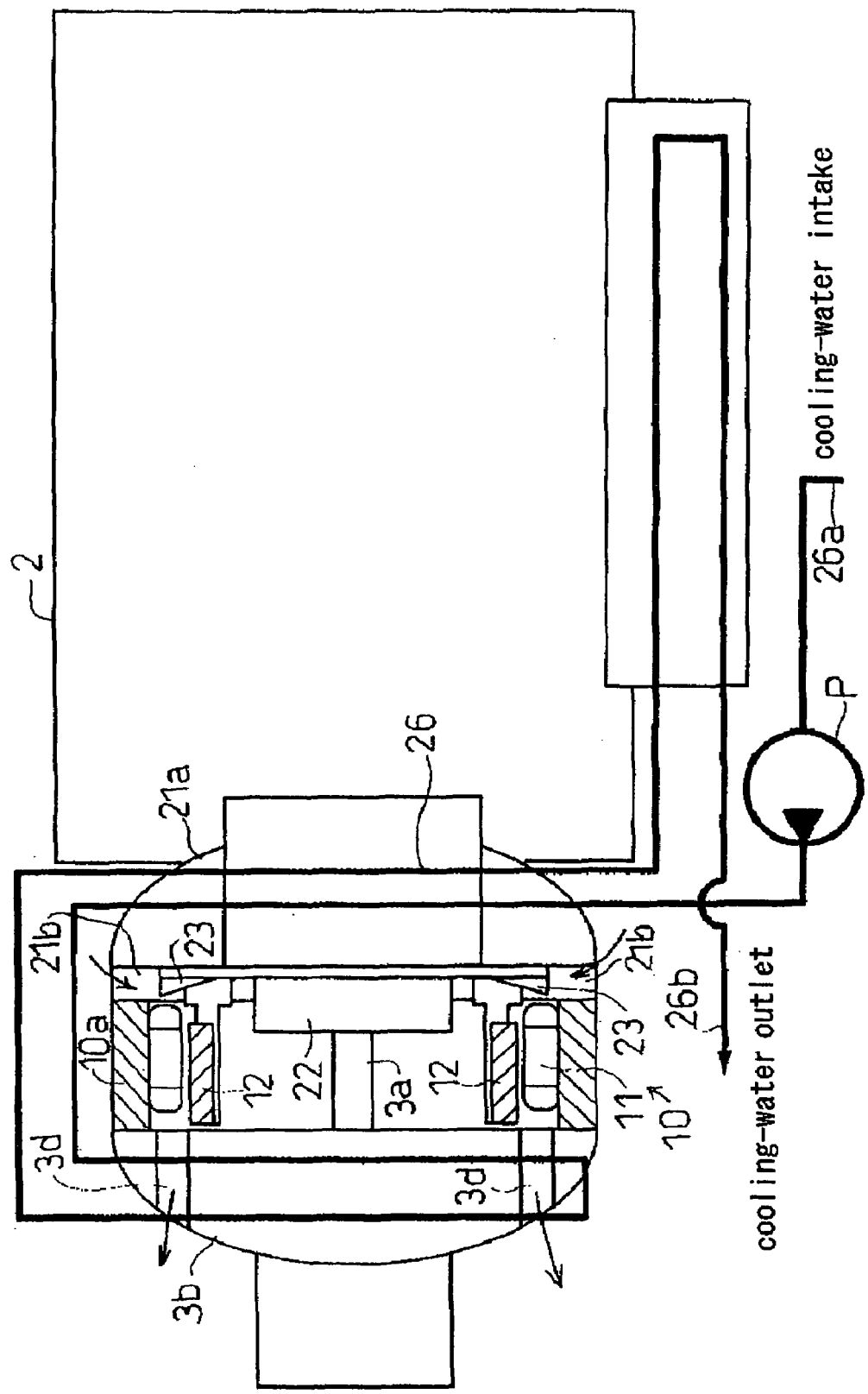
FIG. 11 is a systematic diagram of a water-cooled electric power generating device
provide with a cooling-water circuit introducing water from the outside of vessel.

Alternatively, the generating device 10 may be made water-cooled as follows:

The internal combustion engine 2 of the propelling machine 1 shown in FIG. 11 has a cooling-water circuit 26, and a pump P is provided near the cooling-water circuit 26.

The cooling-water circuit 26 is formed within the engine 2 and within or adjacent to the generating device 10 so as to cool the engine 2 and the generating device 10. In the present embodiment, the cooling-water circuit 26 for cooling the generating device 10 is installed inside the FW housing 21a and the mounting flange 3b of transmission 3 so as to be positioned near the generating device casing 10a where electric power is generated.

The pump P introduces seawater, lakewater, or other water existing outside the circuit into the cooling-water circuit 26 through a cooling-water intake 26a so as to provide it as cooling water.

At first, the cooling-water introduced into the cooling-water circuit 26 cools the inside of the FW housing 21a and the mounting flange 3b of transmission 3 which are positioned near the generating device 10, and then cools the engine 2. Afterward, it is exhausted outside the circuit from a cooling-water outlet 26b.

In this way, the cooling of the FW housing 21a and the mounting flange 3b of the transmission 3 near the generating device 10 results in cooling of the generating device 10, which is heated in its power generating process.

The generating device 10 is additionally provided with the air-cooling structure as show in FIG. 10, including the cooling fan 23 disposed in the flywheel 21, the venthole 21b formed in the FW housing 21a, and the venthole 3d formed in the mounting flange 3b.

Accordingly, cooling air is introduced into the generating device 10 from the venthole 3d, and exhausted outward therefrom through the venthole 21b after cooling the generating device 10.

Figure 12:
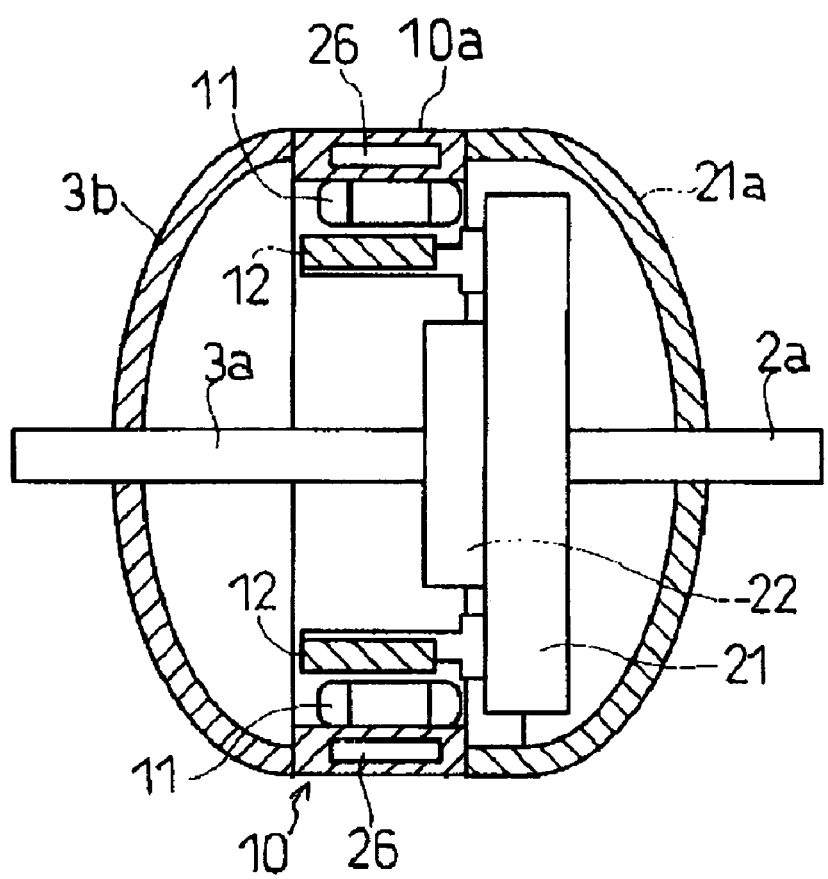
FIG. 12 is a sectional side view of a water-cooled electric power generating device
having a casing formed therein with a cooling-water circuit.

In the embodiment shown in FIG. 11, the cooling-water circuit 26 is disposed in the FW housing 21a and in the mounting flange 3b of transmission 3 so as to be adjacent to the generating device 10. Alternatively, the cooling-water circuit 26 may be directly formed inside the casing 10a of generating device 10, as shown in FIG. 12.

In this way, the cooling-water circuit 26 for cooling the internal combustion engine 2 is extended into or near the generating device 10 so as to cool the generating device 10 efficiently. In the generating device 10, power-generating elements such as the stator coil 11 and the magnet rotor 12 is prevented from being heated, thereby improving durability and reliability of the generating device 10 and the propelling machine 1.

Moreover, the cooling-water circuit 26, which introduced seawater, lakewater or other water as the cooling-water through the cooling-water intake 26a, can be made inexpensively and compactly while ensuring high cooling efficiency.

Figure 13:
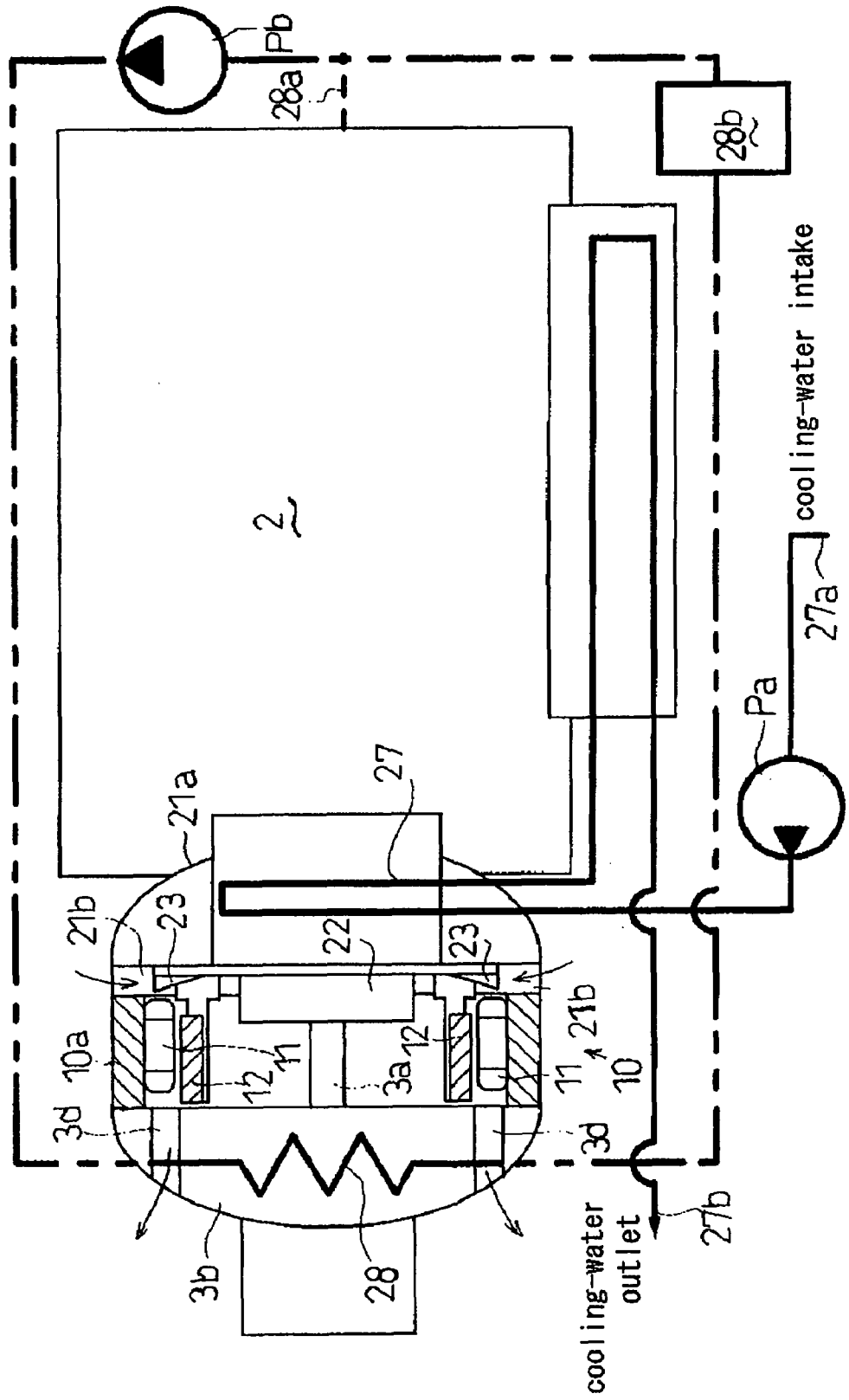
FIG. 13 is a systematic diagram of a water-cooled electric power generating device provided with a cooling-water circuit circulating water within a vessel.
Figure 14:
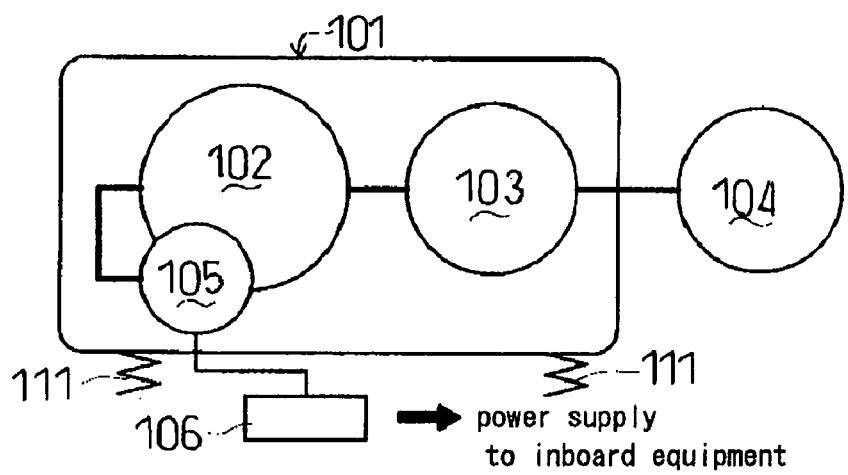
FIG. 14 is a general systematic diagram of a conventional vessel-propelling machine.
Figure 15:
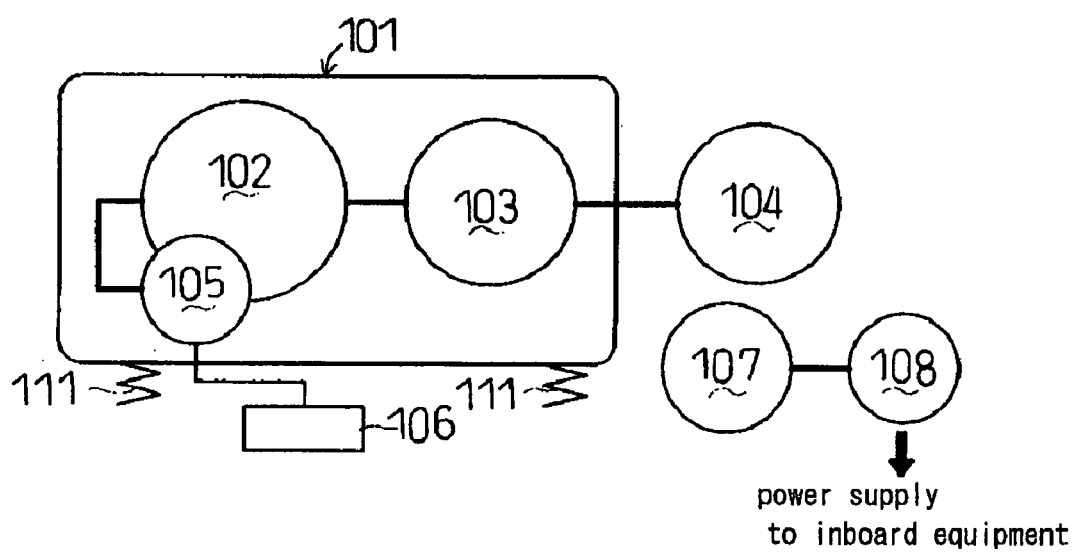
FIG. 15 is a general systematic diagram of a conventional vessel-propelling machine according to a second embodiment.
Figure 16:
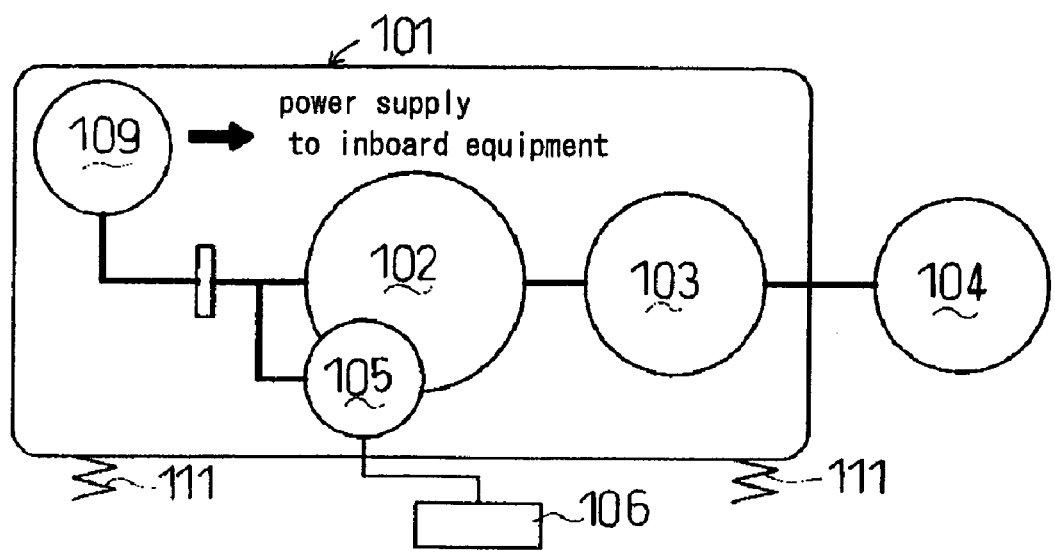
FIG. 16 is a general systematic diagram of a conventional vessel-propelling machine according to a third embodiment.

Alternatively, a structure for cooling the generating device 10 by water may be made as follows:

The internal combustion engine 2 of the propelling machine 1 shown in FIG. 13 is provided with a cooling-water circuit 27 including a cooling-water intake 27a and a pump P disposed near the cooling-water intake 27a.

The cooling-water circuit 27 is extended in the engine 2 and the flywheel housing 21a.

The pump P introduces seawater, lakewater, or other water existing outside the circuit into the cooling-water circuit 27 through the cooling-water intake 27a so as to supply it as cooling-water. The introduced cooling-water cools the FW housing 21a near the generating device 10 at first, and then cools the internal combustion engine 2. Subsequently, the cooling-water is exhausted outward from the circuit through a cooling-water outlet 27b.

Additionally, a fresh water circuit 28 is provided in the propelling machine 1. The fresh water circuit 28 is a closed circuit connected to an engine fresh water circuit 28a disposed inside the internal combustion engine 2. A pump Pb circulates fresh water as cooling-water in the fresh water circuit 28 and the engine fresh water circuit 28a.

The fresh water circuit 28 is passed through the mounting flange 3b of the transmission 3 so as to water-cool the mounting flange 3b, thereby cooling the power generating region in the generating device 10.

Moreover, a hot-water tank 28b is provided in the fresh water circuit 28 downstream of the mounting flange 3b, i.e., between the mounting flange 3b and a junction with the engine fresh water circuit 28a, so that the heated cooling-water, which passed through the mounting flange 3b so as to cool the generating device 10, is reserved in the hot-water tank 28b.

The cooling water reserved in the hot-water tank 28b is used for hot-water supply into the vessel or another purpose, thereby efficiently utilizing waste heat. This cooling structure is also compact while ensuring high cooling efficiency.

Some vessel-propelling machines will be described. Each of the vessel-propelling machines has an internal combustion engine for propelling to which an engine for generating electric power is unified. The propelling machine is provided with a casing having a water-draining structure for preventing corrosion and life degradation of a generator part so that its power generating device and cooling structure may be simple and inexpensive. Moreover, the propelling machine can be mounted to various vessels, and has an electric power generating device, which is economic while keeping required total capacity, and facilitates for easy assembling and wiring.

Figure 17:
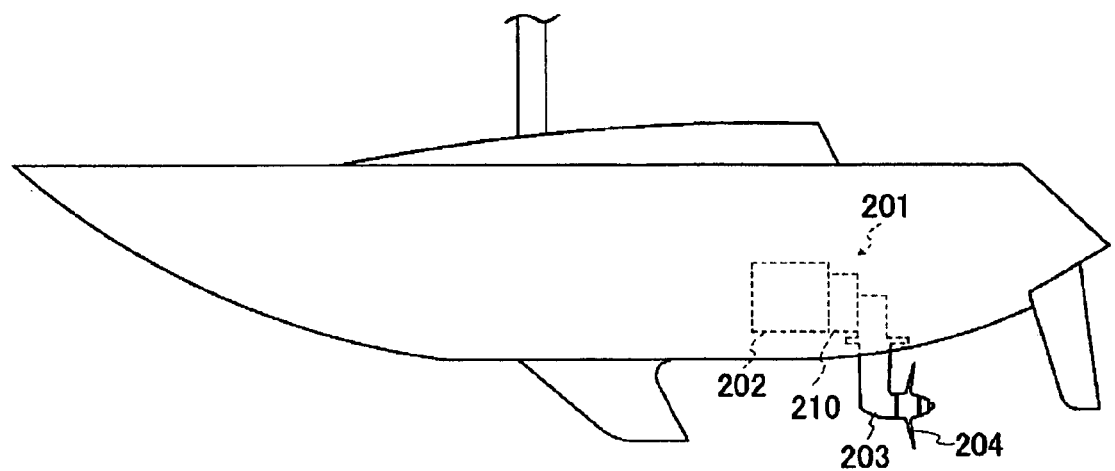
FIG. 17 is a schematic side view of a vessel having a sail-drive propelling machine.

As shown in FIG. 17, a vessel-propelling machine 201 comprises an internal combustion engine 202 and a transmission 203. A propeller 204 is connected to the transmission 203. The transmission 203 decelerates and transmits the driving force from the engine 202 to the propeller 204 so as to drive the propeller 204.

With regard to the propelling machine 201, an electric power generating device 210, which is a dynamo or another device having such function, is disposed between the engine 202 and the transmission 203. The generating device 210 is driven by the internal combustion engine 202 so as to generate electric power supplied to inboard equipments.

Figure 18:
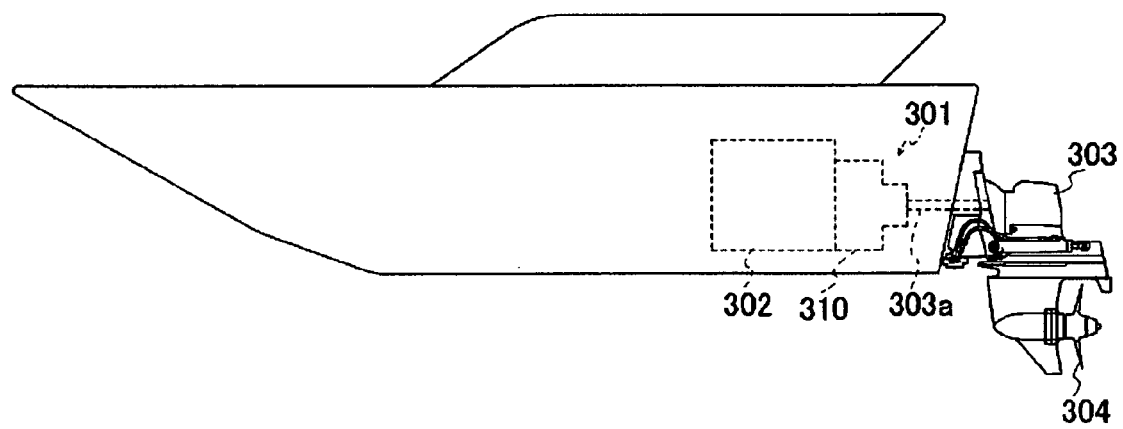
FIG. 18 is a schematic side view of a boat having a stern-drive propelling machine.

Referring to FIG. 17, a sail-drive propelling machine 201 serving as one type of the vessel-propelling machines has the transmission 203 extended largely below the engine 202 and the propeller 204 is directly attached to the transmission 203. Referring to FIG. 18, a stern-drive propelling machine 301 serving as another vessel-propelling machine has an internal combustion engine 302 and an electric power generating device 310, from which a power take-off shaft 303a transmits driving force to a transmission 303 directly attached to a propeller 304 and arranged behind a vessel.

Figure 19:
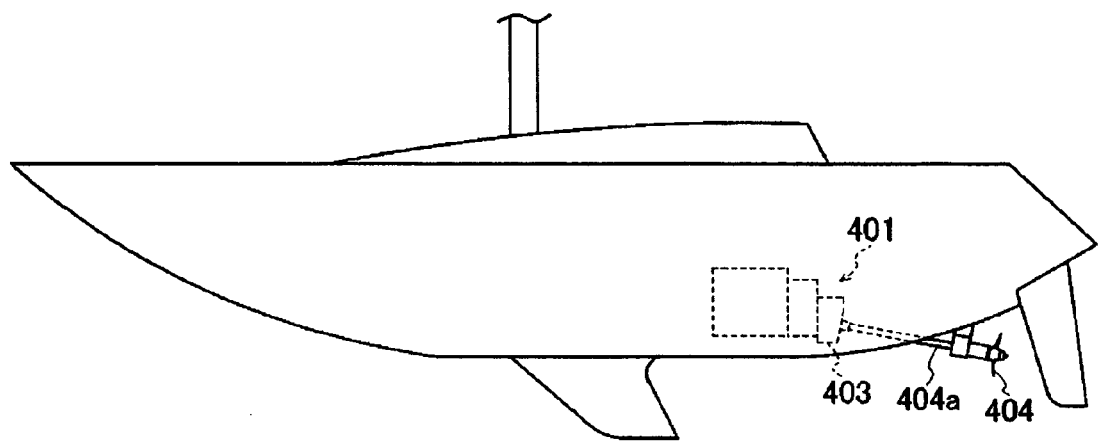
FIG. 19 is a schematic side view of a boat having a (angle type) marine-gear propelling machine.
Figure 20:
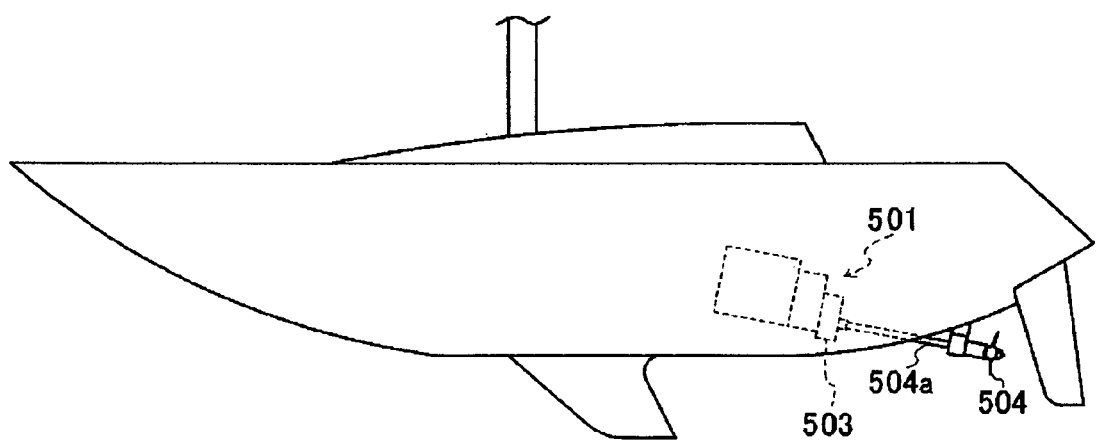
FIG. 20 is a schematic side view of a boat having a (parallel type) marine-gear propelling machine.

Referring to FIG. 19, a (angle type) marine-gear propelling machine 401 serving as another vessel-propelling machine has a transmission 403 from which a propeller shaft 404a with a propeller 404 is extended downwardly backward. Referring to FIG. 20, a (parallel type) marine-gear propelling machine 501 serving as another vessel-propelling machine has a transmission 503 from which a horizontal propeller shaft 504a with a propeller 504 is extended backward.

A sail-drive propelling machine 201 according to a first embodiment will now be described.

Figure 21:
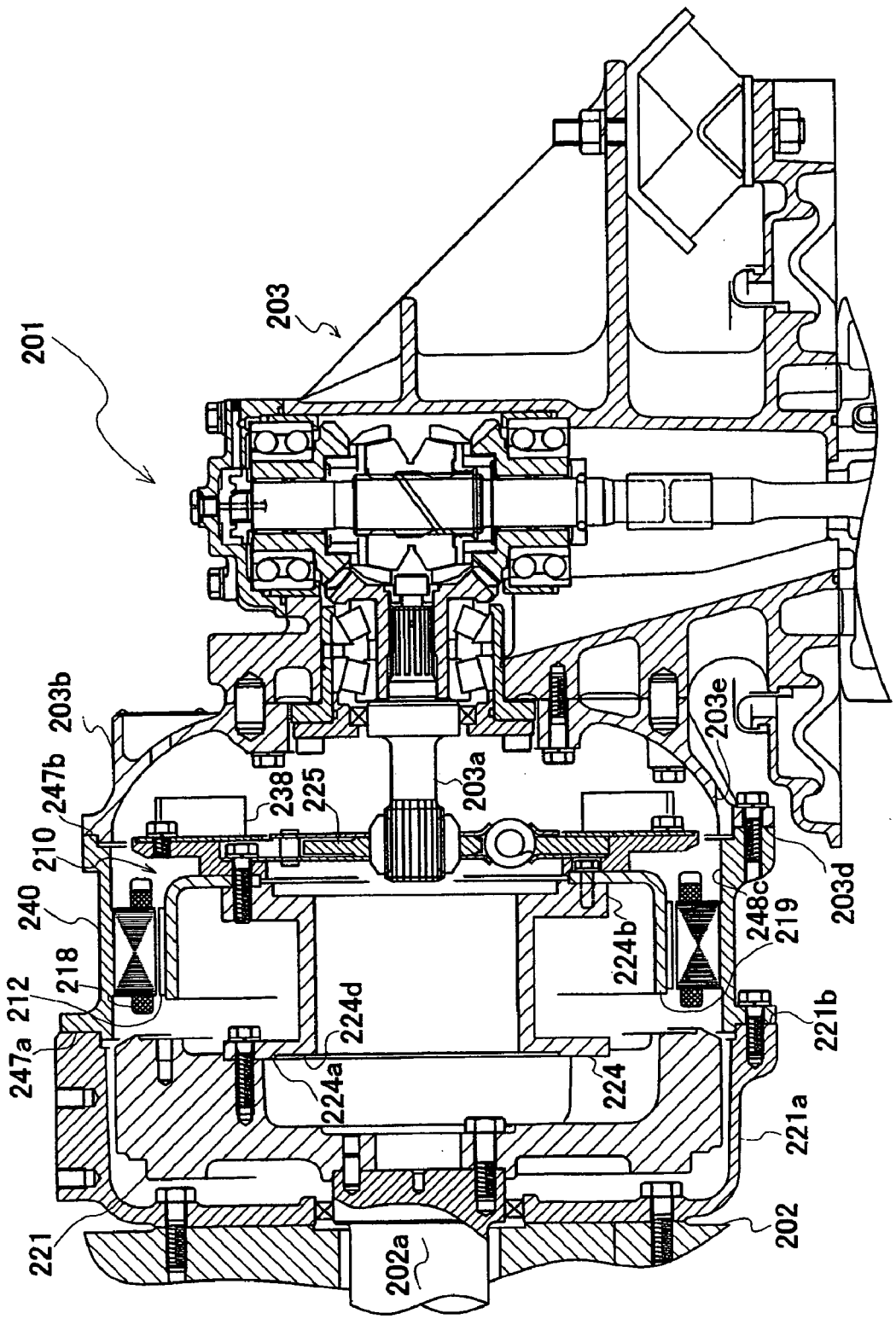
FIG. 21 is a sectional side view of a propelling machine according to a first embodiment.
Figure 22:
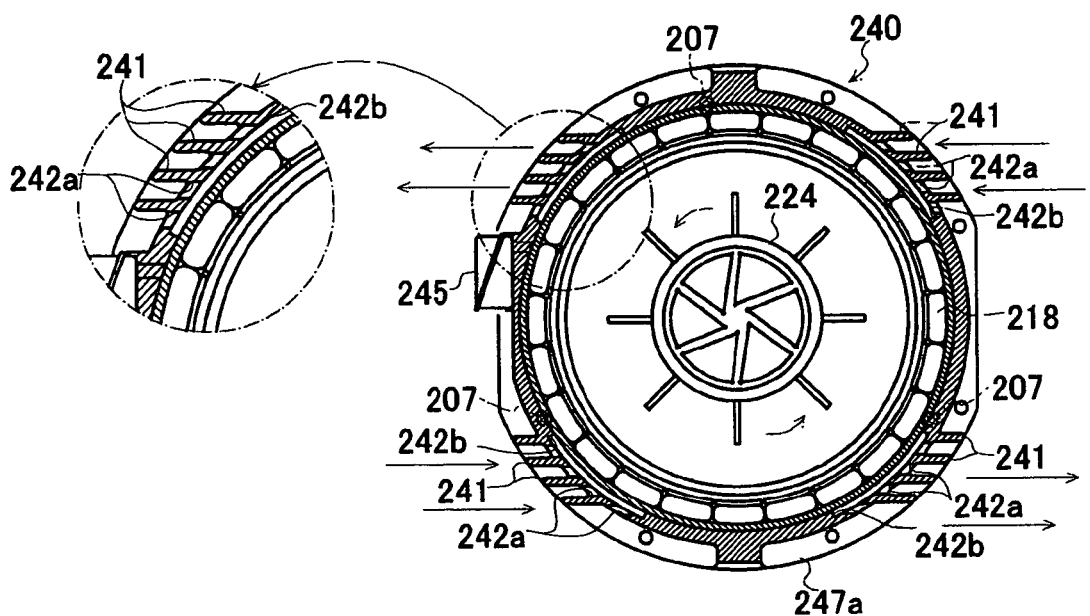
FIG. 22($a$) is a sectional view of a casing of an electric power generating device in the propelling machine according to the first embodiment.
Figure 22:
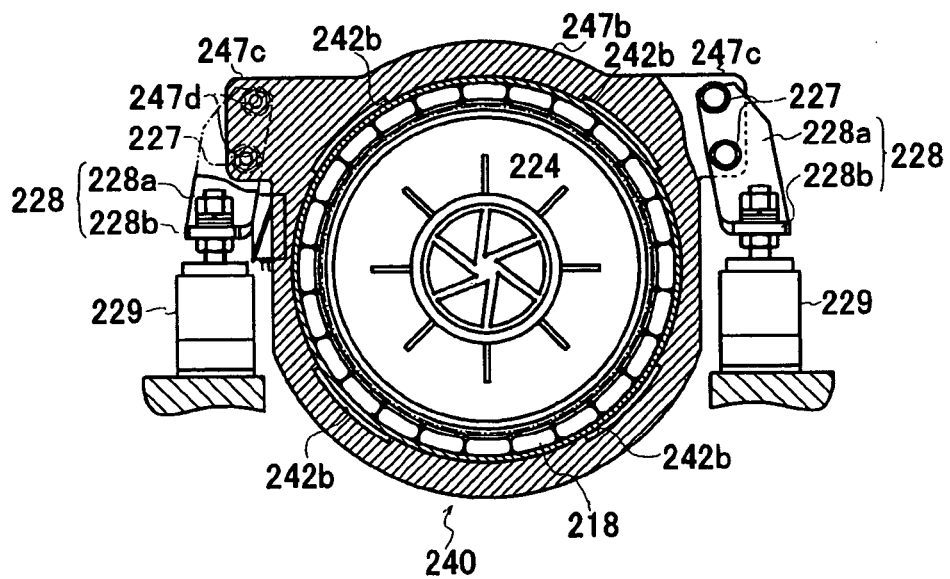

As shown in FIGS. 21 and 22, a flywheel 221 is disposed on one end of a crankshaft 202a of the internal combustion engine 202 so as to be rotated by the crankshaft 202a serving as an output shaft of the engine 202. The flywheel 221 is covered with a flywheel housing (hereinafter referred to as "FW housing") 221a.

A generating device casing 240 is attached to the rear portion of the FW housing 221a. Members constituting the generating device 210 are built in the generating device casing 240. Specifically, stator coils 218 are attached onto the inner peripheral surface of the generating device casing 240 and a magnet 212 is arranged radially inward of the stator coils 218 (toward the center). The magnet 212 is fixed to a distance piece 224, which is a rotary member, through a cylindrical attachment member 219. The magnet 212, the attachment member 219, and a flange part 224b of the distance piece 224 function as a rotor. The distance piece 224 is fixed to the flywheel 221 so that the magnet 212 can be rotated integrally with the distance piece 224 and the flywheel 221.

The stator coils 218 are fixed on the inner peripheral surface of the generating device casing 240 by bolts 207 so as to be arranged circlewise inside the generating device casing 240.

The magnet 212 is attached to the distance piece 224 through the attachment member 219 so as to be arranged radially inward of the stator coils 218.

The distance piece 224 is formed as a cylindrical hollow shaft, and flange parts 224a and 224b are integrally formed at the front and rear ends of the distance piece 224, respectively.

The front flange part 224a disposed at the front end of the distance piece 224 is attached to the flywheel 221 so that the distance piece 224 can be rotated integrally with the flywheel 221.

The attachment member 219 is fixed to the rear flange part 224b disposed on a side opposite to the flywheel 221. The magnet 212 is fixed to the distance piece 224 through the attachment number 219. The cylindrical member 219 is provided with the magnet 212 on its outer peripheral surface.

A mounting flange 203b of the transmission 203 can be attached to the generating device casing 240 on the side opposite to the FW housing 221a. The mounting flange 203b serving as a part of casing is attached to the generating device casing 240 so as to fix the transmission 203 to the engine 202.

The crankshaft 202a of the engine 202 also serves as a rotary shaft of the generating device 210, and the crankshaft 202a is arranged coaxially to an input shaft 203a of the transmission 203. Consequently, the rotary shaft of the generating device 210 is disposed coaxially with the crankshaft 202a and the input shaft 203a. When the mounting flange 203b is attached to the generating device casing 240, the input shaft 203a comes to be connected to the flywheel 221 through an elastic joint 225 so as to be rotated by the crankshaft 202a. The transmission 203 decelerates and transmits the driving force from the input shaft 203a to the propeller 204 (shown in FIG. 17), thereby rotating the propeller 204.

Cooling fans are provided to the generating device 210.

Figure 24:
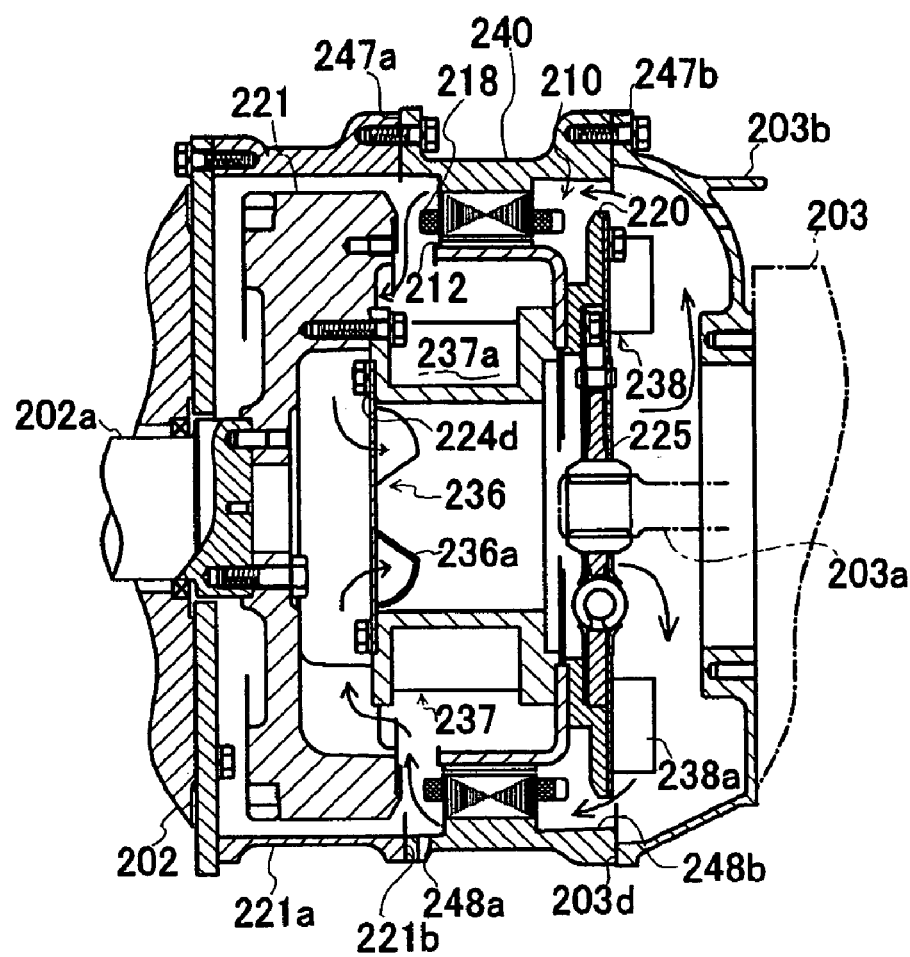
FIG. 24 is a sectional side view of the casing of the electric power generating device having a drain hole in the propelling machine of the first embodiment.

As shown in FIG. 24, fans 236, 237 and 238 are arranged at the front end, the outer peripheral surface and the back of the distance piece 224, respectively. The fans, which are provided at three positions in the present embodiment, may be alternatively provided at one or two optionally selected positions.

The first fan 236 is attached to the front end of the distance piece 224 (toward the flywheel).

The fan 236 is attached onto an attachment part 224d formed at the front flange part 224a of the distance piece 224. The attachment part 224d is an annular groove formed at the front end of the distance piece 224, into which the fan 236 can be fitted. Vanes 236a of the fan 236 are arranged inside the distance piece 224. The fan 236 is rotated integrally with the distance piece 224 so as to enhance the efficiency of cooling the generating device 210.

The second fan 237 is provided on the outer peripheral surface of the distance piece 224.

Vanes 237a are projected outward from the outer peripheral surface of the distance piece 224, thereby constituting the fan 237. The front end of the fan 237 is fixed to the rear surface of the front flange part 224a, and the rear end of the fan 237 is fixed to the front surface of the rear flange part 224b. Alternatively, the fan 237 may be formed integrally with the front flange part 224a and the rear flange part 224b.

The third fan 238 is arranged behind the distance piece 224.

The third fan 238 is fastened through a fixture member 220 to the distance piece 224 together with the attaching member 219 having the fixed magnet 212. The third fan 238 is arranged on the rear surface of the fixation member 220 and fixed to the distance piece 224 by bolts. Vanes 238a of the fan 238 are arranged behind the generating device 210. Therefore, the fixation member 220 and the third fan 238 are rotated integrally with the distance piece 224 so as to enhance the efficiency of cooling the generating device 210.

Accordingly, the cooling fans are within the generating device casing 240 so that air flows inside the generating device casing 240 as arrows drawn in FIG. 24 so as to ensure high cooling efficiency.

A reshaped electric power generating device will be described.

Figure 25:
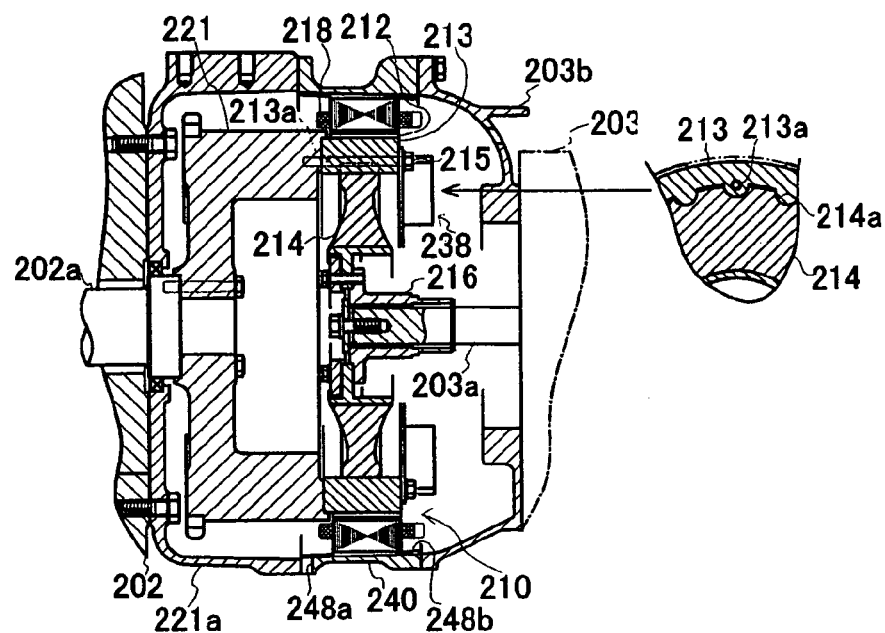
FIG. 25 is a sectional side view of another electric power generating device in the propelling machine of the first embodiment.

The reshaped electric power generating device 210 has a rotary member using an elastic member and a flange. As shown in FIG. 25, the generating device casing 240 is attached to the rear part of the FW housing 221a, and members constituting the generating device 210 are built in the generating device casing 240.

The stator coils 218 are attached to the inner peripheral surface of the generating device casing 240, and the magnet 212 is disposed radially inward of the stator coils 218 (toward the center). The magnet 212 is fixed onto an outer ring 213 fixed to the flywheel 221. An elastic member 214 is fixed to a flange 216. The outer ring 213, the elastic member 214 and the flange 216 are integrally rotatable. The elastic member 214 is ring-shaped when viewed in sectional rear and has reentrants 214a along its outer periphery.

The elastic member 214 has an I-like shaped part when viewed in side integrally fixed therein. The flange 216 is connected to the input shaft 203a of the transmission 203.

Within the outer ring 213 are provided boltholes 213a in the longitudinal direction. Bolts 215 are passed through the respective boltholes 213a and screwed into the flywheel 221 so as to fix the flywheel 221 to the outer ring 213. Therefore, the flywheel 221 rotates the magnet 212 through the outer ring 213, the elastic body 214 and the flange 216, and is connected to the input shaft 203a so as to drive the input shaft 203a by the crankshaft 202a. The transmission 203 decelerates and transmits the driving force from the input shaft 203a to the propeller 204 (shown in FIG. 17), thereby driving the propeller 204.

The third fan 238 disposed behind the outer ring 213 is fixed to the outer ring 213 by the bolts 215 fixing the outer ring 213 to the flywheel 221.

The fan 238 for cooling the generating device 210 further efficiently cools the interior of the generating device casing 240. Furthermore, the bolts 215 fixing the outer ring 213 to the flywheel 221 are also used for fixing the fan 238 to the outer ring 213, thereby reducing the number of bolts.

The remains are constructed substantially similar to those of the above-mentioned generating device.

Figure 26:
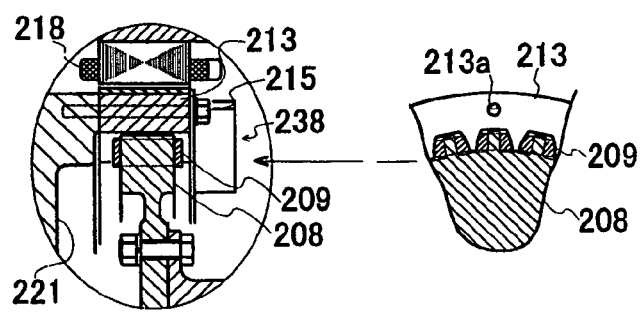
FIG. 26 is a sectional side view of another electric power generating device in the propelling machine of the first embodiment.

Alternatively, as shown in FIG. 26, a flange 208 may be fixed onto the input shaft 203a of the transmission 203 and a plurality of elastic members 209 may project radially from the outer peripheral surface of the flange 208.

The elastic member 214 with the flange 216 serving as a rotary member prevents the transmission 203 from vibration when transmitting driving force from the engine 202 to the transmission 203, thereby reducing the noise caused by gears in the transmission 203.

The generating device casing 240 of the propelling machine 201 will be described.

Figure 23:
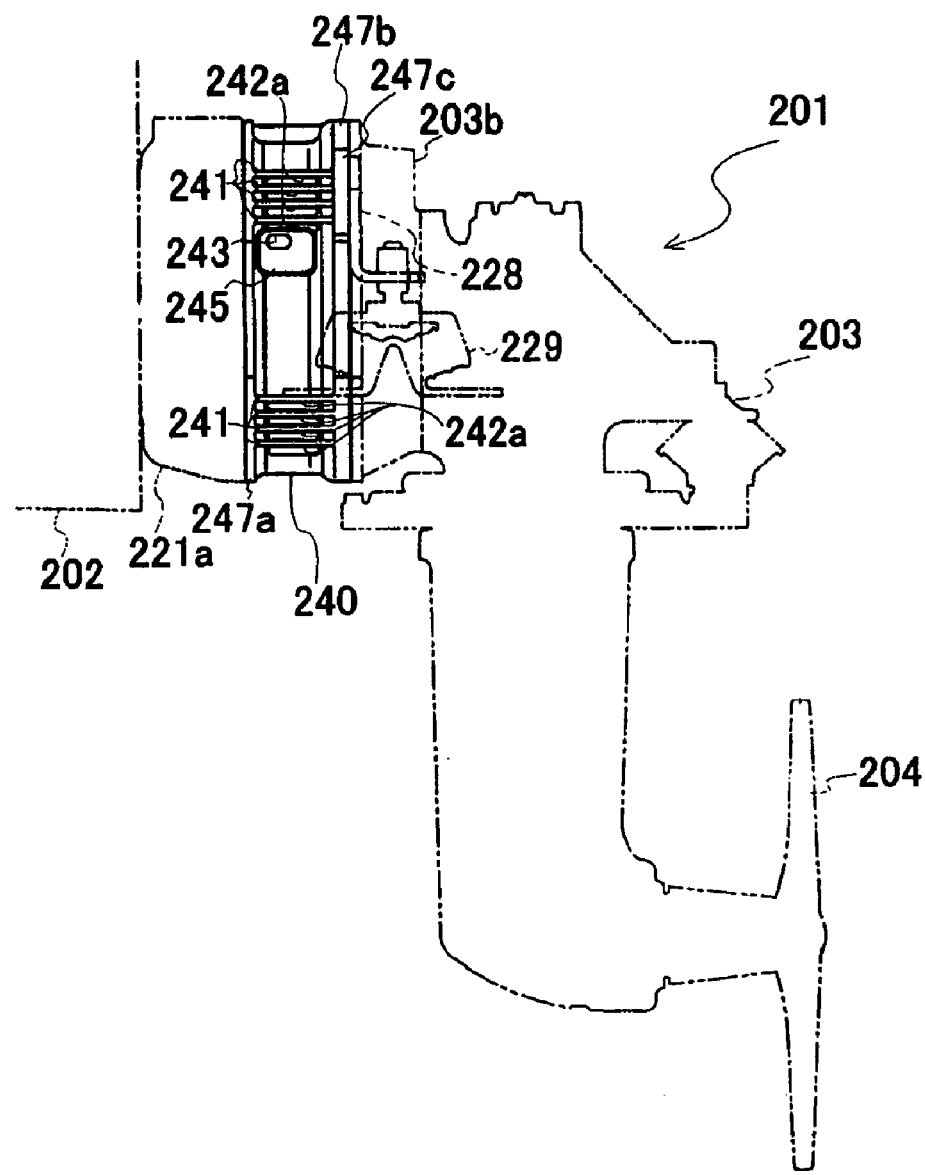
FIG. 23 is a side view of the propelling machine of the first embodiment.

As shown in FIGS. 22 and 23, the generating device casing 240 is formed cylindrical and the stator coils 218 are attached onto the inner side of the generating device casing 240 through the bolts 207.

A front flange part 247a and a rear flange part 247b project (in all radial directions) outward from the front and rear portions of the generating device casing 240, respectively, so as to serve as parts of the generating device casing 240 to be fixed to the FW housing 221a and the mounting flange 203b.

Fins 241 or ribs are provided on the outer peripheral surface of the generating device casing 240 and arranged substantially in parallel to the crankshaft 202a. Holes 242a are provided under the fins 241 or the ribs on the outer peripheral surface of the generating device casing 240, and arranged substantially in parallel to the fins 241 or ribs.

With regard to the present embodiment, as shown in FIGS. 22 and 23, the fins 241 are formed on the outer peripheral surface of the generating device casing 240.

The fins 241 project substantially horizontally outward from the outer peripheral surface of the generating device casing 240. When viewed in rear, four portions, i.e., upper left, lower left, upper right and lower right portions are provided on the generating device casing 240, and four fins 241 are formed on each of the four portions.

The front ends of the fins 241 are fixed to the rear surface of the front flange part 247a, and the rear ends thereof are fixed to the front surface of the rear flange part 247b. The fins 241 may be formed integrally with the front flange part 247a and the rear flange part 247b.

The fins 241 or ribs provide on the outer peripheral surface of the generating device casing 240 can radiate heat from the generating device casing 240 nearest to the generating device 210 so as to enhance cooling efficiency. The fins 241 on the generating device casing 240 also reinforce the generating device casing 240.

The holes 242a are formed on the generating device casing 240 under the respective fins 241. The holes 242a are longitudinally elongated, and kept substantially flat or directed rather downward. Namely, the holes 242a are provided between the fins 241 and under the lowest fin 241.

Similar to the fins 241, four holes 242a are formed on each of the four portions, i.e., the upper left, lower left, upper right and lower right portions of the generating device casing 240, which appear fully when viewed in rear.

Reentrants 242b are partially formed on the inner peripheral surface of the generating device casing 240 incorporating the stator coils 218 so as to pass air therethrough between front and rear chambers in the generating device casing 240 divided by the stator coils 218. The reentrants 242b are arranged near the holes 242a. More specifically, the reentrants 242b are distributed to the four portions, i.e., the upper left, lower left, upper right and lower right portions of the generating device casing 240, which appear fully when viewed in rear, so as to be connected to the holes 242a. In spite of the stator coils 240, the reentrants 242b formed on the inner peripheral surface of the generating device casing 240 let air flow freely in the generating device casing 240. Furthermore, the reentrants 242b make gaps between the stator coils 218 and the generating device casing 240, so that air in the generating device casing 240 can be sent to the outside thereof and the outside air can be sent into the generating device casing 240 through the gaps and the holes 242a, whereby cooling efficiency can be enhanced.

For example, when the distance piece 224 is rotated counterclockwise in rear view as shown in FIG. 22(a), the open air is inhaled into the generating device 240 through the gaps at the upper right and lower left portions of the generating device casing 240, and discharged from the gaps at the upper left and lower right portions of the generating device casing 240, as drawn by arrows. When the distance piece 224 is rotated clockwise in rear view, the open air is inhaled into the generating device 240 through the gaps at the upper left and lower right portions of the generating device casing 240, and discharged from the gaps at the upper right and lower left portions of the generating device casing 240.

The holes 242a on the outer peripheral surface of the generating device casing 240 further enhances the efficiency of cooling the electric power generating device therein. Since the holes 242a are formed just under the respective fins 241 so as to prevent infall of vertically dropping water. Furthermore, the holes 242a substantially in parallel to the fins 241 are also substantially in parallel to the crankshaft 202a, thereby enhancing circulation of the cooling air so as to ensure high cooling efficiency.

The front flange part 247a coincides in size or shape with an input side attachment part 203d of the mounting flange 203b. The rear flange part 247b coincides in size or shape with an output side attachment part 221b of the FW housing 221a.

Namely, the end face of the output side attachment part 221b of the FW housing 221a and the end surface of the front flange part 247a of the generating device casing 240 are substantially similarly shaped so as to fit each other to be joined. The end face of the rear flange part 247b of the generating device casing 240 and the end surface of the input side attachment part 203d of the mounting flange 203b are substantially similarly shaped so as to fit each other to be joined. The output side attachment part 221b of the FW housing 221a and the input side attachment part 203d of the mounting flange 203b can be joined to each other without the generating device 210.

Therefore, whether the generating device 210 is applied or not, the same mounting flange 203b and FW housing 221a can be used without modification, thereby reducing a parts count.

Moreover, due to this construction, tandem generating devices 210 corresponding to a use requiring a large electric output power can be disposed without increasing parts.

The propelling machine 201 having the tandem generating devices 210 will now be described.

Figure 27:
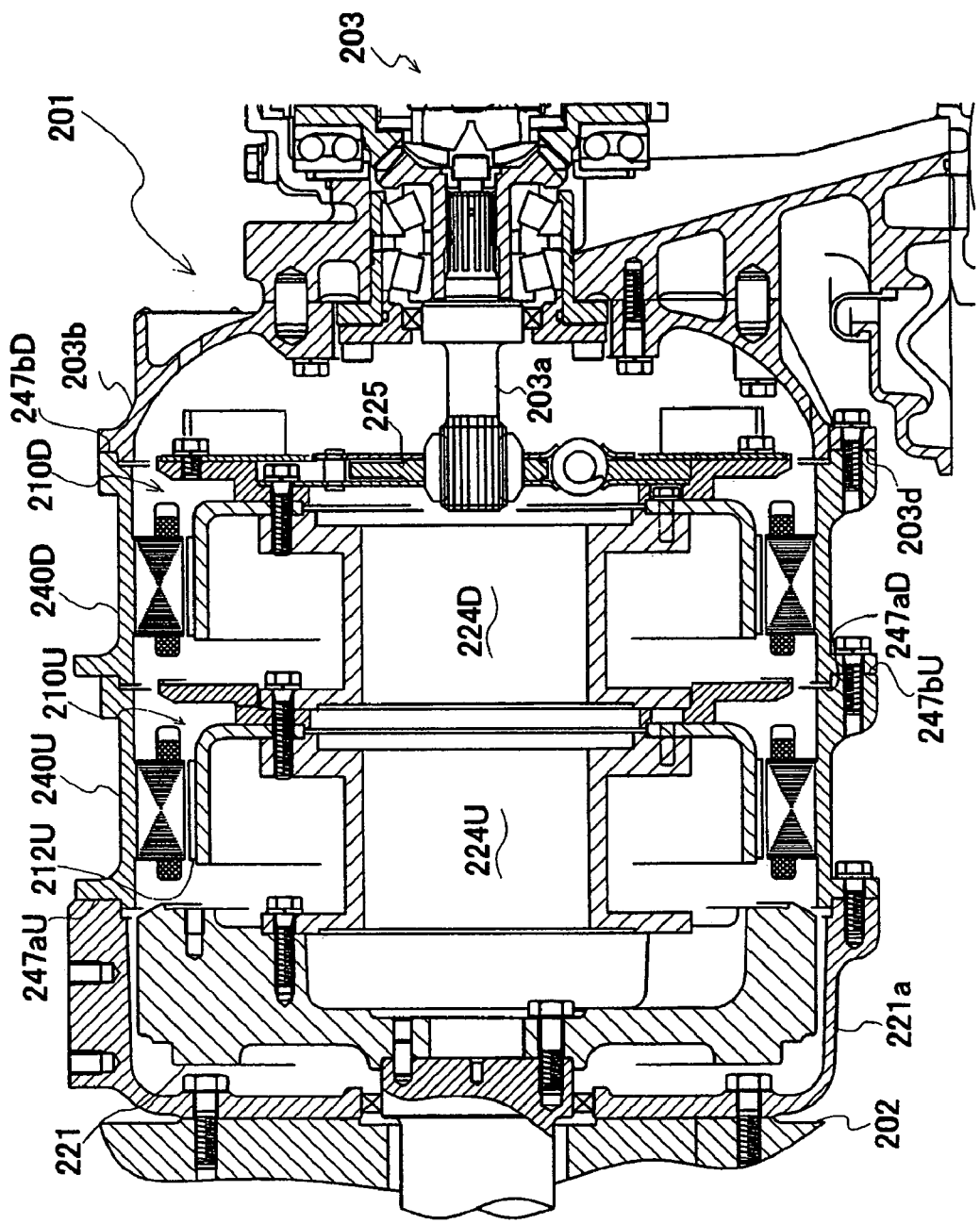
FIG. 27 is a sectional side view of a propelling machine having a plurality of electric power generating devices.

As shown in FIG. 27, two generating devices 210U and 210D are disposed between the internal combustion engine 202 and the transmission 203.

A distance piece 224U of the upstream generating device 210U is fixed to the flywheel 221, and a distance piece 224D of the downstream generating device 210D is fixed to the distance piece 224U.

The downstream distance piece 224D is fixed to the upstream distance piece 224U by bolts 226 for fastening a magnet rotor 212U to the upstream distance piece 224U without requiring additional parts, thereby saving a parts count.

The downstream distance piece 224D is connected to the input shaft 203a of transmission 203 through the elastic joint 225. Power from the flywheel 221 is transferred to the distance pieces 224U and 224D so as to generate electric power, and transferred to the transmission 203 through the distance pieces 224U and 224D.

The generating devices 210U and 210D are enclosed in the generating device casings 240U and 240D, respectively.

A front flange part 247aU of the upstream generating device casing 240U is fixed to the output side attachment part 221b of FW housing 221a, and a rear flange part 247bU thereof to a front flange part 247aD of the downstream generating device casing 240D. A rear flange part 247bD of the downstream generating device casing 240D is fixed to the input side attachment part 203d of mounting flange 203b. Consequently, the engine 202, the generating devices 210U and 210D, and the transmission 203 are integrally fitted together.

The front flange part 247a coincides in size and shape with the input side attachment part 203d of mounting flange 203b, and the rear flange part 247b with the output side attachment part 221b of FW housing 221a.

Accordingly, even if a plurality of tandem generating devices are interposed, the same generating device casings 240, mounting flange 203b and FW housing 221a can be used, thereby saving a parts count.

In this way, a plurality of tandem electric power generating devices can be easily detachably disposed between the internal combustion engine and the transmission without increasing parts or changing the specification, thereby saving a parts count.

A drain hole 248a is provided at the lower portion of the generating device casing 240.

Figure 28:
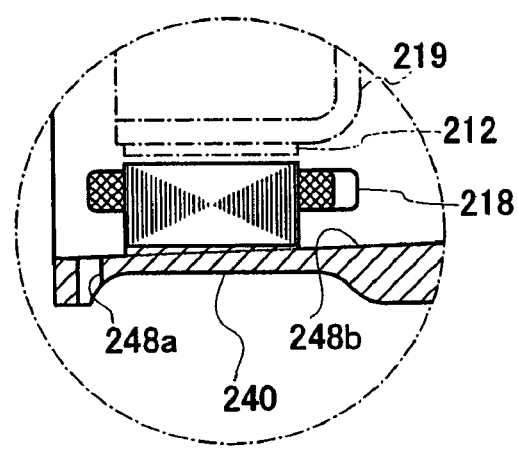
FIG. 28 is a partial macrograph of the casing of the electric power generating device, having the drain hole, in the propelling machine of the first embodiment.
Figure 29:
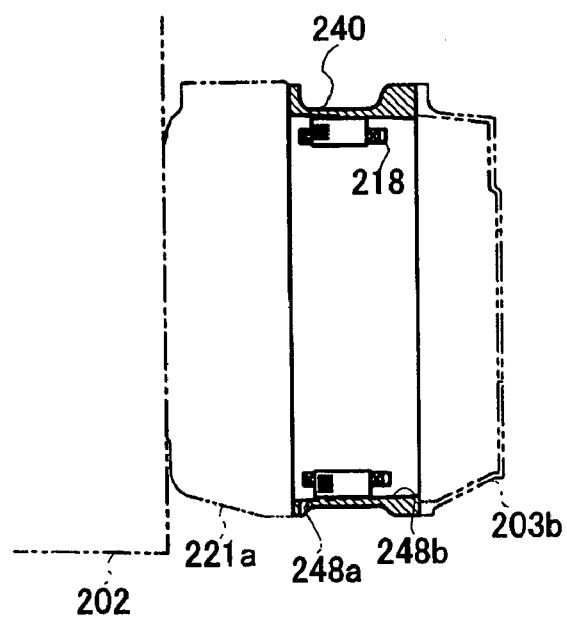
FIG. 29 is a side view of the casing.

As shown in FIGS. 24, 28 and 29, the generating device casing 240 is made by casting, and its inside is tapered by drafting a core. The drain hole 248a is provided at the lower side of this taper 248b in the bottom portion of the generating device casing 240.

With regard to the present embodiment, the taper 248b is so made that the front side of generating device casing 240 (toward the engine) is open wider than the rear side thereof (toward the transmission). Therefore, the drain hole 248a is formed vertically through the front lower portion of the generating device casing 240.

The drain hole 248a formed through the lower portion of generating device casing 240 can drain water caused by dew condensation or another reason from the inside of the generating device casing 240. The taper 248b formed by drafting a core is used for letting water flow more efficiently.

Alternatively, a hole 203e (shown in FIGS. 21, 30 and 31) may be formed within the mounting flange 203b so as to drain water caused by dew condensation or the like in the generating device casing 240.

Figure 30:
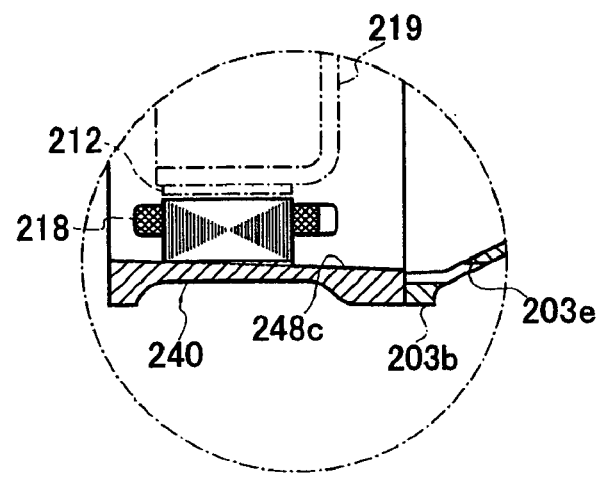
FIG. 30 is a partial macrograph of the casing of the electric power generating device, having a reshaped drain hole, in the propelling machine of the first embodiment.
Figure 31:
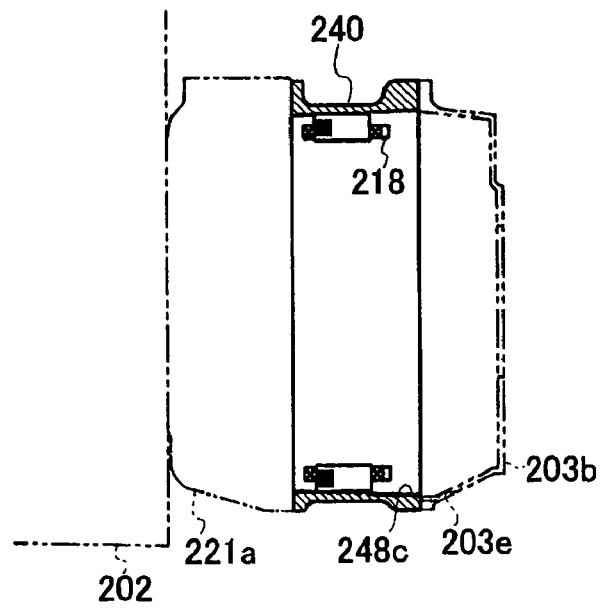
FIG. 31 is a side view of the casing.

The generating device casing 240 shown in FIGS. 21, 30 and 31 has a taper 248c so as to make the rear side of generating device casing 240 (toward the transmission) open wider than the rear side thereof (toward the engine). Namely, the taper 248a in the bottom portion of generating device casing 204 is lowered toward the mounting flange 203b.

The drain hole 203e is formed within the bottom portion of mounting flange 203b arranged on the lower side of the bottom portion of generating device casing 240. The drain hole 203e is formed along the taper 248c of the generating device casing 240 in the longitudinal direction of the mounting flange 203b.

The undersurface of the drain hole 203e is positioned lower than the taper 248c of the generating device casing 240.

Due to this construction, water inside the generating device casing 240 produced by dew condensation or another reason can be drained. The taper 248b or 248c formed by drafting a casting core can be effectively utilized for draining water.

An arrangement of mounting the propelling machine onto a vessel body will be described in accordance with FIGS. 22, 32 to 36.

Mounting legs 228 for mounting the propelling machine 201 onto a vessel body are attached onto the outer peripheral surface of the generating device casing 240. In another way, attachment portions, to which mounting legs 228 for mounting the propelling machine 201 onto a vessel body are attached, are formed on the outer peripheral surface of the generating device casing 240.

To mount the propelling machine 201 onto a vessel body, a mounting leg is attached to either the internal combustion engine 202 or the transmission 203, and the mounting legs 228 are also attached to the generating device casing 240.

An arrangement of the mounting legs 228 attached to the generating device casing 240 will be described.

Figure 32:
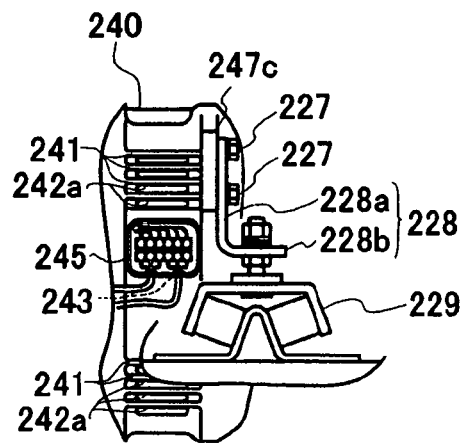
FIG. 32 is a side view of the propelling machine of the first embodiment installed with a leg.
Figure 33:
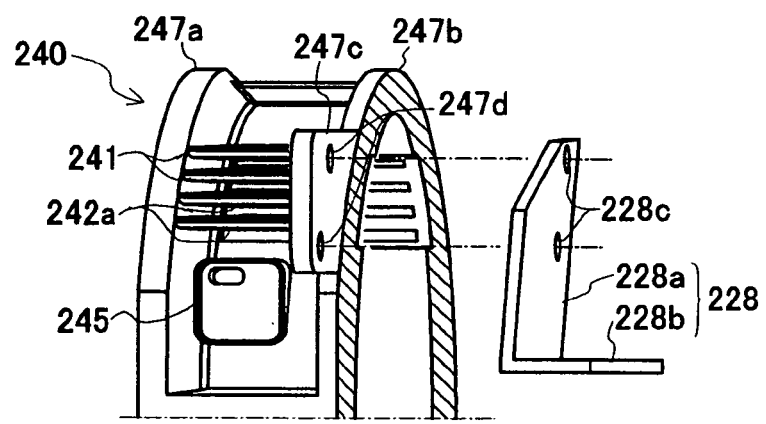
FIG. 33 is a perspective view of the above.

As shown in FIGS. 22, 32 and 33, two attachment stays 247c are formed at left and right upper portions of the rear flange part 247b, and the mounting legs 228 are attached onto the respective attachment stays 247c. The mounting legs 228 are disposed between a vibration proof member 229 provided in a vessel body and the propelling machine 201 so as to mount the propelling machine 201 onto the vessel body.

The attachment stays 247c are positioned behind the fins 241 and the holes 242a arranged at the right and left upper portions of the generating device casing 240.

The plate-like attachment stays 247c integrally project laterally outward from the outer peripheral surface of the rear flange part 247b.

Two holes 247d are formed in each of the attachment stays 247c. Bolts 227 fix the mounting legs 228 to the holes 247d.

Each of the mounting legs 228 is L-like shaped when viewed in side, and comprises a vertical part 228a and a horizontal part 228b. The holes 228c are formed in the vertical part 228a. The vibration proof member 229 is attached to the horizontal part 228b. The mounting legs 228 are arranged to coincide their holes 228c with the respective holes 247d, and the bolts 227 are screwed into the holes, so that the mounting legs 228 are fixed at their vertical parts 228a to the generating device casing 240. The horizontal parts 228b are fixed to the vibration proof members 229, whereby the generating device casing 240 is fixed through the mounting legs 228 onto the vessel body.

In this way, the mounting legs 228 can be attached to the generating device casing 240 in addition to the mounting legs, which are provided on the engine 202 or the transmission 203 to be used when the electric power generating device is not mounted. Therefore, some methods for mounting the propelling machine onto a vessel body are prepared corresponding to various kinds of vessel. Any method can be selected corresponding to conditions of a target vessel (specification and structure of the engine or the vessel itself, etc.) so that the propelling machine can be easily mounted onto the vessel. The propelling machine can be firmly settled by increasing mounting fixation parts.

Figure 34:
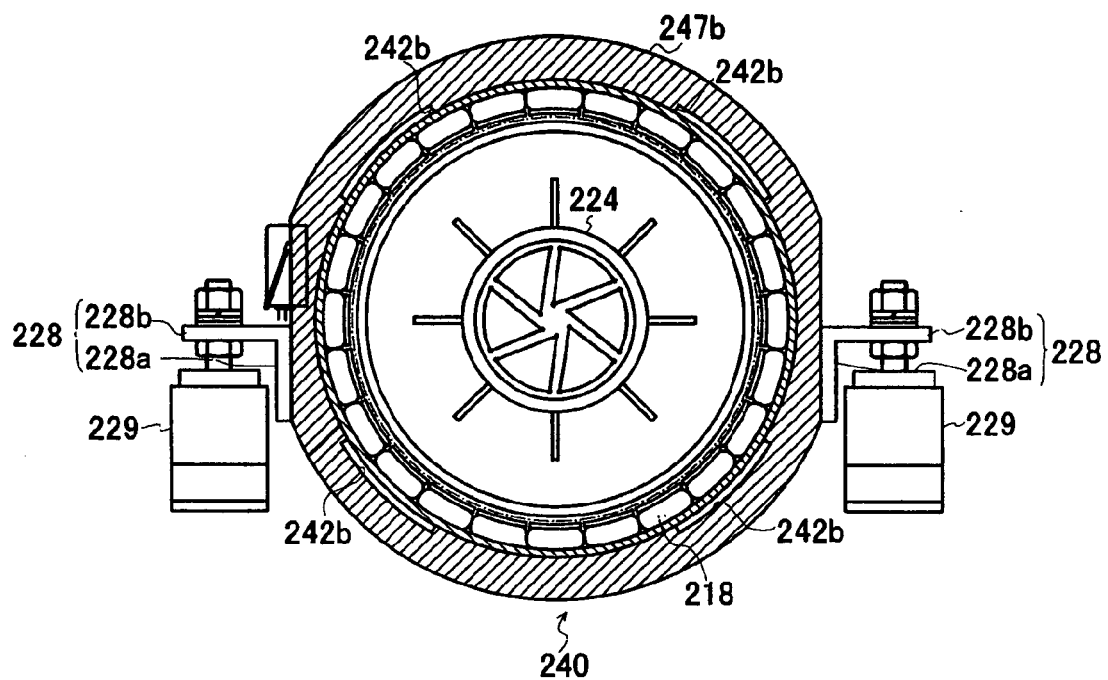
FIG. 34 is a rear view of the propelling machine of the first embodiment installed with other legs.
Figure 35:
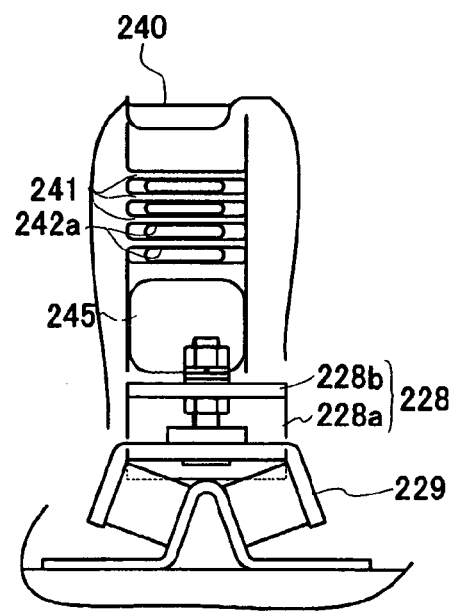
FIG. 35 is a side view of the above.
Figure 36:
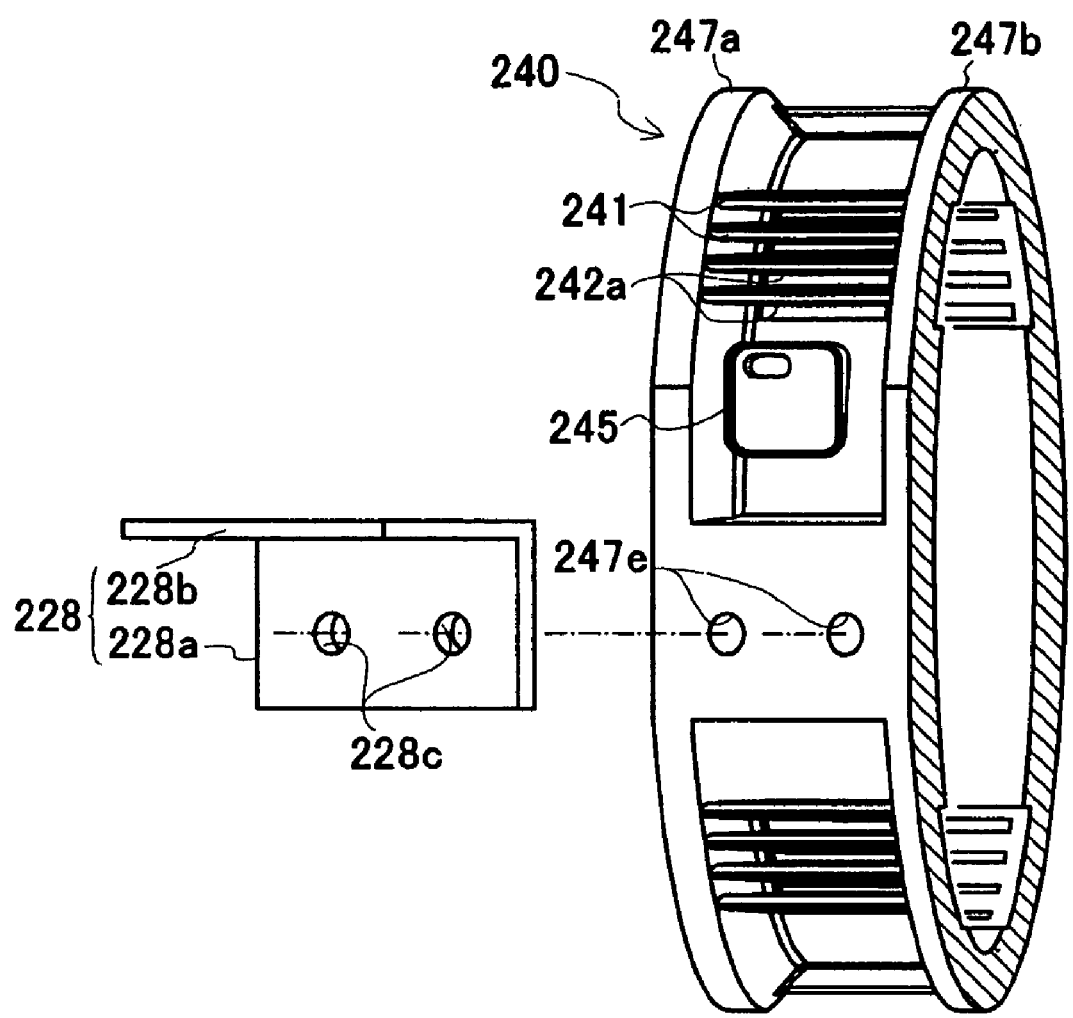
FIG. 36 is a perspective view of the above.

An alternative arrangement of mounting the propelling machine onto a vessel body will be described in accordance with FIGS. 34 to 36.

The generating device casing 240 is formed with four holes 247e, which are open at the outer peripheral surface of the casing 240 so as to serve as portions to be attached to a vessel body, thereby facilitating for attaching mounting legs

228. The mounting legs 228 are disposed between the vibration proof members 229 and the propelling machine 201 so as to mount the propelling machine 201 onto a vessel body.

The generating device casing 240 is provided with four lateral holes 247e, which are distributed by twos into the left and right side surfaces thereof. The two holes 247e on each of the left and right side surfaces of generating device casing 240 are aligned before and behind. The mounting legs 228 are fixed to the holes 247e by bolts.

Each of the mounting legs 228 is L-like shaped when viewed in front so as to comprise a vertical part 228a and a horizontal part 228b. The vertical part 228a has two holes 228c, and the horizontal part 228b is attached to the vibration proof member 229. The mounting legs 228 are arranged to coincide their holes 228c with the respective holes 247d, and the bolts 227 are screwed into the holes, so that the mounting legs 228 are fixed at their vertical parts 228a to the generating device casing 240. The horizontal parts 228b are fixed to the vibration proof members 229, whereby the generating device casing 240 is fixed through the mounting legs 228 onto the vessel body.

Similarly to the above-mentioned arrangement, the mounting legs 228 in this arrangement can be attached to the generating device casing 240 in addition to the mounting legs, which are provided on the engine 202 or the transmission 203 to be used when the electric power generating device is not mounted. Therefore, some methods for mounting the propelling machine onto a vessel body are prepared corresponding to various kinds of vessel. Any method can be selected corresponding to conditions of a target vessel so that the propelling machine can be easily mounted onto the vessel. The propelling machine can be firmly settled by increasing mounting fixation parts.

A construction for supplying electric power form the generating device 210 to inboard equipments will be described.

Output electric power of the generating device 210 is used for inboard equipments.

Figure 37:
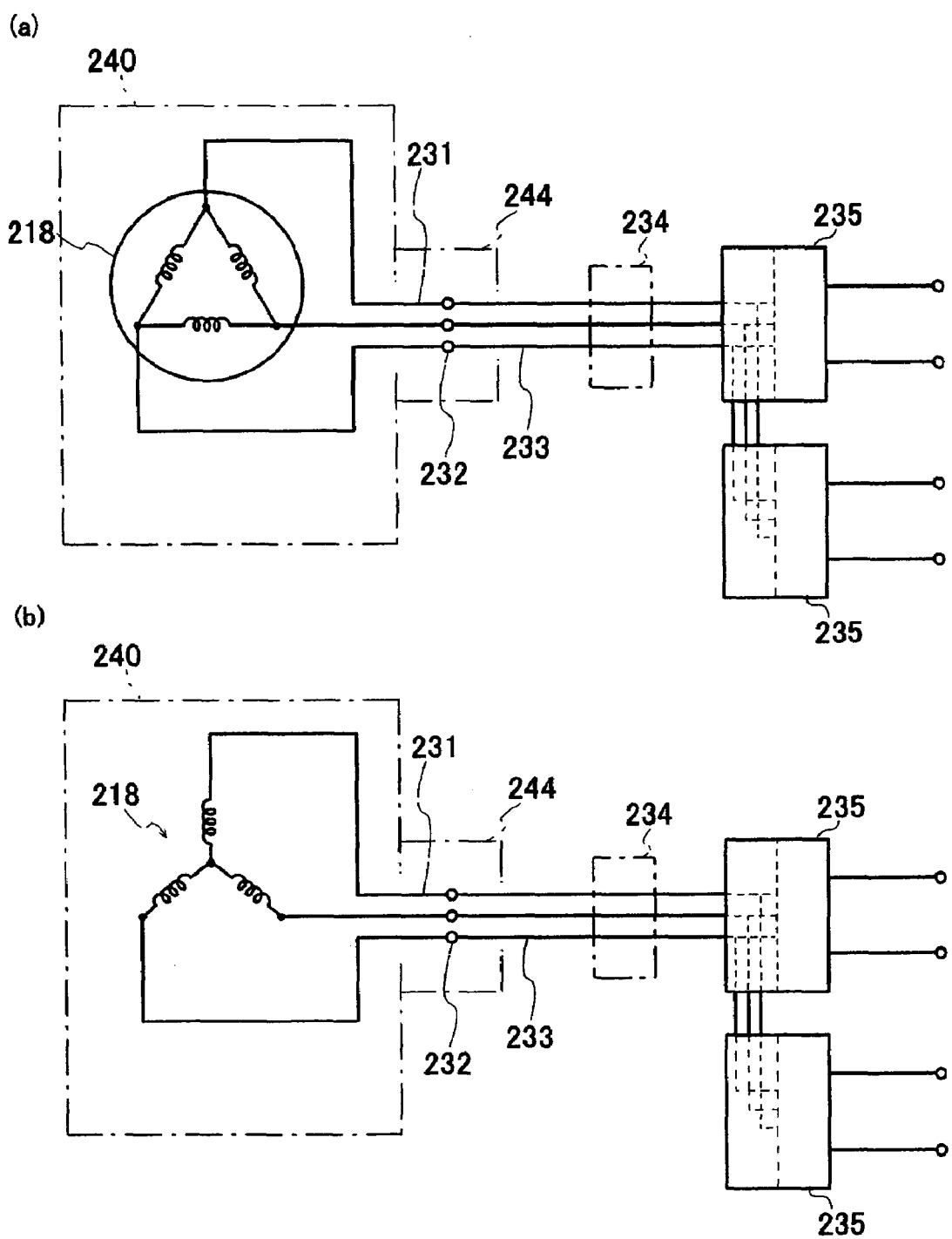
FIG. 37(a) is a circuit diagram of an electric power output route using a delta connection.
FIG. 37(b) is a circuit diagram of an electric power output route using a Y connection.

An output part of the generating device 210 is so constructed as to be attached to an output terminal or an output cable. Referring to FIG. 37, an output cable 231 is connected to the output part of the generating device 210.

The output cable 231 can be taken out from the generating device casing 240.

Figure 39:
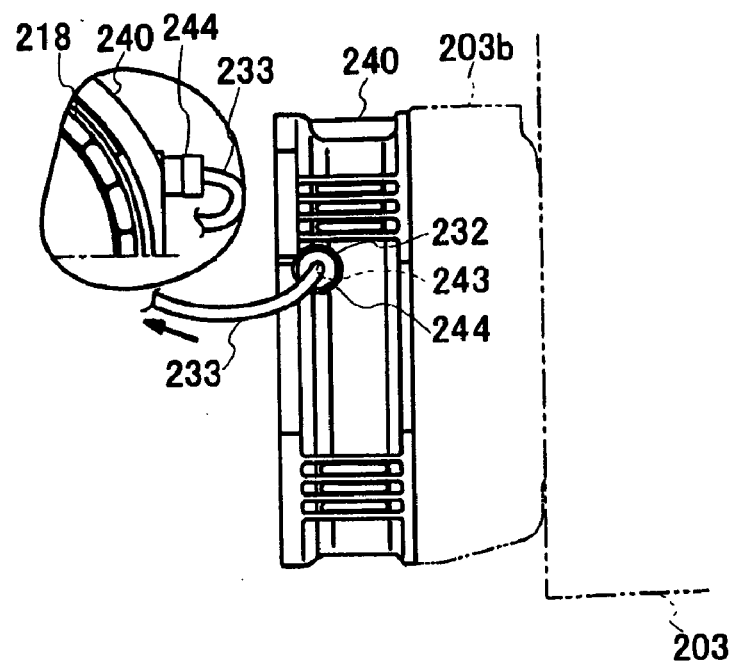
FIG. 39(a) is a side view of a casing of the electric power generating device, having a wire-extraction part with a connector, in the propelling machine of the first embodiment.
FIG. 39(b) is a side view of a casing of the electric power generating device, having a wire-extraction part, in the propelling machine of the first embodiment.
Figure 39:
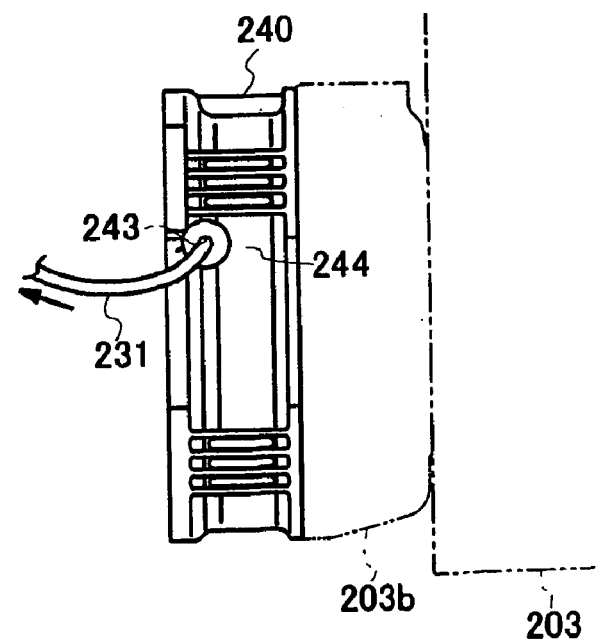

Specifically, as shown in FIGS. 37 and 39, a cylindrical wire extraction part 244 is provided on the outer peripheral surface of the generating device casing 240. The wire extraction part 244 is arranged on a side portion of the generating device casing 240 and project outward from the outer peripheral side surface of the generating device casing 240.

Figure 43:
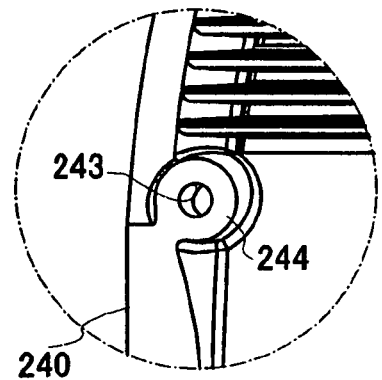
FIG. 43 is a macrograph of a wire-extraction part in the propelling machine of the first embodiment.

As shown in FIG. 43, a hole 243 for wiring is open at the center of the side surface of the wire extraction part 244 so as to let cables or the like pass therethrough. Accordingly, the output power of the generating device 210 can be taken out from the generating device casing 240.

With regard to an embodiment shown in FIG. 39(*a*), a connector 232 or a terminal stand is attached into the wire extraction part 244. The output cable 231 connected to the output part of the generating device 210 is connected to the inside of the connector 232, and an outer cable 233 is connected to the outside of the connector 232, thereby taking out the output power of the generating device 210 from the generating device casing 240. Due to this construction, the outer cable 233 can be easily attached or detached to and from the connector 232, thereby facilitating for easy wiring work. In comparison with such a construction that a connector box is installed outside the generating device 210, the output cable 231 can be shortened, and the output cable 231 can be decomposed integrally with the stator so as to facilitate for easy maintenance.

With regard to an embodiment shown in FIG. 39(*b*), the wire extraction part 244 is formed with a central hole 243 through which the output cable 231 is simply passed, thereby easily taking out the output power of the generating device 210 from the generating device casing 240, and facilitating for easy attachment work at the time of maintenance or the like.

Figure 38:
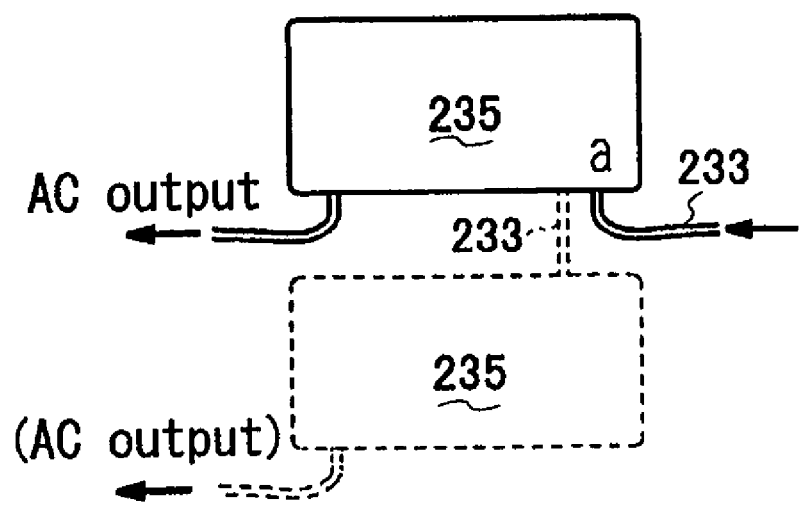
FIG. 38 is a partial macrograph of the above.

As shown in FIGS. 37 and 38, a rectifying and smoothing device 234, comprising diodes (or thyristors), condensers, and others, is connected to the outer cable 233. A three-phase alternating-current power is generated from the stator coils 218 by rotating the rotor, rectified and smoothed by the rectifying and smoothing device 234, and converted into direct current.

Then, a plurality of inverters 235 convert the output power, which was converted by the rectifying and smoothing device 234, into alternating current again, and supply it to the inboard equipments. Since voltage and frequency of the output are fluctuated by indeterminate rotational speed of the engine, the output is changed into direct current by the rectifying and smoothing device 234. Then, since the output which remains direct current cannot be transformed, the output is changed into alternating current of desired frequency and transformed into desired voltage, and after that, supplied to the inboard equipments.

With regard to the present embodiment, the rectifying and smoothing device 234 is arranged outside the generating device casing 240. Alternatively, the rectifying and smoothing device 234 may be arranged inside the generating device casing 240.

A DC/DC converter may be provided downstream of the rectifying and smoothing device 234 so as to transform the output power from the rectifying and smoothing device 234 to a desired voltage and supply it to the inverters 235.

The output converted by the rectifying and smoothing device 234 is connected to the plurality of inverters 235 in parallel.

As shown in FIGS. 37 and 38, the output of the rectifying and smoothing device 234 is distributed between the two inverters 235.

The plurality of inverters to which the output of the generating device 210 is branched in parallel may be different in output from one another. The inverter or inverters having output corresponding to load of the used electric equipments can be selectively connected to the output of generating device so as to efficiently ensure the total required capacity of electric power, thereby saving costs for buying an expensive inverter having a large capacity.

Another construction for supplying electric power from the generating device 210 to the inboard equipments equipments will now be described.

The generating device 210 is provided with two output parts to which respective output terminals or output cables are attached.

Figure 40:
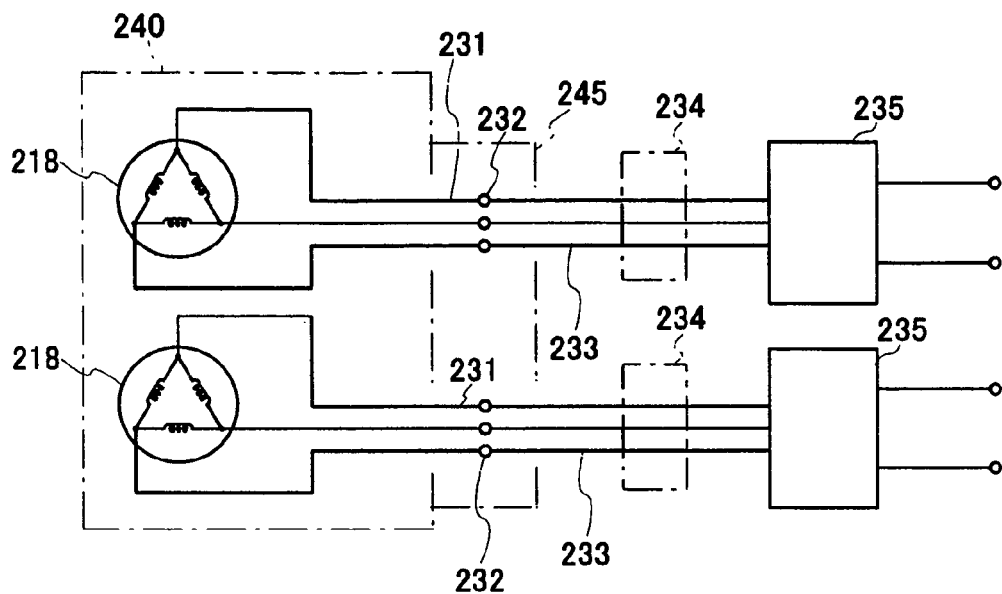
FIG. 40(a) is a circuit diagram of another electric power output route using a delta connection.
FIG. 40(b) is a circuit diagram of another electric power output route using a Y connection.
Figure 40:
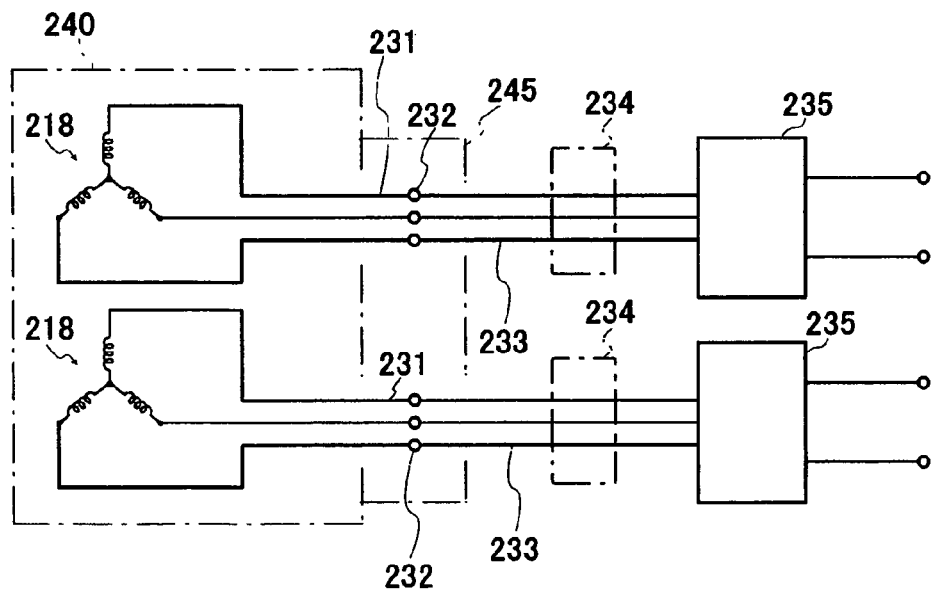

As shown in FIG. 40, output cables 231 are connected to two points in the output part of the generating device 210. Namely, two sets of stator coils 218 are provided to one or two rotors, and they are provided with respective output terminals, or with respective output cables extended therefrom.

The output cables 231 can be taken out from the generating device casing 240.

Figure 42:
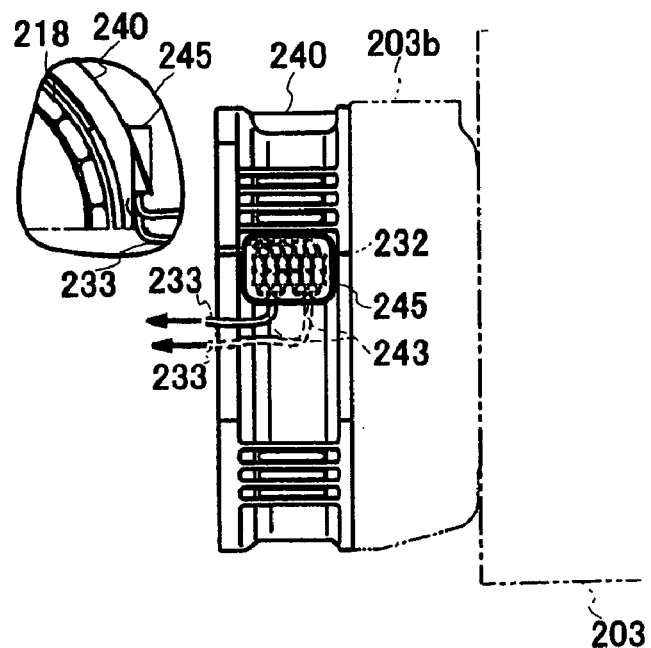
FIG. 42(a) is a side view of a casing of the electric power generating device, having another wire-extraction part with a connector, in the propelling machine of the first embodiment.
FIG. 42(b) is a side view of a casing of the electric power generating device, having another wire extraction part, in the propelling machine of the first embodiment.
Figure 42:
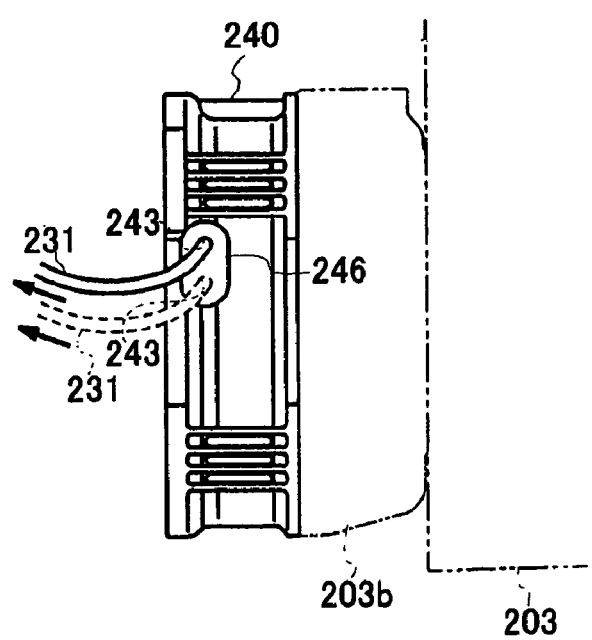

Specifically, as shown in FIGS. 40 and 42, a wire extraction part 245 is provided on the outer peripheral surface of the generating device casing 240. The wire extraction part 245 is arranged at a side portion of the generating device casing 240 and projects outward from the outer peripheral surface of the generating device casing 240.

Two holes 243 for wiring are formed in the wire extraction part 245 so as to let respective cables or the like pass therethrough so as to facilitate for taking out the output power of the generating device 210 from the generating device casing 240.

Figure 44:
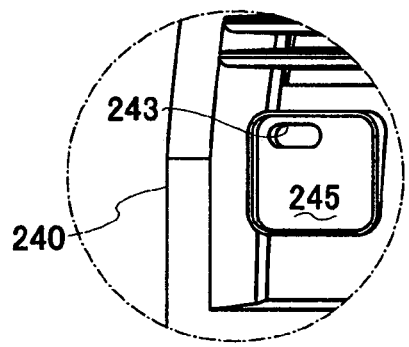
FIG. 44 is a macrograph of another wire extraction part in the propelling machine of the first embodiment.
Figure 44:
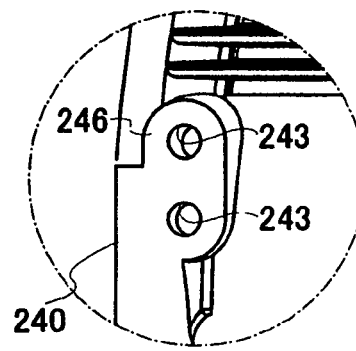

As shown in FIG. 42(*a*), the front and rear holes 243 are open at the bottom surface of the wire extraction part 245. Alternatively, as shown in FIGS. 42(*b*) and 44(*b*), the upper and lower holes 243 may be open at the side surface of the wire extraction part 245. Further alternatively, as shown in FIG. 44(*a*), a longitudinally elongated hole 243 may be open at the upper end of the side surface of the wire extraction part 245. The length of this elongated hole 243 is large enough to let a plurality of cables pass therethrough.

With regard to a modification shown in FIG. 42(*a*), the wire extraction part 245 is rectangular shaped when viewed in side, and builds the connector 232 or the terminal stand therein. The output cables 231 connected to the output part of the generating device 210 are connected to the inside of the connector 232, and two outer cables 233 are connected to the outside of the connector 232, thereby taking out the output power of the generating device 210 from the generating device casing 240. Due to this construction, the outer cables can be easily connected to the connector 232 so as to ease the wiring work for maintenance or the like.

With regard to a modification shown in FIG. 42(*b*), a wire extraction part 246 is elongated when viewed in side so as to have the upper and lower two holes 243 for wiring. The output cables 231 are passed through the respective holes 243 so as to easily take out the output power of the generating device 210 from the generating device casing 240, thereby facilitating for easy assembling for maintenance.

Figure 41:
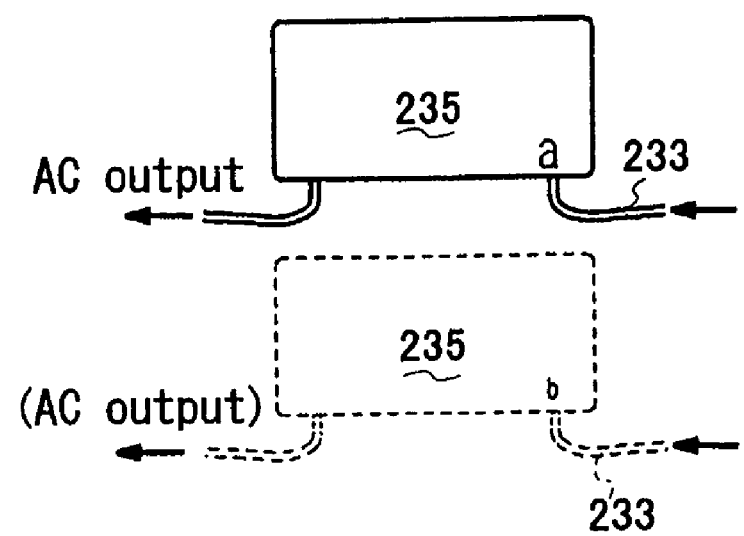
FIG. 41 is a partial macrograph of the above.

As shown in FIGS. 40 and 41, two outer cables 233 are connected to the respective rectifying and smoothing device 234. The rectifying and smoothing devices 234 rectify and smooth respective alternating-current powers from the generating device 210 and convert them into direct currents.

Then, each of the two inverters 235 converts the output power from each of the rectifying and smoothing devices 234 into alternating current again, and supplies it to the inboard equipments.

Accordingly, the plurality of output cables 231 can be connected, to the output part of the generating device 210, and connected to the respective rectifying and smoothing devices 234 so as to convert the output currents from the generating device 210 into direct currents. The direct currents converted by the respective rectifying and smoothing devices 234 are converted into alternating currents again by the respective inverters 235. Due to this construction, each of the inverters 235 may have small output (capacity). The inverters 235 can be shared corresponding to load of the used electric equipments. The inverters 231 having different capacities may be combined. Thus, total required capacity of electric power can be ensured without an expensive inverter having large capacity, thereby saving costs.

In the present embodiment, the rectifying and smoothing devices 234 are arranged outside the generating device casing 240. Alternatively, the rectifying and smoothing devices 234 may be arranged inside the generating device casing 240.

DC/DC converters may be provided downstream of the respective rectifying and smoothing devices 234 so as to transform the output current from the respective rectifying and smoothing devices 234 to respective desired voltages and supply them to the respective inverters 235.

Figure 45:
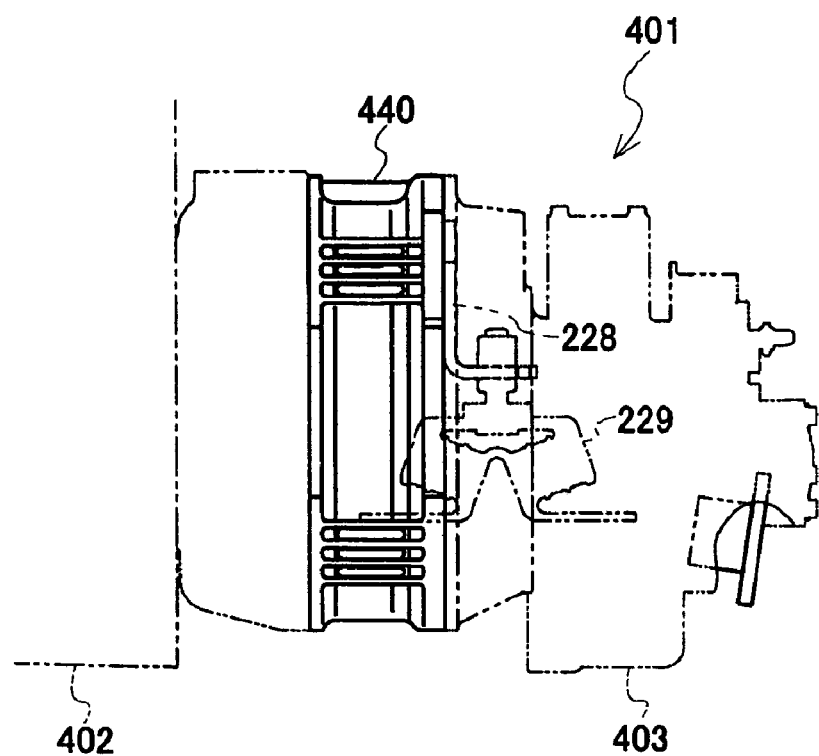
FIG. 45 is a side view of a (angle-type) marine-gear propelling machine according to the first embodiment.
Figure 46:
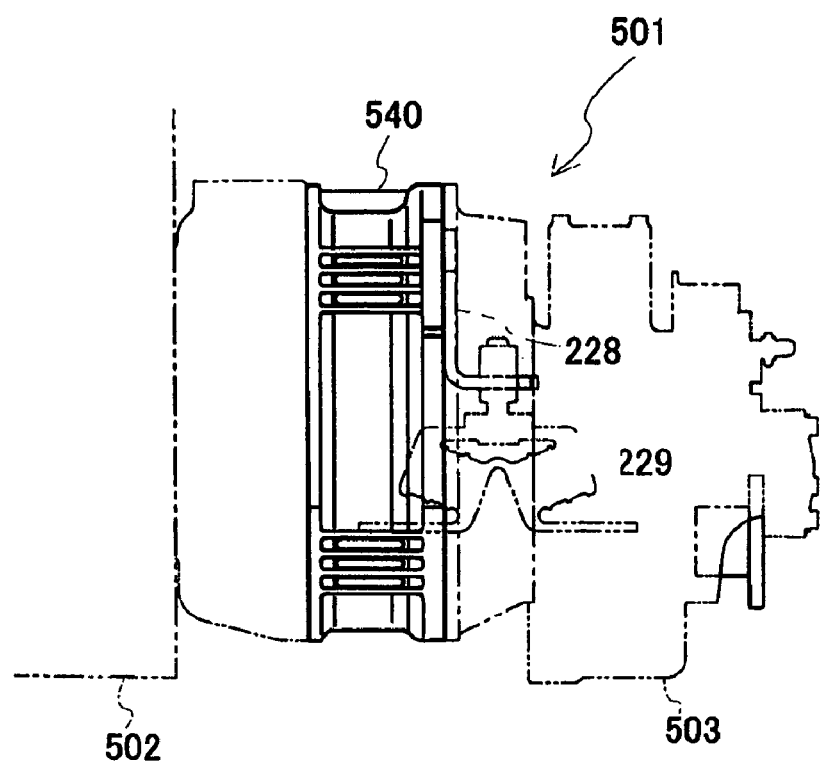
FIG. 46 is a side view of a (parallel-type) marine-gear propelling machine according to the first embodiment.
Figure 47:
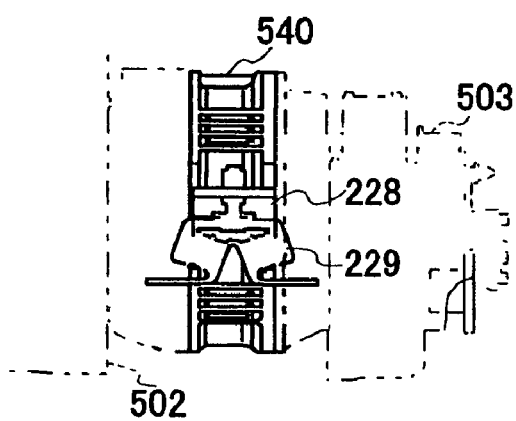
FIG. 47 is a side view of a (parallel-type) marine-gear propelling machine according to the first embodiment, provided with another casing of the electric power generating device.

Each of the (angle type) marine-gear propelling machine 401 shown in FIG. 45 and the (parallel type) marine-gear propelling machine 501 shown in FIGS. 46 and 47 has the construction and effect according to the first embodiment, which are the same as those of the sail-drive propelling machine 201 of the first embodiment.

Next, a sail-drive propelling machine 201 according to the second embodiment will be described.

Figure 48:
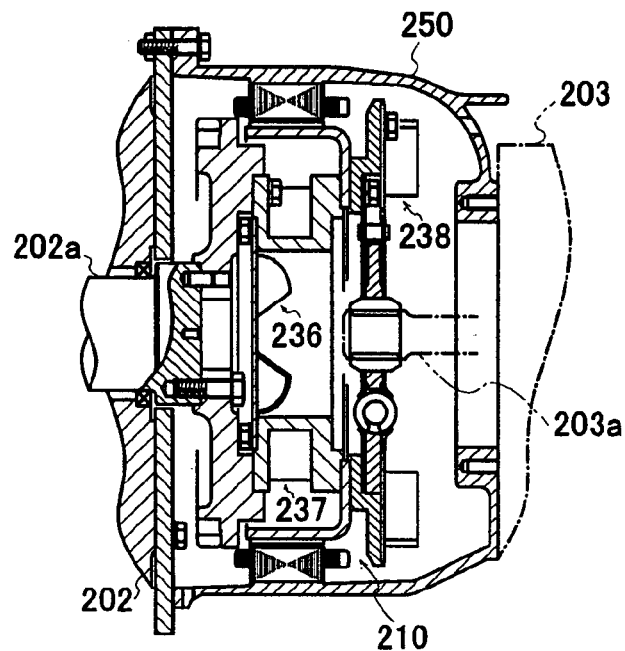
FIG. 48 is a sectional side view of a propelling machine according to a second embodiment.
Figure 49:
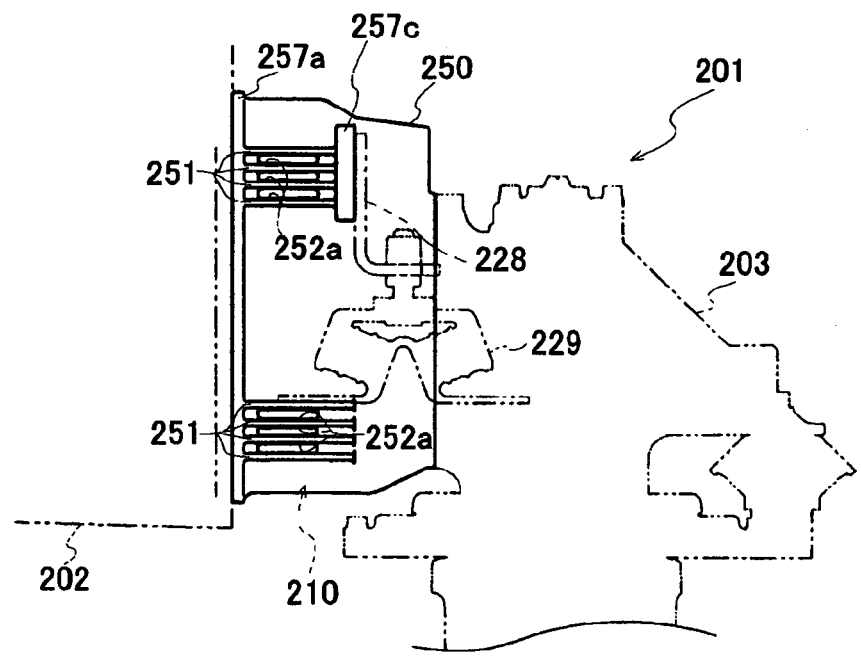
FIG. 49 is a side view of the propelling machine.

In the propelling machine 201 of the second embodiment as shown in FIGS. 48 and 49, a generating device casing 250 equals the generating device casing 240 of the first embodiment united with FW housing 221*a* and mounting flange 203*b*.

Figure 70:
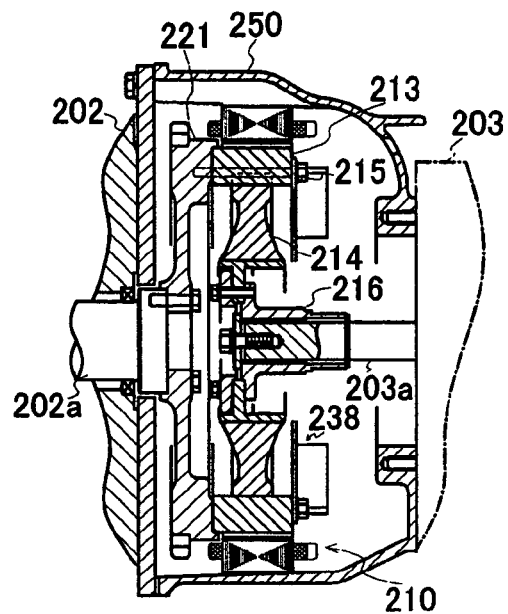
FIG. 70 is a sectional side view of a reshaped propelling machine according to the second embodiment.

Besides, the configuration of the propelling machine 201 according to the second embodiment, e.g., the form of cooling fans 236, 237 and 238, is substantially similar to that of the propelling machine 201 according to the first embodiment. A reshaped electric power generating device shown in FIG. 70 used in this embodiment is constructed substantially similar to the reshaped generating device used in the propelling machine 201 of the first embodiment.

The generating device casing 250 used in the propelling machine 201 of the second embodiment will be described.

The generating device casing 250 has a front flange part 257*a* which projects outward from the front portion thereof to serve as a part fitted to the internal combustion engine 202.

As shown in FIG. 49, fins 251 are formed on the outer peripheral surface of the generating device casing 250.

The fins 251 project substantially horizontally outward from the outer peripheral surface of the generating device casing 250. The generating device casing 250 has four portions, i.e., upper left, lower left, upper right and lower right portions, which appear fully when viewed in rear, and each of which is provided thereon with four fins 251.

The front ends of the fins 251 are fixed to the rear surface of the front flange part 257*a*, and the rear ends thereof are positioned substantially at the longitudinal center part of the generating device casing 250.

Holes 252*a* are provided under the respective fins 251 in the outer peripheral surface of the generating device casing 250. The holes 252*a* are longitudinally elongated and are substantially flat or rather downwardly slant.

The plural (e.g., three) holes 252*a* are formed in each of the four portions, i.e., upper left, lower left, upper right and lower right portions, which appear fully when viewed in rear, of the generating device casing 250.

Figure 50:
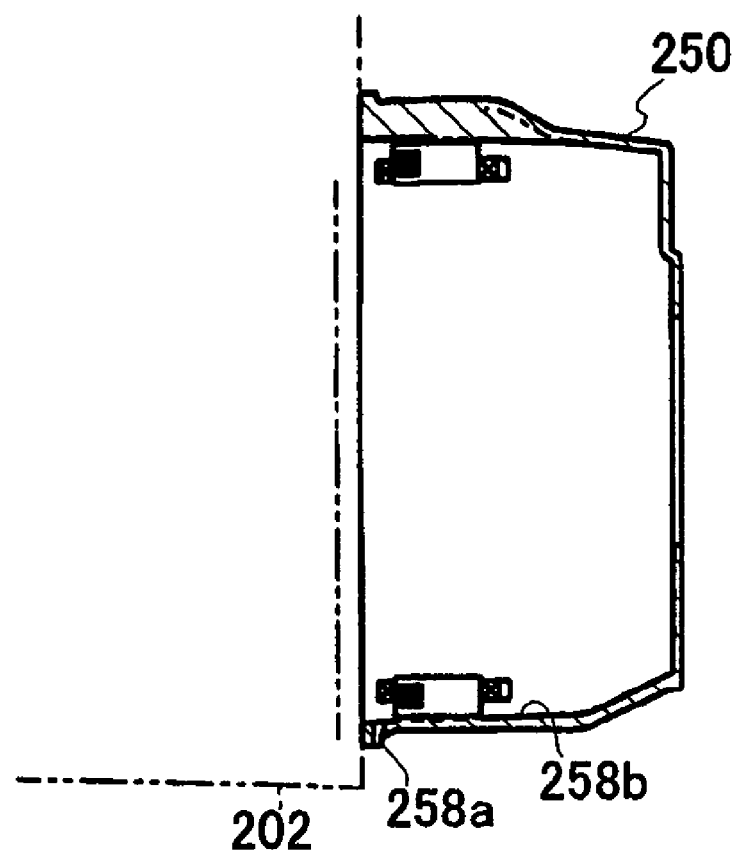
FIG. 50 is a side view of a casing of an electric power generating device, having drain holes, in the propelling machine of the second embodiment.

As shown in FIG. 50, the generating device casing 250 has a taper 258*b* and a bottom drain hole 258*a* substantially similar to those of the generating device casing 240 of the first embodiment, and have the same effect as those of the generating device casing 240.

An arrangement of mounting the propelling machine 201 of the second embodiment onto a vessel body will be described in accordance with FIG. 49.

The front flange part 257*a* projecting outward from the front portion of the generating device casing 250 serves as a part fitted to the internal combustion engine 202. Two left and right upper attachment stays 257*c* are formed on the longitudinal center area of the generating device casing 250. Mounting legs 228 attached to a vessel body through the vibration proof members 229 are attached to the respective attachment stays 257c so as to mount the propelling machine 201 onto the vessel body. Other parts in this arrangement of mounting the propelling machine 201 are similar to those in the arrangement of mounting the propelling machine 201 of the first embodiment.

An alternative arrangement of mounting the propelling machine 201 of this embodiment is similar to the alternative arrangement of mounting the propelling machine 201 for the first embodiment (shown in FIGS. 34 to 36), and has the same effect.

An arrangement of supplying electric power to inboard equipments from the generating device 210 in the propelling machine 201 of the second embodiment will be described.

A single output cable 231 takes out the output electric power of the generating device 210 of the second embodiment, and a rectifying and smoothing device 234 converts the power into direct current. The changed direct current is branched and connected to a plurality of parallel inverters 235.

Figure 51:
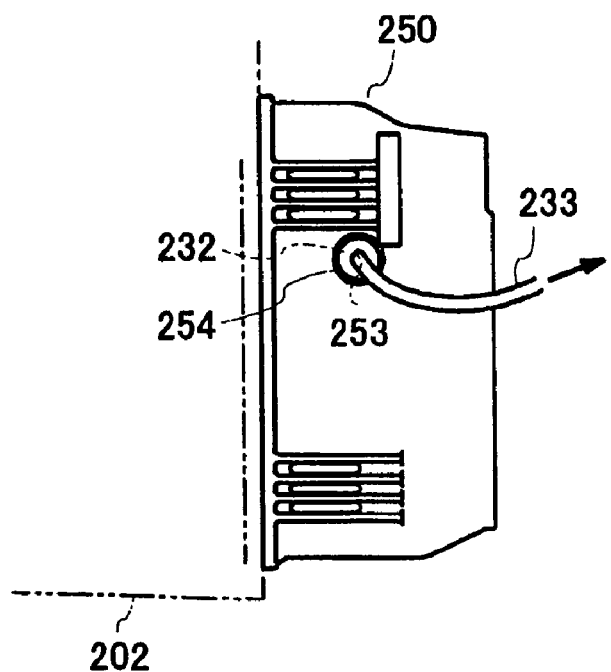
FIG. 51(a) is a side view of a casing of the electric power generating device, having a wire-extraction part with a connector, in the propelling machine of the second embodiment.
FIG. 51(b) is a side view of a casing of the electric power generating device, having a wire extraction part, in the propelling machine of the second embodiment.
Figure 51:
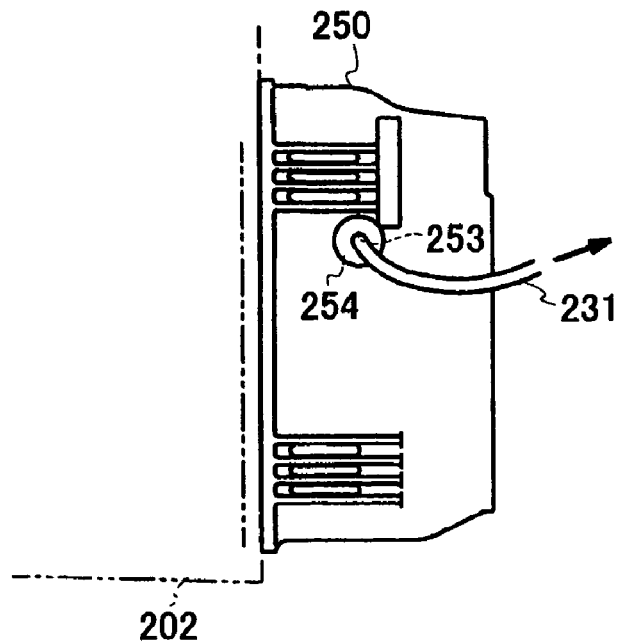

In the second embodiment, as shown in FIG. 51(a), on the generating device casing 250 is formed a wire extraction part 254, similar to the wire extraction part 244 of the first embodiment, provided with the output cable 231, a connector 232 and an outer cable 233 for taking out the output power of the generating device 210 from the generating device casing 250.

Alternatively, as shown in FIG. 51(b), the wire extraction part 254 may be formed with a central hole 253 through which the output cable 231 is passed so as to take out the output power of the generating device 210 from the generating device casing 250.

The present arrangement other than the foresaid things is similar to the arrangement of supplying electric power to inboard equipments from the generating device 210 of the first embodiment, and has the same effect.

Modified arrangement of supplying power to the inboard equipments from the generating device 210 of the propelling machine 201 of the second embodiment will be described.

A plurality of output cables 231 can be connected to the output part of the generating device 210 of the second embodiment, and are connected to respective rectifying and smoothing devices 234 so as to convert the output currents of the generating device 210 into direct currents. The inverters 235 convert the direct currents from the respective rectifying and smoothing devices 234 into alternating currents.

Figure 52:
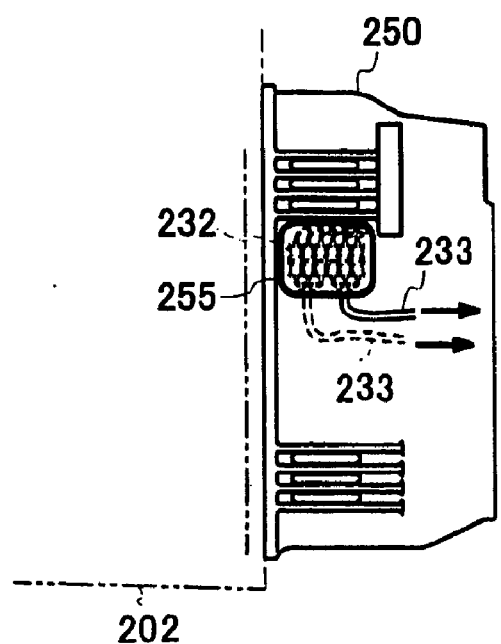
FIG. 52(a) is a side view of a casing of the electric power generating device, having another wire-extraction part with a connector, in the propelling machine of the second embodiment.
FIG. 52(b) is a side view of a casing of the electric power generating device, having another wire extraction part, in the propelling machine of the second embodiment.
Figure 52:
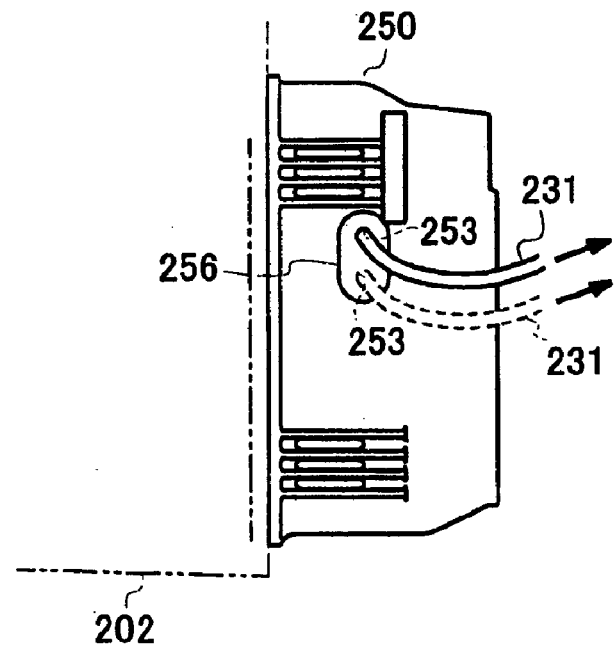

Referring to FIG. 52(a), on the generating device casing 250 in the second embodiment is formed a wire extraction part 255, which is rectangular when viewed in side, similar to the corresponding wire extraction part 245 in the first embodiment, provided with the output cable 231, connectors 232 and outer cables 233 so as to take out the output power of the generating device 210 from the casing 250.

Alternatively, referring to FIG. 52(b), on the generating device casing 250 in the second embodiment is formed an elongated wire extraction part 256 as shown in side view, similar to the corresponding wire extraction part 246 in the fist embodiment, provided with two upper and lower holes 253 open at the side surface thereof. The output cables 231 are passed through the holes 253 so as to take out the output power of the generating device 210 from the generating device casing 250.

The present arrangement other than the foresaid things is similar to the arrangement of supplying electric power to inboard equipments from the generating device 210 of the first embodiment, and has the same effect.

Figure 53:
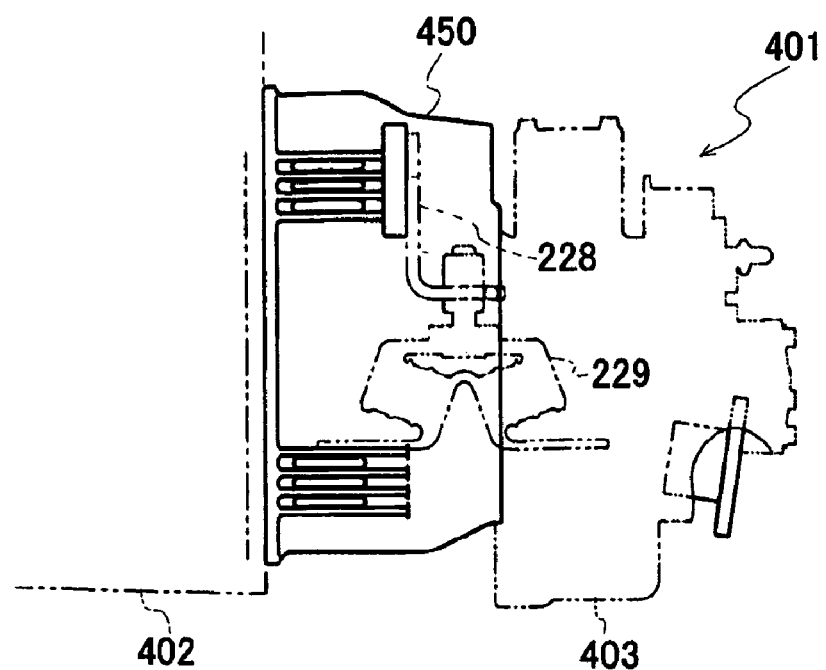
FIG. 53 is a side view of a (angle-type) marine-gear propelling machine according to the second embodiment.
Figure 54:
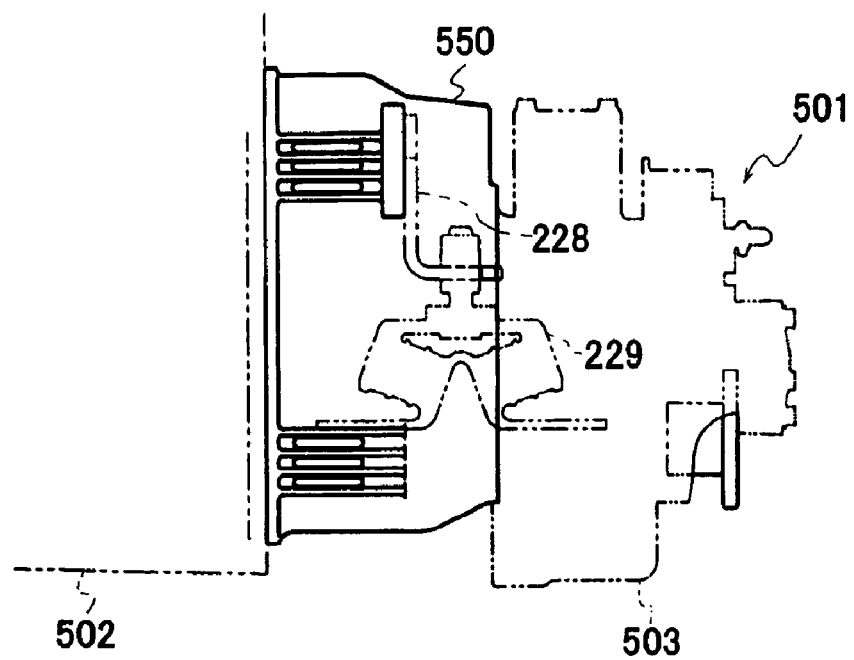
FIG. 54 is a side view of a (parallel-type) marine-gear propelling machine according to the second embodiment.
Figure 55:
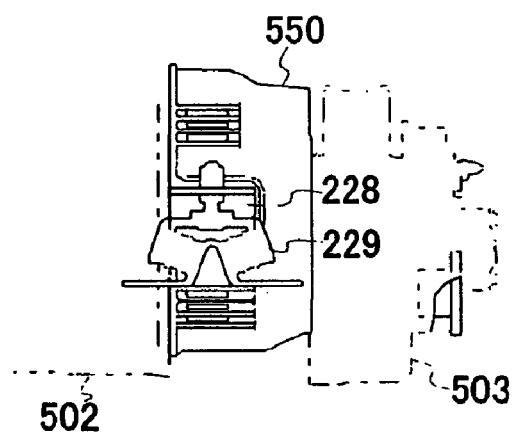
FIG. 55 is a side view of a (parallel-type) marine-gear propelling machine according to the second embodiment.

According to the second embodiment, a generating device casing 450 of the (angle type) marine-gear propelling machine 401 shown in FIG. 53 and a generating device casing 550 of the (parallel type) marine-gear propelling machine 501 shown in FIGS. 54 and 55 have the construction and effect similar to the generating device casing 250 of the sail drive propelling machine 201 of the second embodiment.

Next, the sail-drive propelling machine 201 according to a third embodiment will be described.

Figure 56:
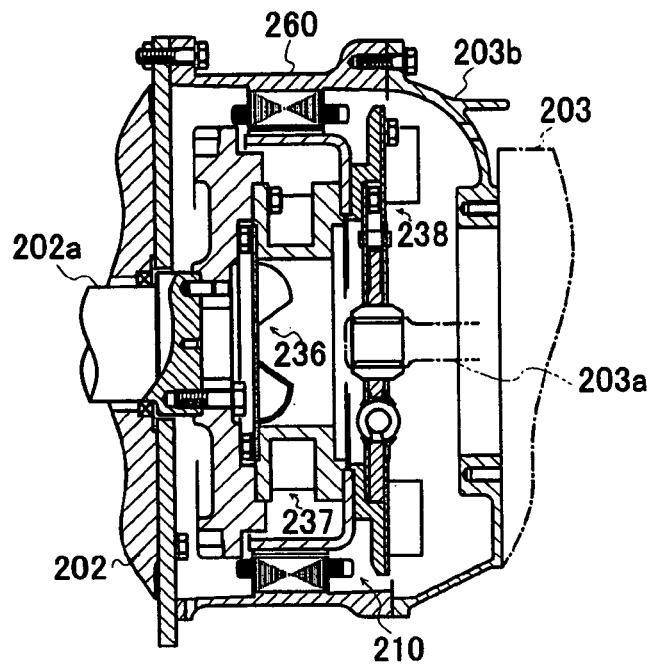
FIG. 56 is a sectional side view of a propelling machine of a third embodiment.
Figure 57:
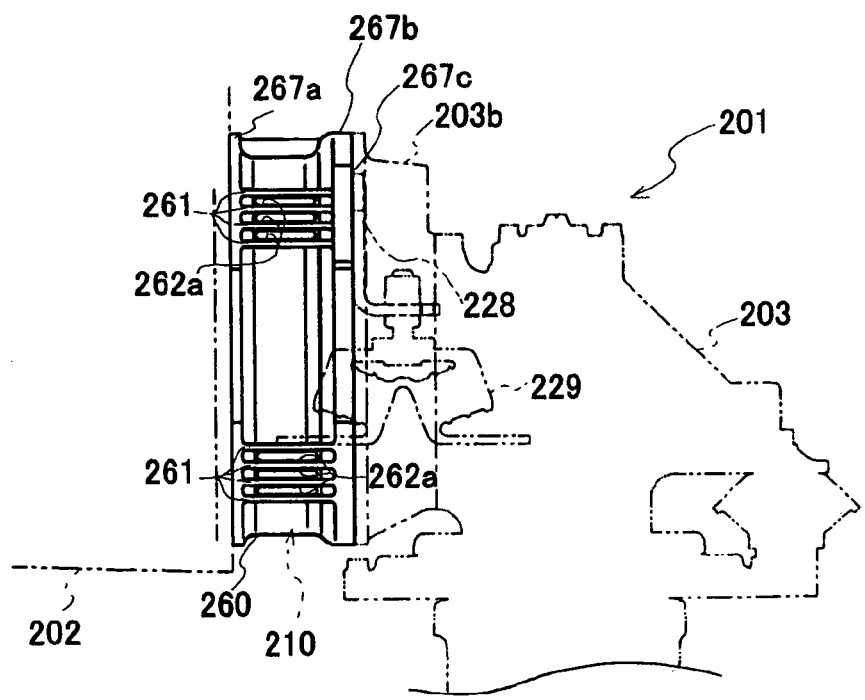
FIG. 57 is a side view of the propelling machine.

In the propelling machine 201 of the third embodiment as shown in FIGS. 56 and 57, a generating device casing 260 equals the generating device casing 240 of the first embodiment united with the FW housing 221a.

Figure 58:
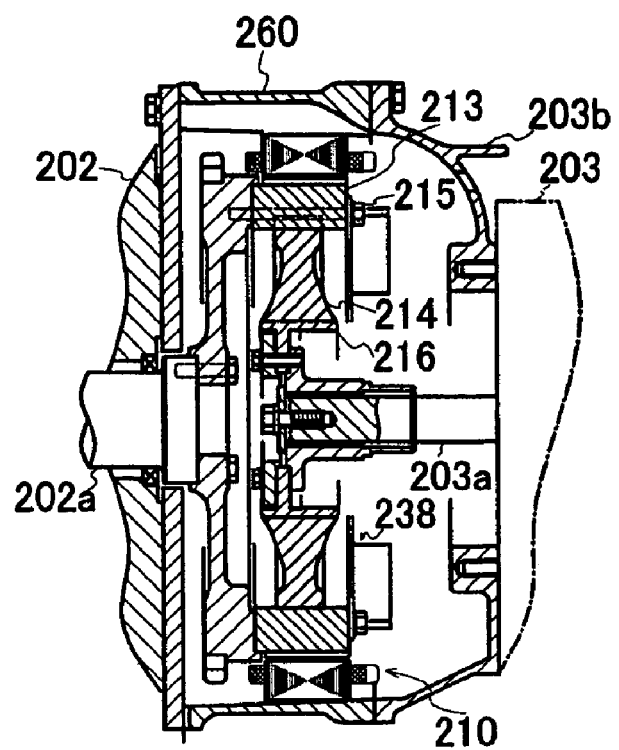
FIG. 58 is a sectional side view of the propelling machine of the third embodiment, having another electric power generating device.

Besides, the configuration of the propelling machine 201 according to the third embodiment, e.g., the form of cooling fans 236, 237 and 238, is substantially similar to that of the propelling machine 201 according to the first embodiment. A reshaped electric power generating device shown in FIG. 58 used in this embodiment is constructed substantially similar to the reshaped generating device used in the propelling machine 201 of the first embodiment.

The generating device casing 260 used in the propelling machine 201 of the third embodiment will now be described.

A front flange part 267a projects outward from the front portion of the generating device casing 260 to serve as a part fitted to the internal combustion engine 202. A rear flange part 267b projects outward from the rear portion of the generating device casing 260 to serve as a part fitted to the mounting flange 203b. Two attachment stays 267c are provided on left and right upper portions of the rear flange part 267b, respectively. Mounting legs 228 attached to a vessel body through the vibration proof members 229 are attached to the respective attachment stays 267c so as to mount the propelling machine 201 onto the vessel body.

The generating device casing 260 has the other configuration, e.g., form of fins 261 and holes 262a, substantially similar to the corresponding configuration of the generating device casing 240, e.g., the form of fins 241 and holes 242a, used in the first embodiment, and has the same effect.

Figure 59:
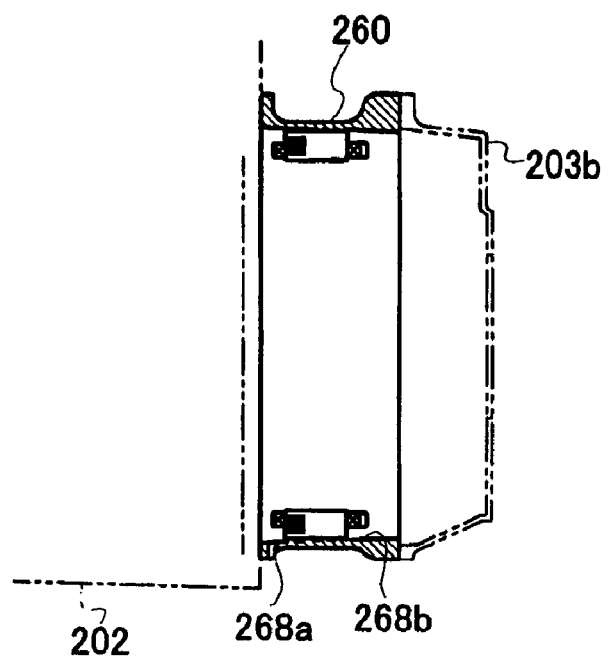
FIG. 59 is a side view of a casing of the electric power generating device, having a drain hole, in the propelling machine of the third embodiment.
Figure 60:
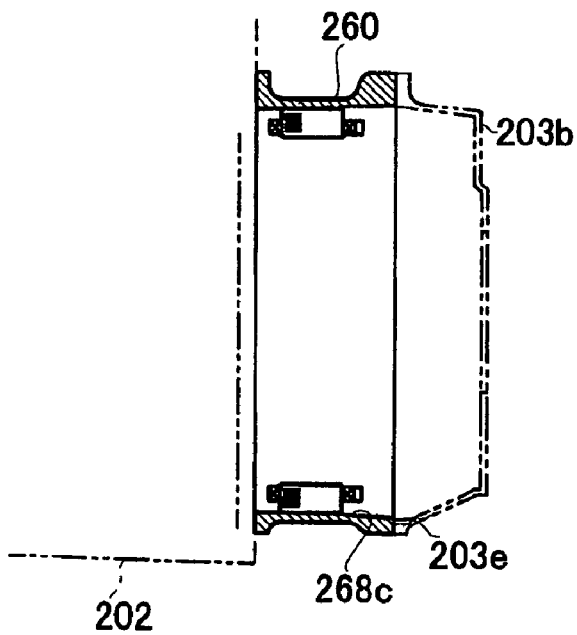
FIG. 60 is a side view of a casing of the electric power generating device, having another drain hole, in the propelling machine of the third embodiment.

As shown in FIGS. 59 and 60, the generating device casings 260 have respective tapers 268b and 268c and bottom drain holes 268a or 203e substantially similar to those of the generating device casing 240 of the first embodiment, and have the same effect as those of the generating device casing 240.

Figure 61:
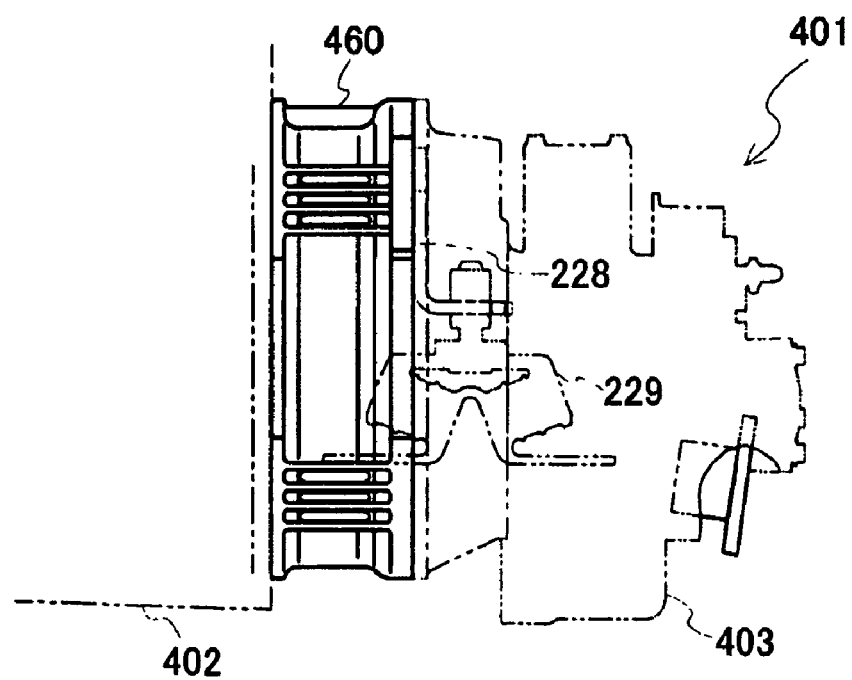
FIG. 61 is a side view of a (angle-type) marine-gear propelling machine according to the third embodiment.
Figure 62:
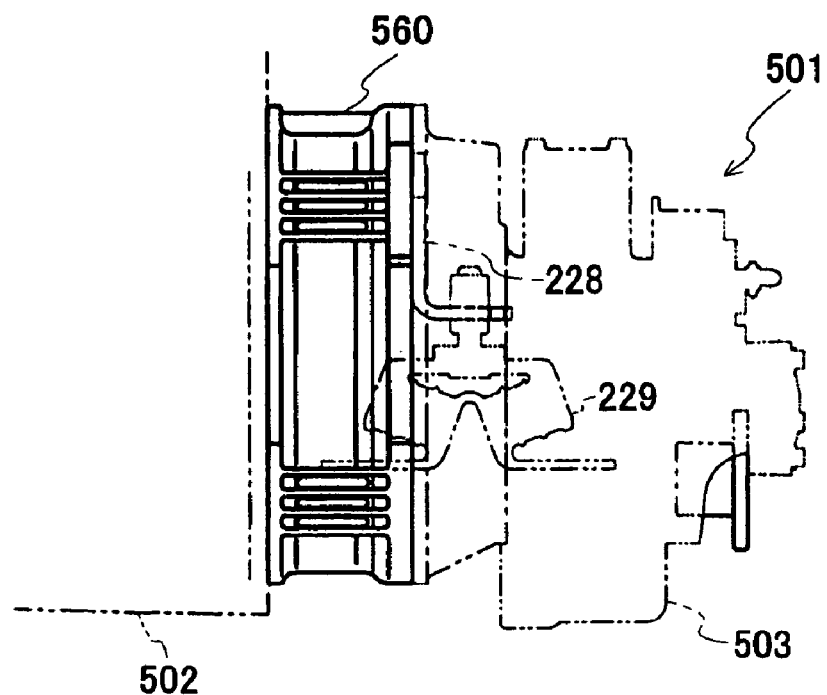
FIG. 62 is a side view of a (parallel-type) marine-gear propelling machine according to the third embodiment.
Figure 63:
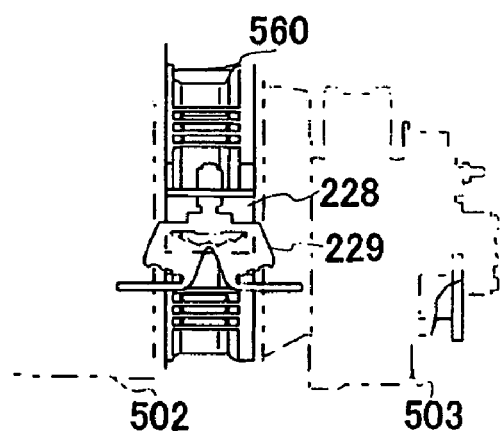
FIG. 63 is a side view of a (parallel-type) marine-gear propelling machine according to the third embodiment, having another casing of the electric power generating device.

According to the third embodiment, a generating device casing 460 of the (angle type) marine-gear propelling machine 401 shown in FIG. 61 and a generating device casing 560 of the (parallel type) marine-gear propelling machine 501 shown in FIGS. 62 and 63 have the same construction and the same effect as the generating device casing 260 of the sail-drive propelling machine 201 according to the third embodiment.

Next, a sail-drive propelling machine 201 according to a fourth embodiment will now be described.

Figure 64:
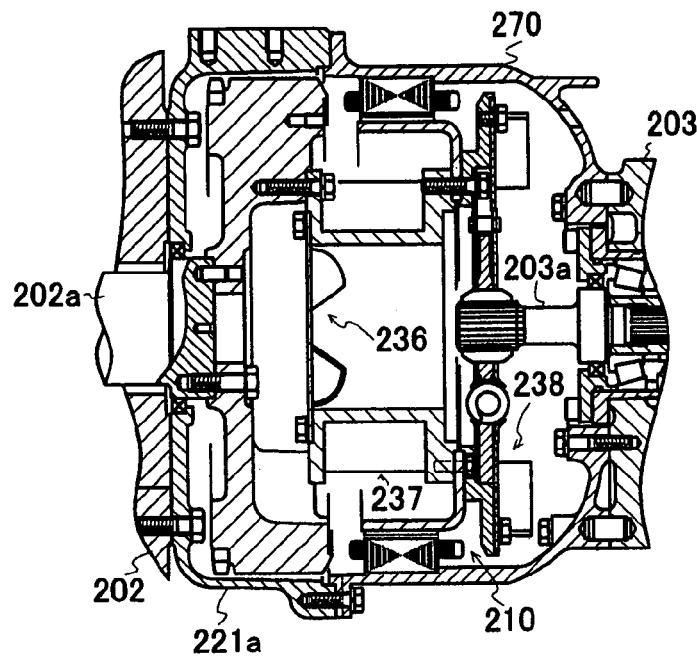
FIG. 64 is a sectional side view of a propelling machine according to a fourth embodiment.
Figure 65:
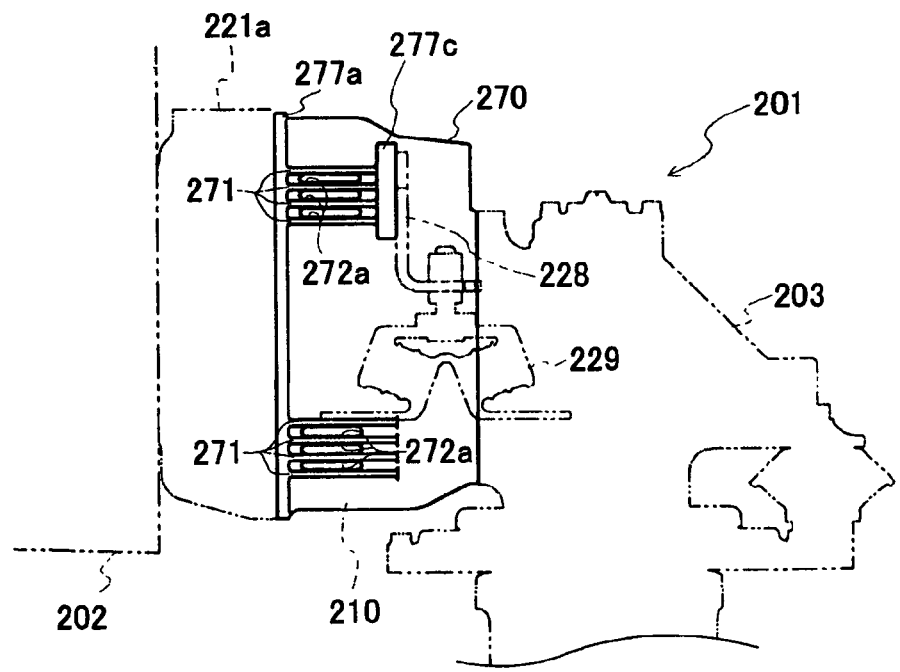
FIG. 65 is a side view of the propelling machine.

In the propelling machine 201 of the fourth embodiment as shown in FIGS. 64 and 65, a generating device casing equals the generating device casing 240 of the first embodiment integrated with the mounting flange 203b.

Figure 66:
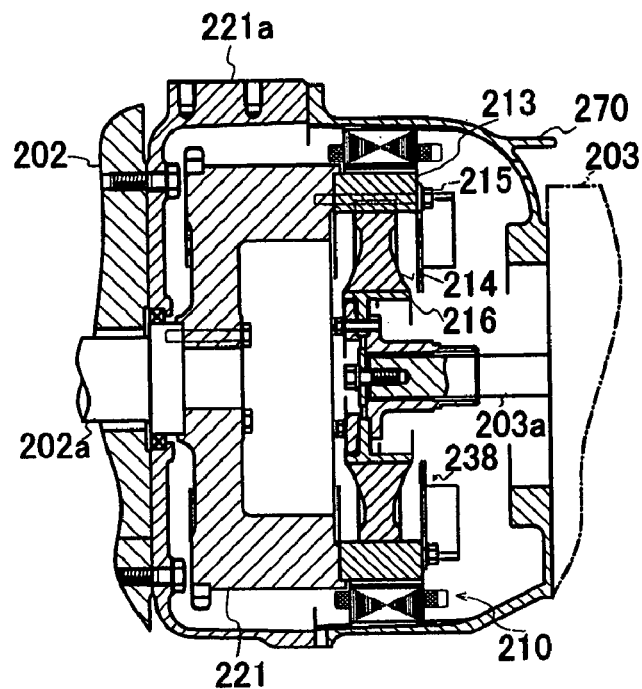
FIG. 66 is a sectional side view of the propelling machine according to the fourth embodiment, having another electric power generating device.

Besides, the configuration of the propelling machine 201 according to the first embodiment, e.g., the form of cooling fans 236, 237 and 238, is substantially similar to that of the propelling machine 201 according to the first embodiment. A reshaped electric power generating device shown in FIG. 66 used in this embodiment is constructed substantially similar to the reshaped generating device used in the propelling machine 201 of the first embodiment.

A generating device casing 270 used in the propelling machine 201 of the fourth embodiment will now be described.

A front flange part 277a projects outward from the front portion of the generating device casing 270 to serve as a part fitted to the FW housing 221a. Two attachment stays 277c are provided on left and right upper portions of the longitudinal center part of the generating device casing 270, respectively. Mounting legs 228 attached to a vessel body through the vibration proof members 229 are attached to the attachment stays 277c so as to mount the propelling machine 201 onto the vessel body.

The generating device casing 270 has the other configuration, e.g., form of fins 271 and holes 272a, substantially similar to the corresponding configuration of the generating device casing 250, e.g., the form of fins 251 and holes 252a, used in the second embodiment, and has the same effect.

Figure 67:
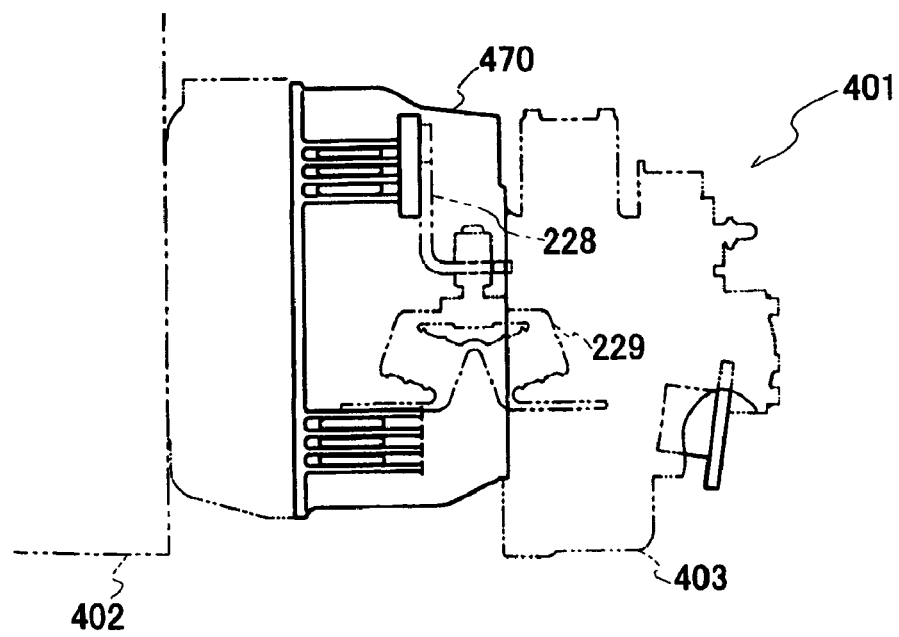
FIG. 67 is a side view of a (angle-type) marine-gear propelling machine according to the fourth embodiment.
Figure 68:
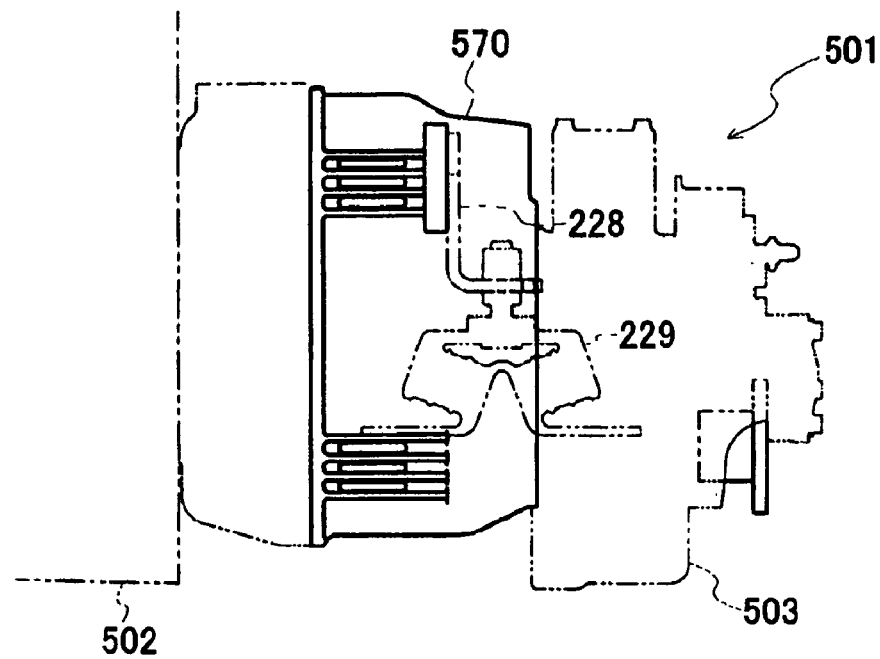
FIG. 68 is a side view of a (parallel-type) marine-gear propelling machine according to the fourth embodiment.
Figure 69:
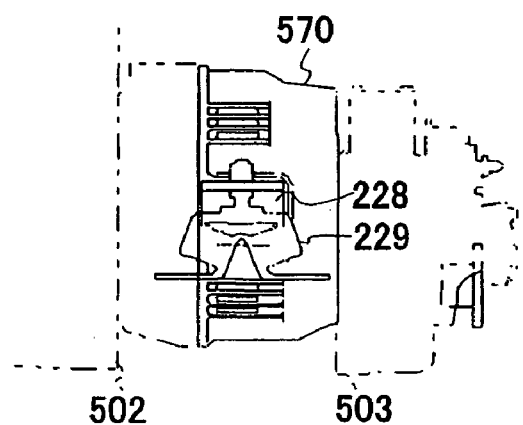
FIG. 69 is a side view of a (parallel-type) marine-gear propelling machine according to the fourth embodiment, having another casing of the electric power generating device.

According to the fourth embodiment, a generating device casing 470 of the (angle type) marine-gear propelling machine 401 shown in FIG. 67 and a generating device casing 570 of the (parallel type) marine-gear propelling machine 501 shown in FIGS. 68 and 69 have the same construction and the same effect as the generating device casing 260 of the sail-drive propelling machine 201 of the fourth embodiment.

In association with the condition that the generating device 210 is disposed between the engine 202 and the transmission 203 to use the output shaft of the engine 202 as its rotor shaft, the casing of the generating device 210 is disposing between the flywheel 221 and the transmission 203 in each of the aforesaid embodiments, however, the casing may be alternatively disposed between the flywheel and the engine.

Next, a stem-drive propelling machine 301 according to the first embodiment will be described.

Figure 71:
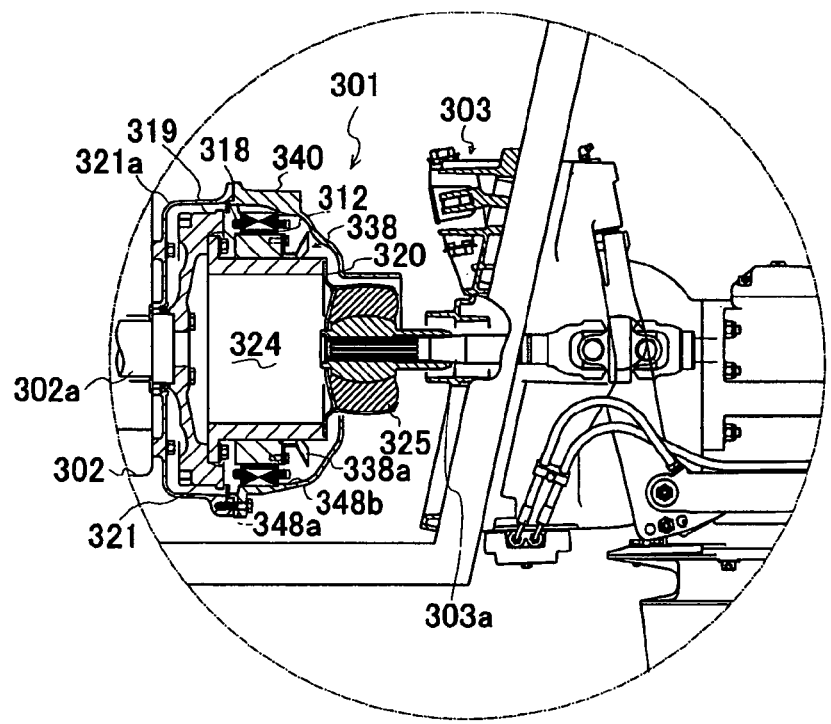
FIG. 71 is a schematic side view of a stern-drive propelling machine.
Figure 72:
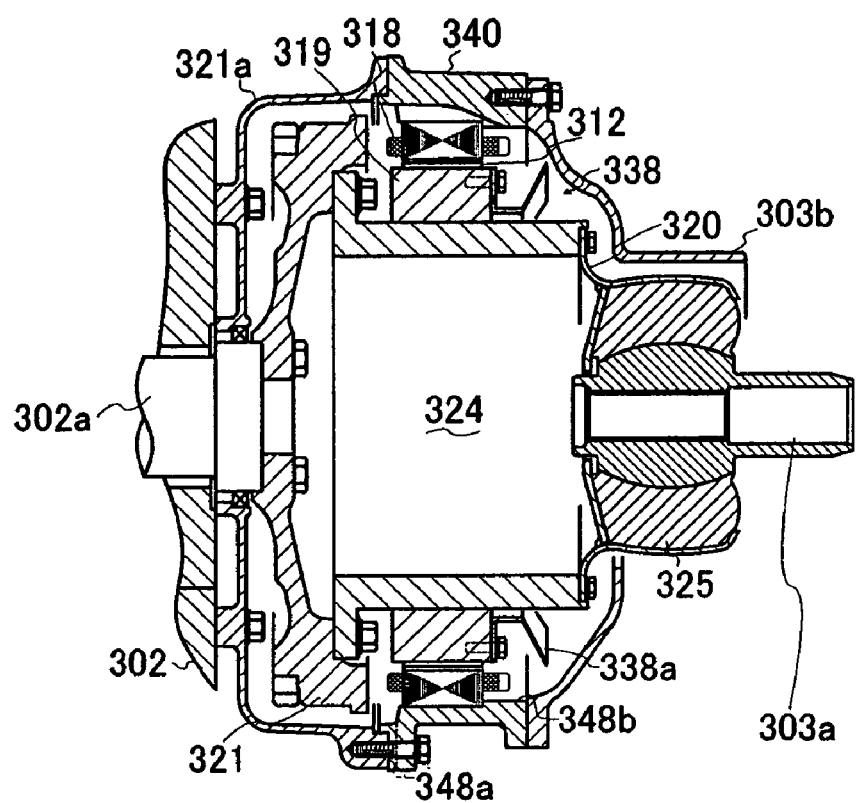
FIG. 72 is a sectional side view of a stern-drive propelling machine according to a first embodiment.

As shown in FIGS. 71 and 72, an internal combustion engine 302 has a crankshaft 302a, serving as its output shaft, and a flywheel 321 drivingly fitted on one end of the crankshaft 302a of the internal combustion engine 302. The flywheel 321 is covered with a flywheel housing (hereinafter referred to as "FW housing") 321a.

A generating device casing 340 is attached to a rear portion of the FW housing 321a. Components of an electric power generating device 310 are built in the generating device casing 340. Specifically, stator coils 318 are attached onto the inner peripheral surface of the generating device casing 340, and a magnet 312 is arranged radially inward of the stator coils 318 (toward the center). The magnet 312 is fixed to a distance piece 324, which is a rotary member, through a cylindrical attachment member 319. The distance piece 324 is fixed to the flywheel 321, so that the magnet 312 can be rotated integrally with the distance piece 324 and the flywheel 321.

The distant piece 324 is a cylindrical hollow shaft integrally having a flange part 324a on its front end.

The front flange part 324a disposed on the front end of the distance piece 324 is attached to the flywheel 321 so as to be rotated integrally with the flywheel 321.

The distant piece 324 is connected to the input shaft 303a through an elastic joint 325. The elastic joint 325 is positioned behind the distant piece 324 and fixed to the rear surface of the distant piece 324 by an attachment member 320. The stern-drive input shaft 303a is arranged at the center portion of the elastic joint 325. The stem-drive input shaft 303a can be rotated integrally with the elastic joint 325, the attachment member 320 and the distant piece 324.

As shown in FIG. 72, a mounting flange 303b of the transmission 303 can be connected to the generating device casing 340 on a side opposite to the FW housing 321a. By connecting the mounting flange 303b to the generating device casing 340, the transmission 303 is attached and fixed to the internal combustion engine 302.

A rotary shaft of the generating device 310 is the crankshaft 302a of the internal combustion engine 302, and the crankshaft 302a is arranged coaxially to the (stern drive) input shaft 303a of the transmission. Accordingly, the rotary shaft of the generating device 310 is disposed coaxially to the crankshaft 302a and the power take-off shaft 303a.

The power take-off shaft 303a is connected to the distant piece 324 through the elastic joint 325 so as to be rotated by the crankshaft 302a.

A cooling fan is equipped to the generating device 310.

As shown in FIG. 24, a fan 338 is arranged on the outer peripheral surface of the distance piece 324.

By bolts, the fan 338 is fixed to the attachment member 319 having the magnet 312 fixed thereon, thereby being fixed to the distant piece 324 with the attachment member 319. Vanes 238a of the fan 238 are arranged on the rear outer peripheral surface of the distance piece 324. The fan 338 is rotated by rotating the distance piece 324. By providing the cooling fan 338 on the generating device 310 as the above, air flows inside the generating device casing 340, thereby enhancing the cooling efficiency of the generating device 310.

A drain hole 348a is provided at the lower portion of the generating device casing 340.

As shown in FIGS. 71 and 72, the generating device casing 340 is made by casting and the inside of the generating device casing is tapered by drafting a casting core. The drain hole 348a is provided at the lower side of this taper 348b in the bottom portion of the generating device casing 340.

In the present embodiment, the taper 348b is so constructed that the front side of generating device casing 340 (toward the engine) is open wider than the rear side of generating device casing 340 (toward the transmission). The drain hole 348a is formed at the front lower portion of the generating device casing 340.

The drain hole 348a formed at the lower portion of the generating device casing 340 can drain water produced by dew condensation or another reason from the generating device casing 340. The taper 348b formed by drafting a core can be effectively used for flowing water.

The other parts of the generating device casing 340 are constructed substantially similar to those of the generating device casing 240 of the sail-drive propelling machine 201 of the first embodiment.

Next, a stem-drive propelling machine 301 according to the second embodiment will be described.

Figure 77:
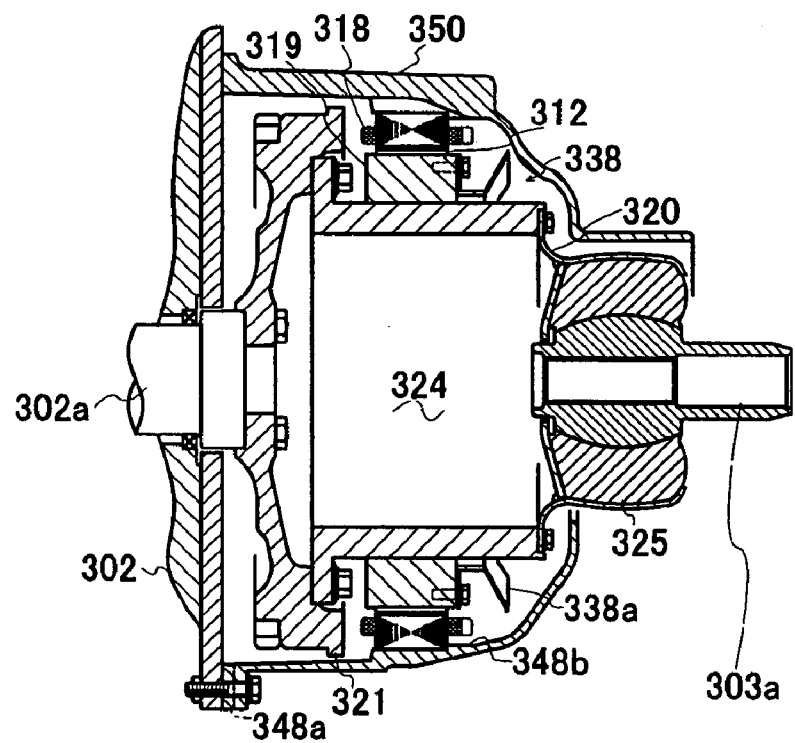
FIG. 77 is a sectional side view of a stem-drive propelling machine according to a second embodiment.

In the propelling machine 301 of the second embodiment as shown in FIG. 77, a generating device casing 350 equals the generating device casing 340 of the first embodiment united with the FW housing 331a and the mounting flange 303b.

The other configuration of the propelling machine 301 of the present embodiment, such as form of the cooling fan 338, are constructed substantially similar to the stem-drive propelling machine 301 of the first embodiment.

Next, explanation will be given of another construction of the generating device.

Figure 73:
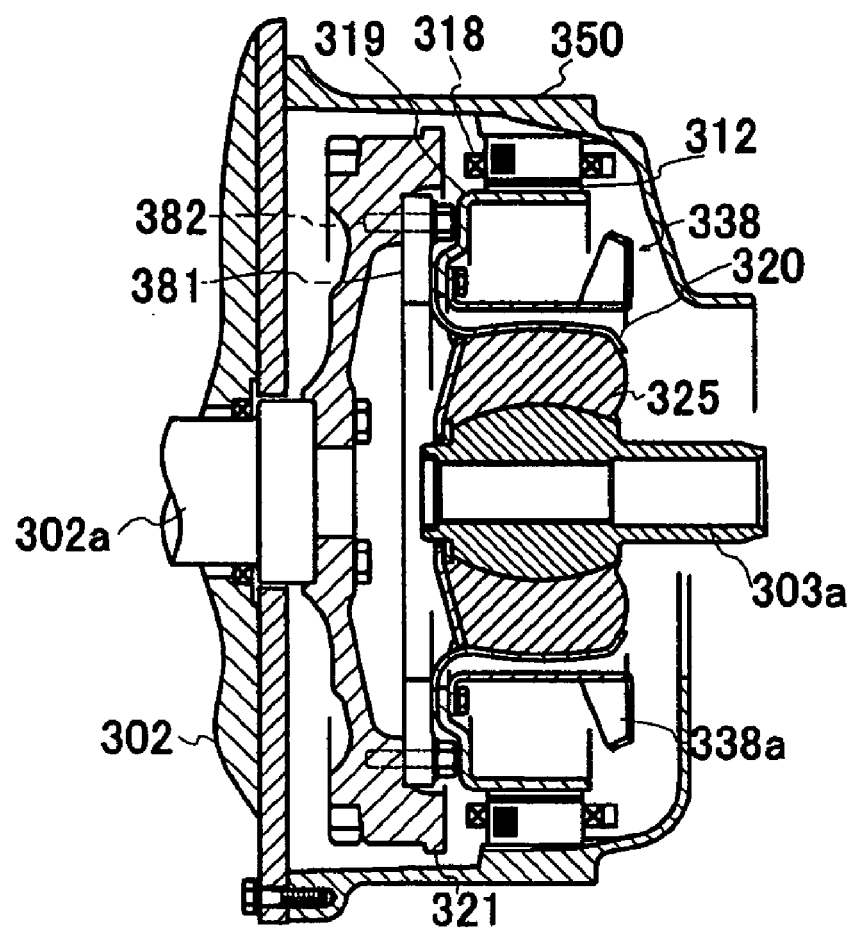
FIG. 73 is a sectional side view of another electric power generating device in the stem-drive propelling machine.

As shown in FIG. 73, a ring-like rotary member 381 is fixed to the flywheel 321 by bolts 382. Behind the rotary member 381 are disposed an attachment member 319 having a magnet 312 fixed thereon, a fan 338, and an attachment member 320 to be fitted to an elastic joint 325, and fixed to the rotary member 381 by bolts, whereby the rotary member 381, the attachment member 319 of the magnet 312, the fan 338 and the elastic joint 325 can be rotated integrally with the flywheel 321.

The attachment member 319 is cylindrical and has an outer peripheral surface, onto the magnet 312 is attached and disposed circlewise.

The cylindrical fan 338 is disposed on the inner periphery of the attachment member 319, i.e., on the outer periphery of the elastic joint 325. Vanes 338a are arranged circlewise at the rear portion of the fan 338.

The elastic joint 325 is arranged behind the rotary member 381, and fixed to the rear surface of the distance piece 324 by the attachment member 320. The power take-off shaft 303a is arranged at the center portion of the elastic joint 325 to be rotatable integrally with the elastic joint 325, whereby the power take-off shaft 303a is rotated by the crankshaft 302a.

Figure 75:
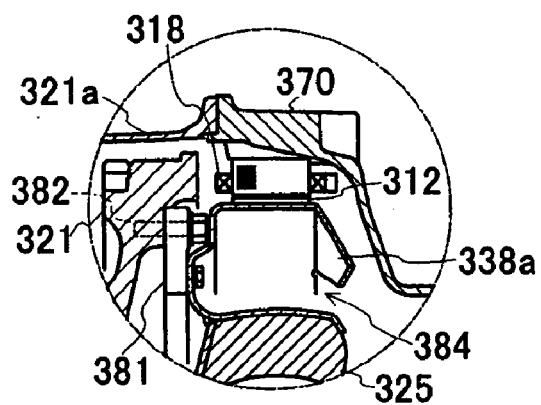
FIG. 75 is a partial macrograph of the electric power generating device having an integrated attaching member.

As shown in FIG. 75, the attachment member 319 with the magnet 320, the rotary member 381 and the attachment member 320 of the elastic joint 325 may be formed integrally so as to serve as a substantially cylindrical attachment member 384 to be fixed to the rear surface of the rotary member 381. The circular magnet 312 is arranged on the outer peripheral surface of the attachment member 384. The vanes 338a of the fan 338 are formed on the rear portion of the attachment member 384. The elastic joint 325 is fixed to the inner surface of the attachment member 384, and the power take-off shaft 303a is arranged at the center portion of the elastic joint 325. Thus, the rotary member 381, the attachment member 319 with the magnet 312, the fan 338 and the elastic joint 325 can be rotated integrally with the flywheel 321, whereby the power take-off shaft 303a is rotated by the crankshaft 302a.

Figure 76:
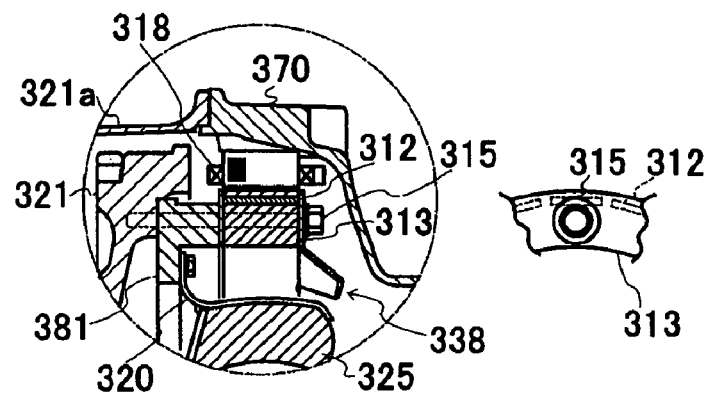
FIG. 76 is a partial macrograph of another electric power generating device.

Alternatively, as shown in FIG. 76, an outer ring 313 may be fixed to a rear portion of the cylindrical rotary member 381, and the magnet 312 may be attached onto the outer ring 313. The fan 338 is provided on the rear end face of the outer ring 313. The rotary member 381, the outer ring 313 and the fan 338 are fixed to the flywheel 321 by bolts 315. The attachment member 320 of the elastic joint 325 is fixed in the rotary member 381, and the power take-off shaft 303a is arranged at the center portion of the elastic joint 325. Thus, the rotary member 381, the magnet 312, the fan 338 and the elastic joint 325 can be rotated integrally with the flywheel 321, whereby the power take-off shaft 303a is rotated by the crankshaft 302a.

The generating device casing 350 used in the sail-drive propelling machine of the second embodiment is constructed substantially similar to the generating device casing 250 of sail-drive the propelling machine 201 of the second embodiment.

Next, a stern-drive propelling machine 301 according to the third embodiment will be described.

Figure 78:
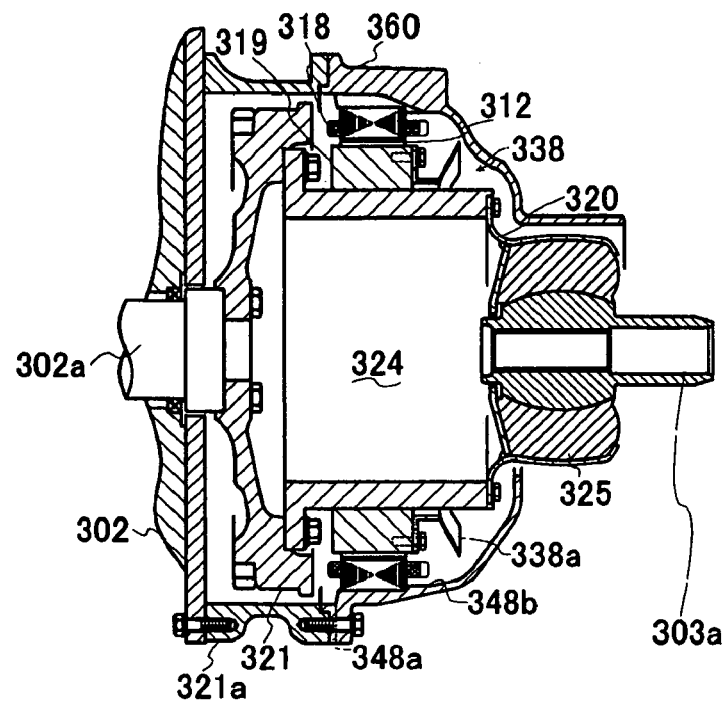
FIG. 78 is a sectional side view of a stern-drive propelling machine according to a third embodiment.

In the propelling machine 301 of the third embodiment as shown in FIG. 78, a generating device casing 360 equals the generating device casing 340 of the first embodiment integrated with the FW housing 331a.

The other configuration of the propelling machine 301 of the present embodiment, such as form of the cooling fan 338, are constructed substantially similar to the stem-drive propelling machine 301 of the first embodiment.

The generating device casing 360 used in the sail-drive propelling machine of the third embodiment is constructed substantially similar to the generating device casing 260 of the said-drive propelling machine 201 of the third embodiment.

Next, a stem-drive propelling machine 301 according to the fourth embodiment will be described.

Figure 79:
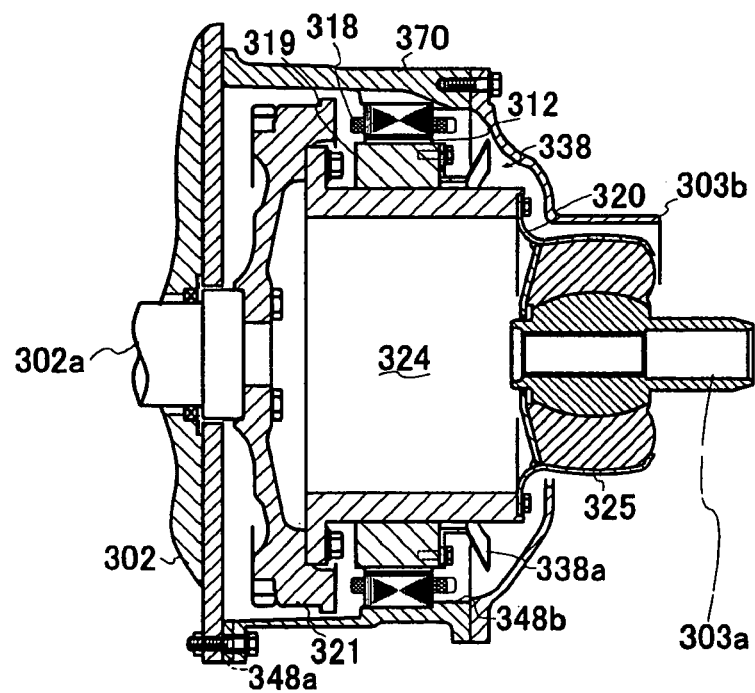
FIG. 79 is a sectional side view of a stem-drive propelling machine according to a fourth embodiment.

In the propelling machine 301 of the fourth embodiment as shown in FIG. 79, a generating device casing 370 equals the generating device casing 340 of the first embodiment integrated with the mounting flange 303b.

Figure 74:
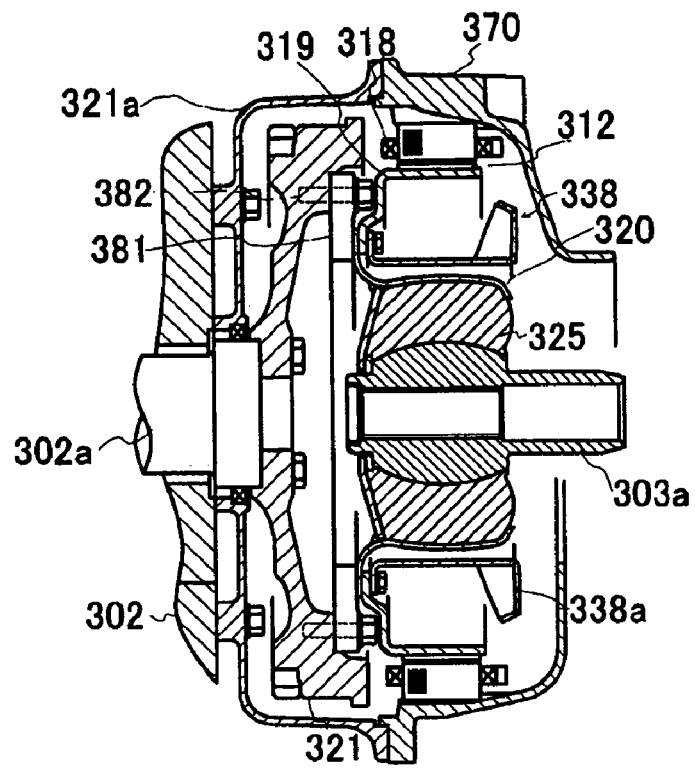
FIG. 74 is a sectional side view of another electric power generating device in the stern-drive propelling machine according to the first embodiment.

The other configuration of the propelling machine 301 of the present embodiment, such as form of the cooling fan 338, are constructed substantially similar to the stern-drive propelling machine 301 of the first embodiment. A reshaped electric power generating device shown in FIG. 74 used in this embodiment is constructed substantially similar to the corresponding generating device used in the stern-drive propelling machine of the first embodiment.

The generating device casing 370 used in the propelling machine of the fourth embodiment is constructed substantially similar to the generating device casing 270 of the sail-drive propelling machine 201 of the fourth embodiment.

INDUSTRIAL APPLICABILITY OF THE INVENTION

As mentioned above, a power generating and propelling system of a vessel according to the present invention can be applied to a propelling machine of a vessel such as a pleasure boat and a fishing boat.

A generating device of the present invention is disposed between an internal combustion engine and a transmission of the propelling machine. In each of the present embodiments, the generating device is disposed between a flywheel and the transmission. Alternatively, the generating device may be disposed between the flywheel and the internal combustion engine.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A power generating and propelling system of a vessel, comprising:
    an internal combustion engine having a crankshaft oriented in the direction of propulsion of a vessel;
    a transmission for transmitting output force from the crankshaft to a propeller;
    an electrical power source;
    an electric power generating device disposed on a drive train between the crankshaft and the transmission, wherein the electric power generating device provides power to power-consuming inboard equipment;
    a flywheel, separate from the electric power generating device, provided on the crankshaft; and
    a flywheel housing covering the flywheel, wherein the transmission has a joint portion applied to be separably connected to the flywheel housing.

2. The power generating and propelling system of a vessel as set forth in claim 1, wherein the joint portion of the transmission is a mounting flange.

3. The power generating and propelling system of a vessel as set forth in claim 1, further comprising:
   a casing interposed between the flywheel housing and the joint portion of the transmission so as to incorporate the electric power generating device.

4. The power generating and propelling system of a vessel as set forth in claim 3, further comprising:
   an opening in the casing to thereby provide access to the electric power generating device when the transmission is separated from the casing.

5. The power generating and propelling system of a vessel as set forth in claim 3, the electric power generating device comprising:
   a rotor rotating centered on an axis of the crankshaft.

6. The power generating and propelling system of a vessel as set forth in claim 1, wherein the joint portion of the transmission is separably and directly connected to the flywheel housing, and wherein the flywheel housing incorporates the electric power generating device.

7. The power generating and propelling system of a vessel as set forth in claim 6, the electric power generating device comprising:
   a rotor rotating centered on an axis of the crankshaft.

8. The power generating and propelling system of a vessel as set forth in claim 7, the electric power generating device comprising:
   a stator fixed to an inner peripheral surface of the flywheel housing, wherein the rotor is fixed to an outer peripheral portion of the flywheel.

9. The power generating and propelling system of a vessel as set forth in claim 7, the electric power generating device comprising:
   a stator fixed to an inner peripheral surface of the joint portion of the transmission, wherein the rotor is fixed to an input shaft of the transmission coaxially connected to the crankshaft.

10. The power generating and propelling system of a vessel as set forth in claim 6, the electric power generating device comprising:
    a rotor shaft disposed in the joint portion of the transmission in parallel to the crankshaft;
    a rotor rotating centered on the rotor shaft; and
    a stator disposed around the rotor.

11. The power generating and propelling system of a vessel as set forth in claim 1, further comprising:
    a fan disposed on the flywheel so as to cool the electric power generating device.

12. The power generating and propelling system of a vessel as set forth in claim 11, wherein the flywheel housing is provided with a vent hole.

13. The power generating and propelling system of a vessel as set forth in claim 11, wherein the transmission is provided within a housing having a vent hole.

14. The power generating and propelling system of a vessel as set forth in claim 1, further comprising:
    an input shaft of the transmission connected to the crankshaft through an elastic joint.

15. The power generating and propelling system of a vessel as set forth in claim 1, further comprising:
    a cooling water circuit for cooling the internal combustion engine partly disposed near the electric power generating device so as to cool the electric power generating device.

16. The power generating and propelling system of a vessel as set forth in claim 15, wherein water is introduced into the cooling water circuit from the outside of the vessel.

17. The power generating and propelling system of a vessel as set forth in claim 15, wherein the cooling water circuit is a closed circuit for circulating fresh water.

18. The power generating and propelling system of a vessel as set forth in claim 1, wherein the joint portion of the transmission is separably and directly connected to the flywheel housing, and wherein the transmission incorporates the electric power generating device.

19. A power generating and propelling system of a vessel, comprising:
    an internal combustion engine having a crankshaft oriented in the direction of propulsion of a vessel;
    a transmission for transmitting output force from the crankshaft to a propeller;
    an electric power generating device disposed on a drive train between the crankshaft and the transmission;
    a flywheel provided on the crankshaft;
    a casing covering the electric power generating device and having an inner peripheral surface;
    a rotor fixed to the flywheel; and
    a stator fixed to the inner peripheral surface of the casing.

20. The power generating and propelling system of a vessel as set forth in claim 19, wherein the rotor projects from the flywheel opposite to the internal combustion engine.

21. The power generating and propelling system of a vessel as set forth in claim 19, further comprising:
    an opening to provide access to the electric power generating device when the flywheel housing is separated from the joint portion of the transmission.

22. A power generating and propelling system of a vessel, comprising:
    an internal combustion engine having a crankshaft oriented in the direction of propulsion of a vessel;
    a transmission for transmitting output force from the crankshaft to a propeller;
    an electric power generating device disposed on a drive train between the crankshaft and the transmission;
    a flywheel provided on the crankshaft;
    a casing covering the electric power generating device;
    a rotor shaft disposed in the casing in parallel to the crankshaft;
    a rotor rotating centered on the rotor shaft; and
    a stator disposed around the rotor.

* * * * *

UNITED STATES PATENT AND TRADEMARK OFFICE
CERTIFICATE OF CORRECTION

PATENT NO. : 7,270,582 B2 Page 1 of 1
APPLICATION NO. : 11/218619
DATED : September 18, 2007
INVENTOR(S) : Mori et al.

It is certified that error appears in the above-identified patent and that said Letters Patent is hereby corrected as shown below:

Title Page, Item (63) of the cover page, the language reading "filed on Sep. 11, 2001" should read --filed on Aug. 28, 2002--.

Col. 1, Lines 7-9
In the CROSS REFERENCE TO RELATED APPLICATIONS section, the language reading "filed Sep. 11, 2001" should read --filed on Aug. 28, 2002--.

Signed and Sealed this

Eighth Day of July, 2008

JON W. DUDAS
*Director of the United States Patent and Trademark Office*